US009931951B2

(12) United States Patent
Khaligh et al.

(10) Patent No.: US 9,931,951 B2
(45) Date of Patent: Apr. 3, 2018

(54) INTEGRATED DUAL-OUTPUT GRID-TO-VEHICLE (G2V) AND VEHICLE-TO-GRID (V2G) ONBOARD CHARGER FOR PLUG-IN ELECTRIC VEHICLES

(71) Applicant: University of Maryland, College Park, MD (US)

(72) Inventors: Alireza Khaligh, Arlington, VA (US); Yichao Tang, Sunnyvale, CA (US)

(73) Assignee: University of Maryland, College Park, MD (US)

( * ) Notice: Subject to any disclaimer, the term of this patent is extended or adjusted under 35 U.S.C. 154(b) by 34 days.

(21) Appl. No.: 14/739,822

(22) Filed: Jun. 15, 2015

(65) Prior Publication Data

US 2016/0016479 A1 Jan. 21, 2016

Related U.S. Application Data

(60) Provisional application No. 62/011,649, filed on Jun. 13, 2014.

(51) Int. Cl.
*H02M 3/335* (2006.01)
*H01F 3/14* (2006.01)
(Continued)

(52) U.S. Cl.
CPC ....... *B60L 11/1812* (2013.01); *B60L 11/1816* (2013.01); *B60L 11/1842* (2013.01);
(Continued)

(58) Field of Classification Search
CPC ..... H02M 2001/007; H02M 2001/009; H02M 1/4208; H02M 1/4258; H02M 3/33569;
(Continued)

(56) References Cited

U.S. PATENT DOCUMENTS 6,072,709 A * 6/2000 Raets ................... H02M 3/28
307/28
6,411,528 B1 * 6/2002 Yasumura ........... H01F 27/2823
336/170
(Continued)

OTHER PUBLICATIONS

European Office Action for EP 10 250 841.3 dated Sep. 11, 2015.
(Continued)

*Primary Examiner* — Fred E Finch, III
(74) *Attorney, Agent, or Firm* — Carter, DeLuca, Farrell & Schmidt, LLP; George Likourezos, Esq.

(57) ABSTRACT

An integrated and isolated onboard charger for plug-in electric vehicles, includes an ac-dc converter and a dual-output dc-dc resonant converter, for both HV traction batteries and LV loads. In addition, the integrated and isolated onboard charger may be configured as unidirectional or bidirectional, and is capable of delivering power from HV traction batteries to the grid for vehicle-to-grid (V2G) applications. To increase the power density of the converter, the dual-output DC-DC resonant converter may combine magnetic components of resonant networks into a single three-winding electromagnetically integrated transformer (EMIT). The resonant converter may be configured as a half-bridge topology with split capacitors as the resonant network components to further reduce the size of converter. The integrated charger may be configured for various operating modes, including grid to vehicle (G2V), vehicle to grid (V2G) and high voltage to low voltage, HV-to-LV (H2L) charging.

17 Claims, 38 Drawing Sheets

(51) Int. Cl.
| | |
|---|---|
| *B60L 11/18* | (2006.01) |
| *H02M 1/42* | (2007.01) |
| *H01F 27/38* | (2006.01) |
| *H01F 38/08* | (2006.01) |
| *H02M 1/00* | (2006.01) |
| *H02M 3/158* | (2006.01) |

(52) U.S. Cl.
CPC ............ *B60L 11/1868* (2013.01); *H01F 3/14* (2013.01); *H01F 27/38* (2013.01); *H01F 38/08* (2013.01); *H02M 1/00* (2013.01); *H02M 1/4208* (2013.01); *H02M 1/4258* (2013.01); *H02M 3/33561* (2013.01); *H02M 3/33592* (2013.01); *B60L 2210/30* (2013.01); *B60L 2210/40* (2013.01); *H02M 2001/007* (2013.01); *H02M 2001/008* (2013.01); *H02M 2001/009* (2013.01); *H02M 2001/0058* (2013.01); *H02M 2003/1586* (2013.01); *Y02E 60/721* (2013.01); *Y02T 10/7005* (2013.01); *Y02T 10/7066* (2013.01); *Y02T 10/7072* (2013.01); *Y02T 10/7241* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(58) Field of Classification Search
CPC .......... H02M 3/33592; H02M 3/33561; H01F 27/24; H01F 27/26; H01F 27/263; H01F 27/2823; H01F 27/38; H01F 30/04; H01F 30/06; H01F 38/42; H01F 2038/426; B60L 11/1812
See application file for complete search history.

(56) References Cited

U.S. PATENT DOCUMENTS

| | | | | |
|---|---|---|---|---|
| 7,974,069 | B2* | 7/2011 | Mao | H01F 27/28 361/268 |
| 8,467,199 | B2* | 6/2013 | Lee | H02M 3/33584 363/21.02 |
| 2008/0198632 | A1* | 8/2008 | Takayanagi | H02M 7/797 363/17 |
| 2009/0237967 | A1 | 9/2009 | Huang | |
| 2011/0025289 | A1* | 2/2011 | Wang | H02M 1/4225 323/285 |
| 2012/0068663 | A1* | 3/2012 | Tanikawa | B60L 11/1816 320/109 |
| 2012/0112547 | A1 | 5/2012 | Ghosh et al. | |
| 2013/0293192 | A1* | 11/2013 | Abe | B60L 11/123 320/108 |
| 2014/0043127 | A1* | 2/2014 | Worek | H01F 27/38 336/178 |
| 2014/0103860 | A1* | 4/2014 | Kominami | H02M 1/32 320/103 |
| 2015/0091460 | A1* | 4/2015 | Kato | H02M 3/33553 315/200 R |
| 2015/0303792 | A1* | 10/2015 | Kim | H01F 27/40 363/21.02 |
| 2016/0049881 | A1* | 2/2016 | Ackermann | H01F 3/14 315/200 R |
| 2016/0055956 | A1* | 2/2016 | Yuan | H01F 27/28 336/5 |
| 2016/0204707 | A1* | 7/2016 | Takahara | H02M 1/4258 363/16 |
| 2016/0365804 | A1* | 12/2016 | Nakagawa | H01F 5/06 |

OTHER PUBLICATIONS

PCT International Preliminary Report on Patentabiity for PCT/US2015/035837 dated Dec. 22, 2016.
PCT International Search Report and Written Opinion for PCT/US15/35837 dated Sep. 18, 2015.
X. Zhang, C. Li, C. Yao, L. Fu, F. Guo, and J. Wang, "An Isolated DC/DC Converter with Reduced No of Switches and Voltage Stresses for Electric and Hybrid Electric Vehicles," in IEEE Applied Power Electronics Conference and Exposition, Long Beach, CA, Mar. 2011.
A. Khaligh and S. Dusmez, "Comprehensive Topological Analysis of Conductive and Inductive Charging Solutions for Plug-In Electric Vehicles," IEEE Transactions on Vehicular Technology, vol. 61, No. 8, pp. 3475-3489, Oct. 2012.
M. Yilmaz and P. T. Krein, "Review of Battery Charger Topologies, Charging Power Levels, and Infrastructure for Plug-In Electric and Hybrid Vehicles," IEEE Transactions on Power Electronics, vol. 28, No. 5, pp. 2151-2169, May 2013.
H. Wang and A. Khaligh, "Comprehensive Topological Analyses of Isolated Resonant Converters in PEV Battery Charging Applications," in Proc. IEEE Transportation Electrification Conference and Expo, Jun. 2013, Dearborn, MI.
H. Wang, S. Dusmez, and A. Khaligh, "Design Considerations for an Level-2 On-Board EV Charger Based on Interleaved Boost PFC and LLC Resonant Converters," in Proc. IEEE Transportation Electrification Conference and Expo, Jun. 2013, Dearborn, MI.
J.-H. Jung, H.-S. Kim, M.-H. Ryu, and J.-W. Baek, "Design Methodology of Bidirectional LLC Resonant Converter for High-Frequency Isolation of DC Distribution Systems," IEEE Transactions on Power Electronics, vol. 28, No. 4, pp. 1741-1755, Apr. 2013.
J. Biela and J. W. Kolar, "Electromagnetic integration of high power resonant circuits comprising high leakage inductance transformers," In Proc. on IEEE Power Electronics Specialists Conference (PESC), Jun. 2004, pp. 1537-4545, vol. 6.
B. Yang, R. Chen, and F. C. Lee, "Integrated magnetic for LLC resonant converter," in Proc. on IEEE Applied Power Electronics Conference and Exposition (APEC), Mar. 2002, pp. 346-351, vol. 1.
L.P. Wong, Y. S. Lee, and D. K. Cheng, "A new approach to the analysis and design of integrated magnetics," in Proc. on IEEE Applied Power Electronics Conference and Exposition (APEC), 2001, vol. 2, pp. 1196-1202.
D. Bowen, A. Lee, C Krafft, and I. D. Mayergoyz, "Analysis of nested winding dielectric-core transformers for ethernet applications," IEEE Transactions on Magnets, vol. 48, No. 11, pp. 4127-4130, Nov. 2012.
J.G. Kassakian, "Future automotive electrical systems—The power electronics market of the future," in Proc. IEEE Appl. Power Electron. Conf., New Orleans, LA, pp. 3-9, 2000.
S.M. Lukic, J. Cao, R.C. Bansal, F. Rodriguez, and A. Emadi, "Energy Storage Systems for Automotive Applications," IEEE Transactions on Industrial Electronics, vol. 55, No. 6, pp. 2258-2267, 2008.
H. Wang, S. Dusmez, and A. Khaligh, "Design and Analysis of a Full Bridge LLC Based PEV Charger Optimized for Wide Battery Voltage Range," IEEE Transactions on Vehicular Technology, vol. 63, No. 4, pp. 1603-1611, May 2014.
F. Musavi, M. Craciun, D.S. Gautam, W. Eberle, and W.G. Dunford, "An LLC resonant DC-DC converter for wide output voltage range battery charging applications," IEEE Trans. on Power Electron., vol. 28, No. 12, pp. 5437-5445, 2013.
G.-J. Su, and L. Tang, "A Multiphase, Modular, Bidirectional, Triple-Voltage DC-DC Converter for Hybrid and Fuel Cell Vehicle Power Systems," IEEE Transactions on Power Electronics, vol. 23, No. 6, pp. 3035-3046, 2008.
Toyota Prius 3rd generation emergency response guide, Toyota Motor Corporation, 2009, p. 15, https://techinfo.toyota.com/techInfoPortal/staticcontent/en/techinfo/html/prelogin/docs/3rdprius.pdf.
Toyota Industries Corporation 2012, "DC-DC Converters that will Contribute to the Fuel Efficiency of Hybrid Vehicles," Toyota Industries Corporation, http://www.toyota-industries.com/csr/environment/ product/erectoronic_01.html <http://www.toyota-industries.com/csr/environment/product/erectoronic_01.html>.
Toyota Camry Gasoline-Electric Hybrid Synergy Drive: Hybrid Vehicle Dismantling Manual, Toyota Motor Corporation, 2006, p. 6.

(56) References Cited

OTHER PUBLICATIONS https://techinfo.toyota.com/techInfoPortal/staticcontent/en/techinfo/ html/prelogin/docs/camryhvdisman.pdf <https://techinfo.toyota.com/techInfoPortal/staticcontent/en/techinfo/html/prelogin/docs/camryhvdisman.pdf>.

2012 Fusion MKZ Hybrid Emergency Response Guide, Ford Motor Corporation, Aug. 2011, p. 7. <http://www.evsafetytraining.org/~/media/Electric%20Vehicle/Files/PDFs/Ford/2012FusionMKZERG2.pdf>.

Carlson. Richard, Advanced Vehicle Testing Activity Benchmark Testing of the Chevrolet Volt Onboard Charger, Idaho National Laboratory, Apr. 2012, p. 1. http://www1.eere.energy.gov/vehiclesandfuels/avta/pdfs/phev/efficiency_results_chevy_volt_onboard_charger.pdf <http://www1.eere.energy.gov/%20vehiclesandfuels/avta/pdfs/ phev/efficiency_results_chevy_volt_onboard_charger.pdf>.

Nissan, "2013 Nissan LEAF Press Kit: Overview", NissanNews.com, <http://nissannews.com/en-US/nissan/usa/presskits/us-2013-nissan-leaf-press-kit>.

2013 Nissan Leaf—First Responder's Guide, Nissan Motor Corporation, Aug. 2011, p. 1, p 9. <http://www.evsafetytraining.org/~/Media/Electric%20Vehicle/Files/2013NissanLEAFFRG%201st%20Rel.pdf>.

Chris Mi et al., Hybrid Electric Vehicles—Principles and Applications with Practical Perspectives, United Kingdom: John Wiley & Sons, Ltd, 2011, pp. 197-198.

T. Gilchrist, "Fuel cells to the fore," IEEE Spectr., vol. 35, No. 11, pp. 35-40, Nov. 1998.

H. Wu, K. K. Sun, S. Ding and Y. Xing, "Topology Derivation of Nonisolated Three-Port DC-DC Converters From DIC and DOC," IEEE Transactions on Power Electronics, vol. 28, No. 7, pp. 3297-3307, 2013.

Y.-K. Lo, S.-C. Yen, and T.-H. Song, "Analysis and Design of a Double-Output Series-Resonant DC-DC Converter," IEEE Transactions on Power Electronics, vol. 22, No. 3, pp. 952-959, 2007.

Young-Joo Lee, Alireza Khaligh, Ali Emadi, "Advanced Integrated Bidirectional AC/DC and DC/DC Converter for Plug-In Hybrid Electric Vehicles," IEEE Trans. Veh. Technol., vol. 58, No. 8, pp. 3970-3970, Oct. 2009.

H. Tao, J. J. L. Duate, and M. A. M. Hendrix, "Three-port triple-half-bridge bidirectional converter with zero-voltage switching," IEEE Trans. Power. Electron., vol. 23, No. 2, pp. 782-792, Mar. 2008.

H. Tao, A. Kotsopoulos, J. L.Duarte, and M.A.M. Hendrix, "Transformercoupled multiport ZVS bidirectional DC-DC Converter with wide input range," IEEE Trans. Power. Electron., vol. 23, No. 2, pp. 771-781, Mar. 2008.

C. Zhao, S.D. Round, and J.K. Kolar, "An isolated three-port bidirectional DC-DC converter with decoupled power flow management," IEEE Trans. Power. Electron., vol. 23, No. 5, pp. 2443-2453, Sep. 2008.

L. Wang, Z. Wang, and H. Li, "Asymmetrical Duty Cycle Control and Decoupled Power Flow Design of a Three-port Bidirectional DC-DC Converter for Fuel Cell Vehicle Application," IEEE Transactions on Power Electronics, vol. 27, No. 2, pp. 891-904, 2012.

S.Y. Kim, H.-S. Song, and K. Nam, "Idling Port Isolation Control of Three-Port Bidirectional Converter for EVs," IEEE Transactions on Power Electronics, vol. 27, No. 5, pp. 2495-2506, 2012.

J.G. Pinto, V. Monteiro, H. Goncalves, and J. L. Afonso, "On-Board Reconfigurable Battery Charger for Electric Vehicles with Traction-to-Auxiliary Mode," IEEE Transactions on Vehicular Technology, vol. 63, No. 3, pp. 1104-1116, Mar. 2014.

A. Rodriguez, A. Vazquez, D. G. Lamar, and M. M. Hernando, "Three-port power electronic system for energy storage and recovery using a parallel connection of a power factor corrector boost and a dual active bridge," 15th International IEEE Power Electronics and Motion Control Conference (EPE/PEMC), pp. LS7d.4-1-LS7d.4-8, 2012

W. Cai, B. Liu, S. Duan, and L. Jiang, "Power flow control and optimization of a three-port converter for photovoltaic-storage hybrid system," IEEE Energy Conversion Congress and Exposition (ECCE), pp. 4121-4128, 2012.

Y.-M. Chen, X. Yu, and A.Q. Huang, "A new nonisolated three-port DC-DC converter with high step-up/down ratio," IEEE Energy Conversion Congress and Exposition (ECCE), pp. 1520-1526, 2012.

Y. Hu, Y. Deng, X. Lu, Y. Tao, and X. He, "A three-port high step-up DC-DC converter for PV system," IEEE ECCE Asia Downunder (ECCE Asia), pp. 285-290, 2013.

Y. Wen, L. Shao, R. Fernandes, and O. Trescases, "Current-mode bi-directional single-inductor three-port DC-DC converter for portable systems with PV power harvesting," 15th IEEE European Conference on Power Electronics and Applications (EPE), pp. 1-10, 2013.

Z. Qian, O. Abdel-Rahman, H. Al-Atrash, and I. Batarseh, "Modeling and Control of Three-Port DC/DC Converter Interface for Satellite Applications," IEEE Transactions on Power Electronics, vol. 25, No. 3, pp. 637-649, 2010.

W. Li, J. Xiao, Y. Zhao, and X. He "PWM Plus Phase Angle Shift (PPAS) Control Scheme for Combined Multiport DC/DC Converters," IEEE Transactions on Power Electronics, vol. 27, No. 3, pp. 1479-1489, 2012.

* cited by examiner

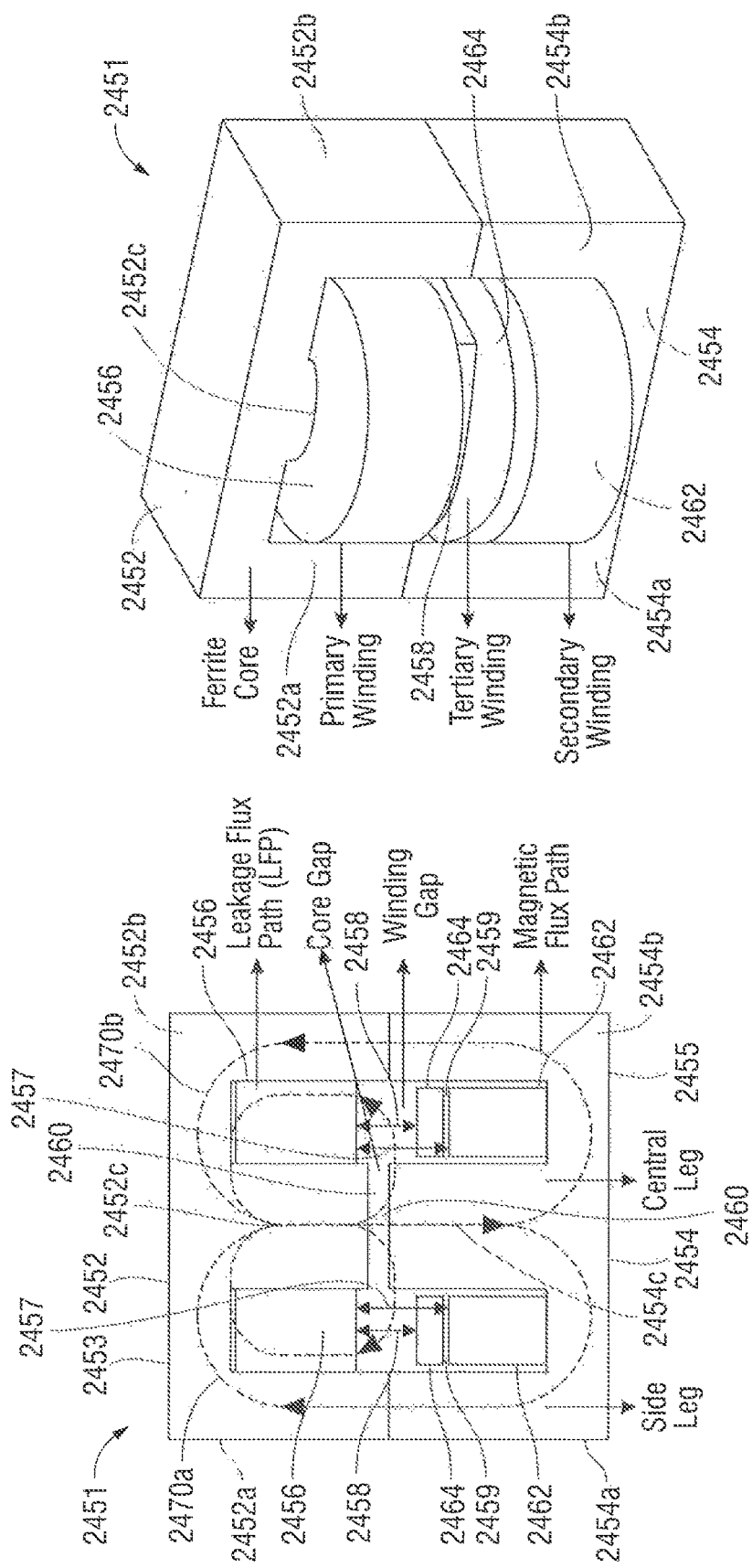

INTEGRATED DUAL-OUTPUT GRID-TO-VEHICLE (G2V) AND VEHICLE-TO-GRID (V2G) ONBOARD CHARGER FOR PLUG-IN ELECTRIC VEHICLES

CROSS-REFERENCE TO RELATED APPLICATIONS

This application claims priority to, and benefit of, U.S. Provisional Patent Application No. 62/011,649 filed on Jun. 13, 2014, entitled "INTEGRATED POWER ELECTRONIC CHARGER FOR PLUG-IN ELECTRIC VEHICLES", by Alireza Khaligh, the entire contents of which is incorporated by reference herein.

BACKGROUND

1. Technical Field

The present disclosure relates to plug-in hybrid electric vehicles (PHEVs) and electric vehicles (EVs) and more particularly to on-board chargers for such vehicles.

2. Description of Related Art

Plug-in hybrid electric vehicles (PHEVs) and electric vehicles (EVs), cumulatively called plug-in electric vehicles (PEVs), need to be equipped with an on-board charger. Such on-board chargers are generally categorized as onboard level-1 (L1) grid-to-vehicle (G2V) chargers and level-2 (L2) grid-to-vehicle (G2V) chargers to charge the high-voltage (HV) traction batteries in plug-in electric vehicles (PEVs).

FIGS. 1 and 2 illustrate schematic diagrams of an onboard power electronic interface (PEI) 102 of a PEV powertrain in presence of an onboard charger and a step-down dc-dc converter according to the prior art. More particularly, FIGS. 1 and 2 illustrate power electronic interface (PEI) 102 that includes a typical on-board charger 106 that is mounted on a PEV 100 according to the prior art. On-board charger 106 is supplied 1-phase alternating current (AC) electrical power by an external power supply interface connection 104. The on-board charger 106 includes two stages: (a) first stage 1060 is an AC/DC (direct current) converter for rectification and power factor correction; (b) second stage 1068 is an isolated DC/DC converter for galvanic isolation and battery current/voltage regulation[2-5]. Second stage DC/DC converter 1068 is in electrical communication with HV traction batteries 108.

The HV traction batteries 108 are in electrical communication with a low voltage (LV) system 110 that includes a step-down dc-dc converter 112 in electrical communication with LV batteries 114 and that steps down the voltage of HV traction batteries 108 to a typical 12-V low voltage (LV) to the level of LV batteries 114.

As defined herein, HV traction batteries 108 may include a single battery or multiple batteries. Similarly, LV batteries 114 may include a single battery or multiple batteries. HV fraction batteries 108 and LV batteries 114 may also be referred to herein as battery packs, even if there is only a single battery present.

to energize dc electrical loads, such as steering system, air conditioning, radios and consumer electronics. Such step-down dc-dc converter 112 is independent of the grid-connected onboard charger 106.

The most commonly used ac-dc converter 1064 includes a single-phase power factor correction (PFC) boost converter, which converts the 110V~240V single-phase ac voltages received at external power supply interface connection 104 to a regulated dc voltage (typically around 390V). At the second stage, isolated dc-dc converter 1068 is utilized to regulate the current/voltage (typically 250V~420V) of HV batteries 108 and provide galvanic isolation. A majority of the commercially available and upcoming onboard L1 and L2 chargers are unidirectional.

The DC output of HV batteries 108 is supplied to a 3-phase inverter 116 that is in electrical communication with a 3-phase motor 118 to form an electric propulsion system 1160. The 3-phase motor 118 is mechanically coupled to torque converter 120 and in turn transmission 122 and axle and wheel assembly 124. Internal combustion engine (ICE) propulsion system 126 is also mechanically coupled in parallel to the torque converter 120 and in turn transmission 122 and axle and wheel assembly 124.

In the case of availability of other renewable energy sources such as wind, solar, or fuel cell energy systems, the output of the energy source are sometimes directly connected to DC-link 1066, which is the stage between AC/DC stage 1064 and DC/DC stage 1068 and shown by $V_{DC}$, enabling DC charging from the renewable energy source.

An efficient approach toward topology integration can increase the power density and specific power while reducing the cost of onboard PEIs. Prior efforts to develop integrated PEV onboard chargers include integration of non-isolated single-stage chargers that combine an ac-dc PFC converter and a dc-dc bidirectional converter, which interfaces an HV battery pack and the propulsion inverter. However, such topologies require more transistors and diodes, and integrating a high-power dc-dc converter with a low-power onboard charger might reduce the charging efficiency. In addition, some PEVs might not be equipped with a bidirectional converter between HV battery pack and propulsion inverter.

Other researchers have studied the integration of isolated onboard chargers using either phase-shift active-bridge converters or series-parallel resonant converters; however, many of these topologies require more components and have lower efficiency in comparison to stand-alone converters. Moreover, these topologies include a discrete inductor as the resonant inductor in series with the transformer, which increases the size and weight of magnetic components. Some topologies do not provide isolation between the HV traction battery and LV dc loads, which does not comply with the requirements of IEC 61851-1 Standard.

As described herein throughout the drawings and specification, the sequential numbering of the various components, such as switches S1, S2 . . . , diodes D1, D2 . . . , capacitors C1, C2 . . . , etc. are unique to the particular figure that is being described, and are not necessarily considered to carry over from one figure to the next unless the particular components are located on one or more other figures such that one of ordinary skill in the art would recognize that the component(s) in question is (are) in fact carried over from one or more previously described figures.

FIG. 3 demonstrates the topology of a typical onboard charger 106 and an individual dc-dc converter 110 according to the prior art. The first stage 1060 of charger 106 includes a unidirectional diode bridge 1051 for ac-dc conversion, followed by an interleaved boost converter 1052 (inductors L1 and L2, diodes D1 and D2, switches S1 and S2 and capacitor $C_{DC1}$) for power factor correction. The first stage 1060 is in electrical communication with unidirectional LLC resonant converter 1068 (switches S3, S4, S5, S6, resonant inductor Lr1, resonant capacitor Cr1, transformer T1, diodes D3, D4, D5, D6 and capacitor Cdc2) that forms the second stage 1068 to regulate the voltage/current of the HV traction battery 108.

Via HV battery 108, the second stage 106B is in electrical communication with LV system 110 that includes another LLC resonant converter 112 (switches S7, S8, S9, S10, resonant inductor Lr2, resonant capacitor Cr2, transformer T2, diodes D7, D8, D9, D10, switches S15, S16 and capacitor Cdc2) that delivers power from HV traction battery pack 108 to LV battery pack 114 that is electrically coupled to LV dc loads (not shown).

SUMMARY

The present disclosure relates to an integrated and isolated onboard charger for plug-in electric vehicles that includes an ac-dc converter and a dual-output dc-dc resonant converter, for both HV traction batteries and LV loads. In addition, the integrated and isolated onboard charger may be configured as unidirectional or bidirectional, and is capable of delivering power from HV fraction batteries to the grid for vehicle-to-grid (V2G) applications. To increase the power density of the converter, the dual-output DC-DC resonant converter may combine magnetic components of resonant networks into a single three-winding electromagnetically integrated transformer (EMIT). The resonant converter may be configured as a half-bridge topology with split capacitors as the resonant network components to further reduce the size of the converter. The integrated charger is configured for various operation modes, including grid to vehicle (G2V), vehicle to grid (V2G) and high voltage to low voltage, HV-to-LV (H2L) charging. More particularly, the present disclosure relates to an integrated power electronics interface that includes a first stage power factor correction AC-DC converter; and a second stage integrated DC-DC converter that includes a dual-output CLLLC resonant converter; and a LLC converter.

In one embodiment, the dual-output CLLLC resonant converter may be intertwined with the LLC converter. The LLC converter may be one of a half-bridge LLC converter or a full-bridge LLC converter.

The dual-output CLLLC resonant converter may be intertwined with the half-bridge LLC converter or may be intertwined with the full-bridge LLC converter.

The present disclosure relates also to an integrated power electronics interface that includes a first stage. The first stage includes a power factor correction AC-DC converter; and a DC/DC converter. The second stage is an integrated DC-DC converter.

In one embodiment, the power factor correction AC-DC converter of the first stage may be a diode bridge. In still further embodiments, the diode bridge may be one of a full-bridge diode bridge or a half-bridge diode bridge.

In still another embodiment, the first stage DC-DC converter may be (a) a single-leg boost converter; (b) a single-leg buck-boost converter; (c) an interleaved boost converter; (d) an interleaved buck-boost converter; (e) a single-ended primary-inductor converter (SEPIC) converter; (f) a bidirectional half bridge converter; (g) a bidirectional full bridge converter; (h) a bidirectional totem pole converter; (m) a bidirectional interleaved half-bridge converter; (n) a bidirectional interleaved full-bridge converter; (l) a bridgeless boost PFC converter; (l) an interleaved bridgeless boost PFC converter; (i) a bridgeless interleaved resonant PFC boost converter; (j) a phase shifted semi-bridgeless converter, or any other potential AC/DC bidirectional and unidirectional PFC circuit.

In one embodiment, the second stage integrated DC-DC converter may include a three-winding transformer. The three-winding transformer may be one of a transformer configured with individual, discrete inductors or an electromagnetically integrated transformer.

In one embodiment, the electromagnetically integrated transformer may include: a first EE core defining a base portion, a central leg and first and second peripheral legs; a second EE core defining a base portion, a central leg and first and second peripheral legs; a primary winding wound around the central leg of the first EE core between the first peripheral leg and the central leg and between the second peripheral leg and the central leg of the first EE core; a secondary winding wound around the central leg of the second EE core between the first peripheral leg and the central leg and between the second peripheral leg and the central leg of the second EE core; and a tertiary winding wound around the central leg of the second EE core between the first peripheral leg and the central leg and between the second peripheral leg and the central leg of the second EE core.

In one embodiment, the edges of the legs of the first EE core may align with edges of the legs of the second EE core and the secondary winding and tertiary winding may be adjacent to one another along an axis defined by the central leg of the first EE core and the central leg of the second EE core.

In still another embodiment, the edges of the legs of the first EE core may align with edges of the legs of the second EE core and the secondary winding may be formed concentrically around the tertiary winding and both the secondary winding and the tertiary winding may be formed concentrically around the central leg of the second EE core. In yet another embodiment, a peripheral winding gap may be formed between a lower edge of the primary winding on the first EE core and an upper edge of the secondary winding on the second EE core. In still another embodiment, a central gap may be formed between the central leg of the first EE core and the central leg of the second EE core.

The present disclosure relates also to a three-winding electromagnetically integrated transformer for an integrated power electronics interface(/second stage integrated DC-DC converter) that includes: a first EE core defining a base portion, a central leg and first and second peripheral legs; a second EE core defining a base portion, a central leg and first and second peripheral legs; a primary winding wound around the central leg of the first EE core between the first peripheral leg and the central leg and between the second peripheral leg and the central leg of the first EE core; a secondary winding wound around the central leg of the second EE core between the first peripheral leg and the central leg and between the second peripheral leg and the central leg of the second EE core; and a tertiary winding wound around the central leg of the second EE core between the first peripheral leg and the central leg and between the second peripheral leg and the central leg of the second EE core.

In one embodiment, edges of the legs of the first EE core may align with edges of the legs of the second EE core and the secondary winding and tertiary winding may be adjacent to one another along an axis defined by the central leg of the first EE core and the central leg of the second EE core.

In still another embodiment, edges of the legs of the first EE core may align with edges of the legs of the second EE core and the secondary winding may be formed concentrically around the tertiary winding and both the secondary winding and the tertiary winding may be formed concentrically around the central leg of the second EE core.

In yet another embodiment, a peripheral winding gap may be formed between a lower edge of the primary winding on the first EE core and an upper edge of the secondary winding on the second EE core. In another embodiment, a central gap may be formed between the central leg of the first EE core and the central leg of the second EE core.

BRIEF DESCRIPTION OF THE DRAWINGS

The above-mentioned advantages and other advantages will become more apparent from the following detailed description of the various exemplary embodiments of the present disclosure with reference to the drawings wherein:

FIG. 23A illustrates winding arrangements inside gapped E cores of an electromagnetically integrated transformer (EMIT) according to one embodiment of the present disclosure;

FIG. 23B is a perspective view of the EMIT of FIG. 23A;

DETAILED DESCRIPTION

Figure 1:
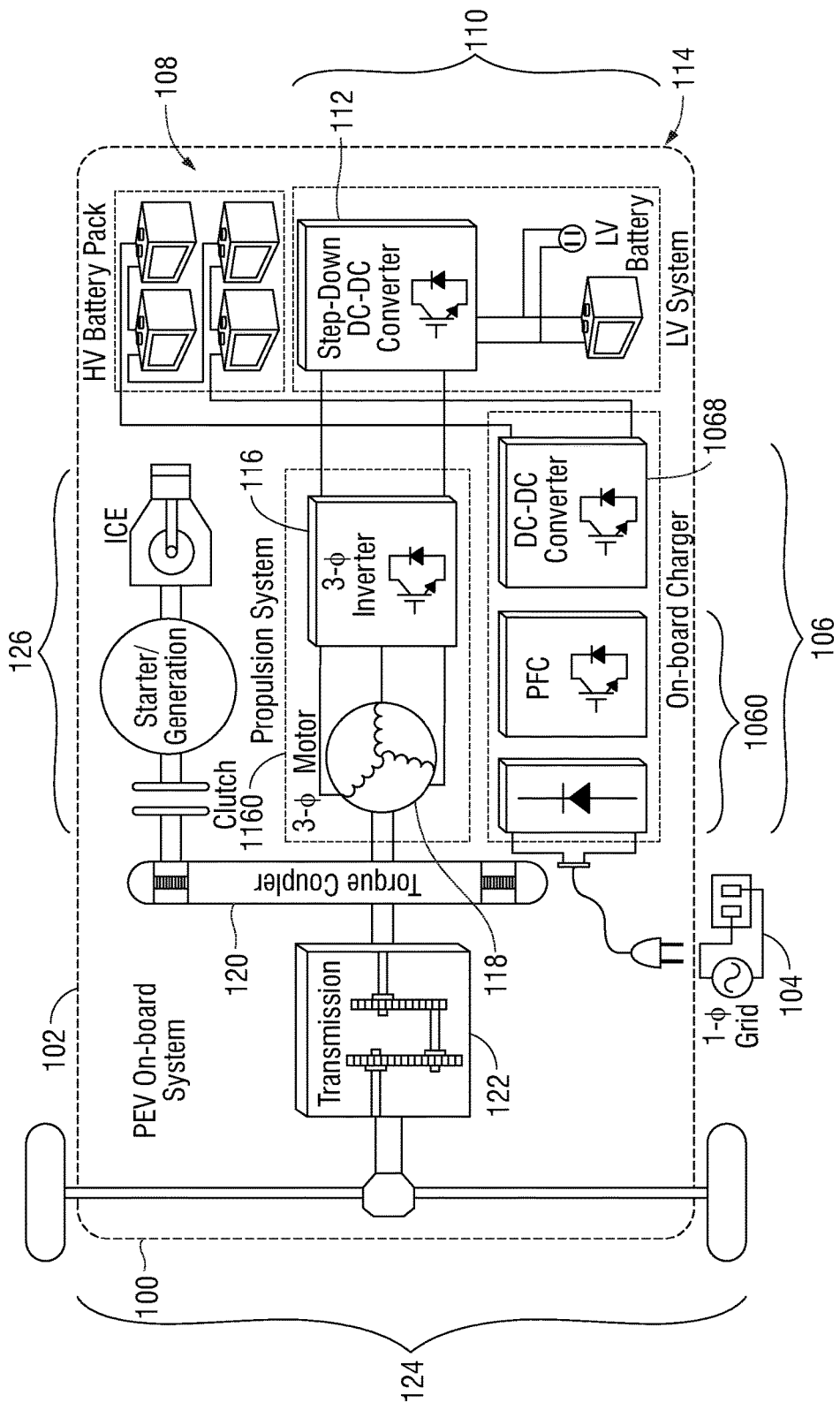
FIG. 1 illustrates a schematic diagram of the onboard PEIs in a PEV powertrain according to the prior art.
Figure 2:
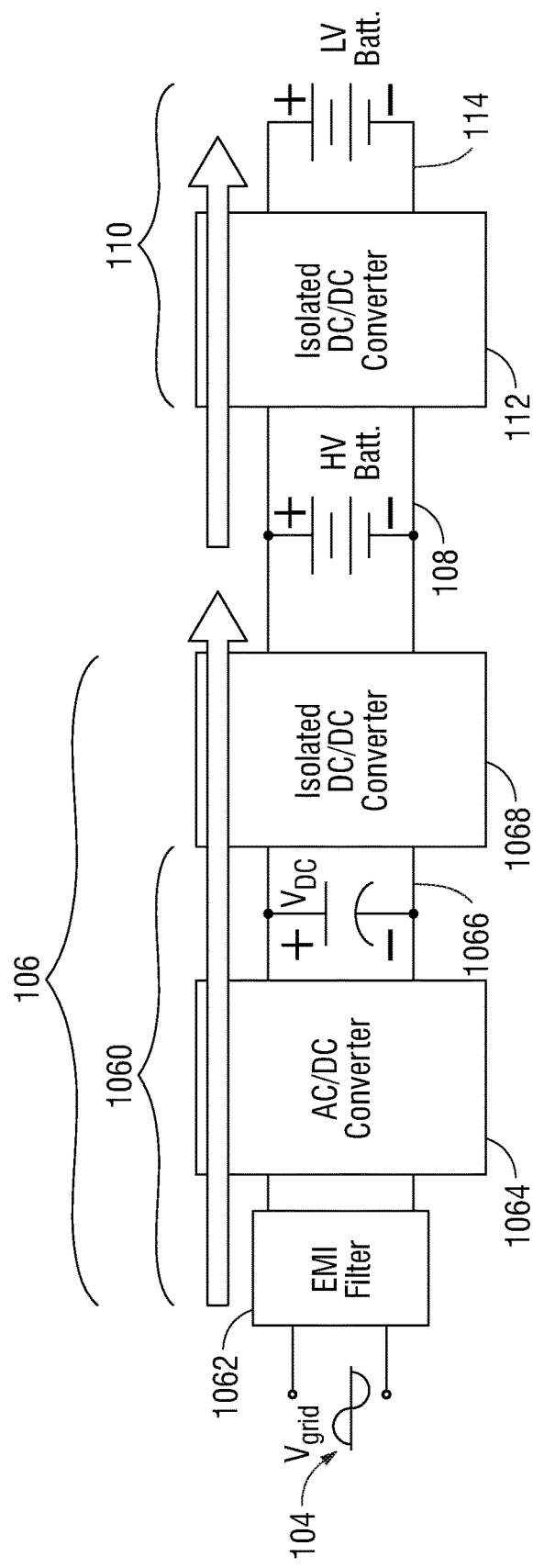
FIG. 2 illustrates the conventional system level structure of an on-board charger and 12V or 24V or 42V auxiliary dc/dc converter for a PEV according to the prior art.
Figure 3:
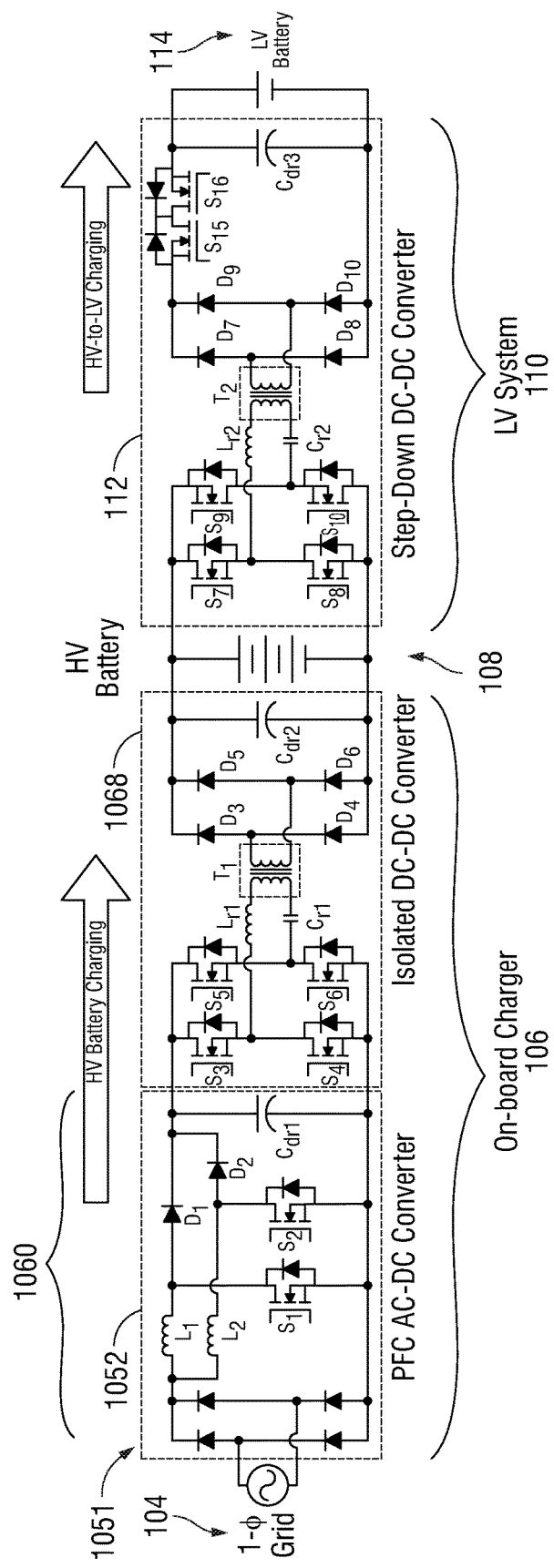
FIG. 3 illustrates a stand-alone onboard charger and the step-down dc-dc converter topology of a PEV charger according to the PRIOR ART.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

The word "exemplary" is used herein to mean "serving as an example, instance, or illustration." Any embodiment described herein as "exemplary" is not necessarily to be construed as preferred or advantageous over other embodiments.

It is to be understood that the method steps described herein and claimed in the claim below need not necessarily be performed in the order as described. Further, words such as "thereafter," "then," "next," etc., are not intended to limit the order of the steps. These words are simply used to guide the reader through the description of the method steps.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, tablets, portable/personal digital assistants, and other devices that facilitate communication of information between end-users within a network.

The general features and aspects of the present disclosure remain generally consistent regardless of the particular purpose. Further, the features and aspects of the present disclosure may be implemented in system in any suitable fashion, e.g., via the hardware and software configuration of system or using any other suitable software, firmware, and/or hardware. For instance, when implemented via executable instructions, such as the set of instructions, various elements of the present disclosure are in essence the code defining the operations of such various elements. The executable instructions or code may be obtained from a computer-readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media may include any medium that may store or transfer information.

The present disclosure describes a highly integrated grid-connected onboard charger topology capable of G2V, V2G and HV-to-LV charging. In certain embodiments of the present disclosure, the topology includes a bridgeless interleaved boost converter as the PFC stage and a dual-output half-bridge CLLLC resonant converter as the isolated stage. The design of the second stage of the proposed integrated charger is such that. without using additional passive components, the resonant converter takes advantage of the half-bridge capacitors, the leakage inductance and magnetizing inductance of a three-winding electromagnetic integrated transformer (EMIT) to build a resonant network. In comparison to two stand-alone converters, the integrated topology requires fewer components, is smaller in size, and is potentially lower cost. Moreover, the integrated topology provides more operating modes than conventional stand-alone converters.

The embodiments of the present disclosure provide a series of novel power electronic interfaces, which may allow the following:

(a) Innovatively integrate an isolated onboard charger and the auxiliary load dc/dc converter in PEVs, (b) Incorporate a maximum efficiency point tracking controller to substantially enhance charger efficiency not only at full load but also particularly in light loads, (c) Provide charging capability over much wider range of battery voltages (100V-420V), and (d) Provide bidirectional charging, e.g., enabling both grid-to-vehicle (G2V) charging and vehicle-to-grid (V2G) capabilities.

Figure 4:
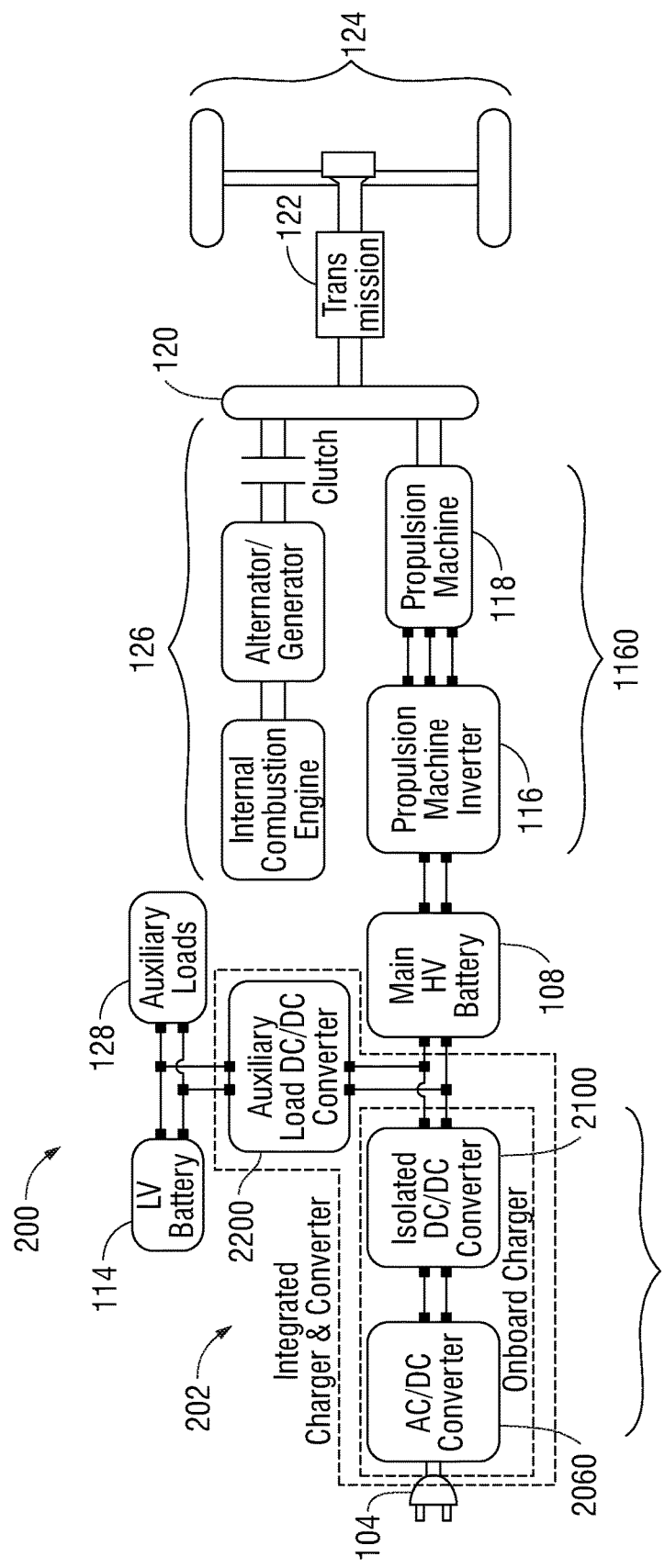
FIG. 4 is a schematic of a parallel PEV powertrain in presence of an onboard charger and auxiliary load dc-dc converter for LV auxiliary loads illustrating the components that are integrated into an onboard charger according to one embodiment of the present disclosure.

FIG. 4 illustrates system 200 that includes an integrated PEV power electronic interface 202 according to embodiments of the present disclosure. As compared to prior art system 100 and power electronic interface 102 in FIG. 1, power electronic interface 202 now includes an onboard charger 206 that includes an AC/DC converter 2060 and an isolated DC/DC converter 2100. The AC/DC converter 2060 is supplied 1-phase alternating current (AC) electrical power by external power supply interface connection 104. The AC/DC converter 2060 is in electrical communication with isolated DC/DC converter 2100.

Integrated power electronic interface 202 further includes auxiliary load DC/DC converter 2200 that is integrated with onboard charger 206 according to embodiments of the present disclosure. The auxiliary load DC/DC converter 2200 may be in electrical communication with LV battery pack 114 (e.g., 12 V or 24 V or 42 V) which supplies LV power to auxiliary loads 128 (e.g., 12 V or 24 V or 42 V) or the auxiliary load DC/DC converter 2200 may be in electrical communication directly with the auxiliary loads 128 without the presence of LV battery pack 114. The embodiments of the present disclosure are not limited with respect to these features.

Figure 5A:
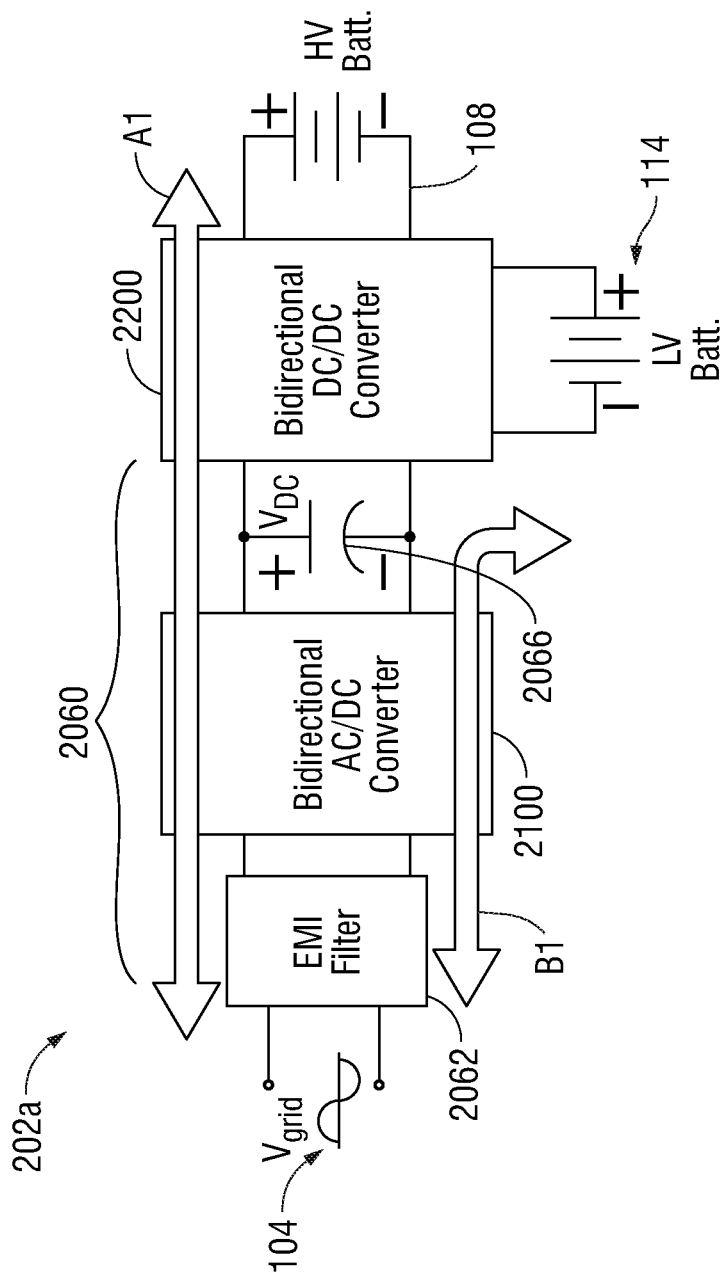
FIG. 5A is a system level diagram of the integrated PEV power electronic interface according to embodiments of the present disclosure.
Figure 5B:
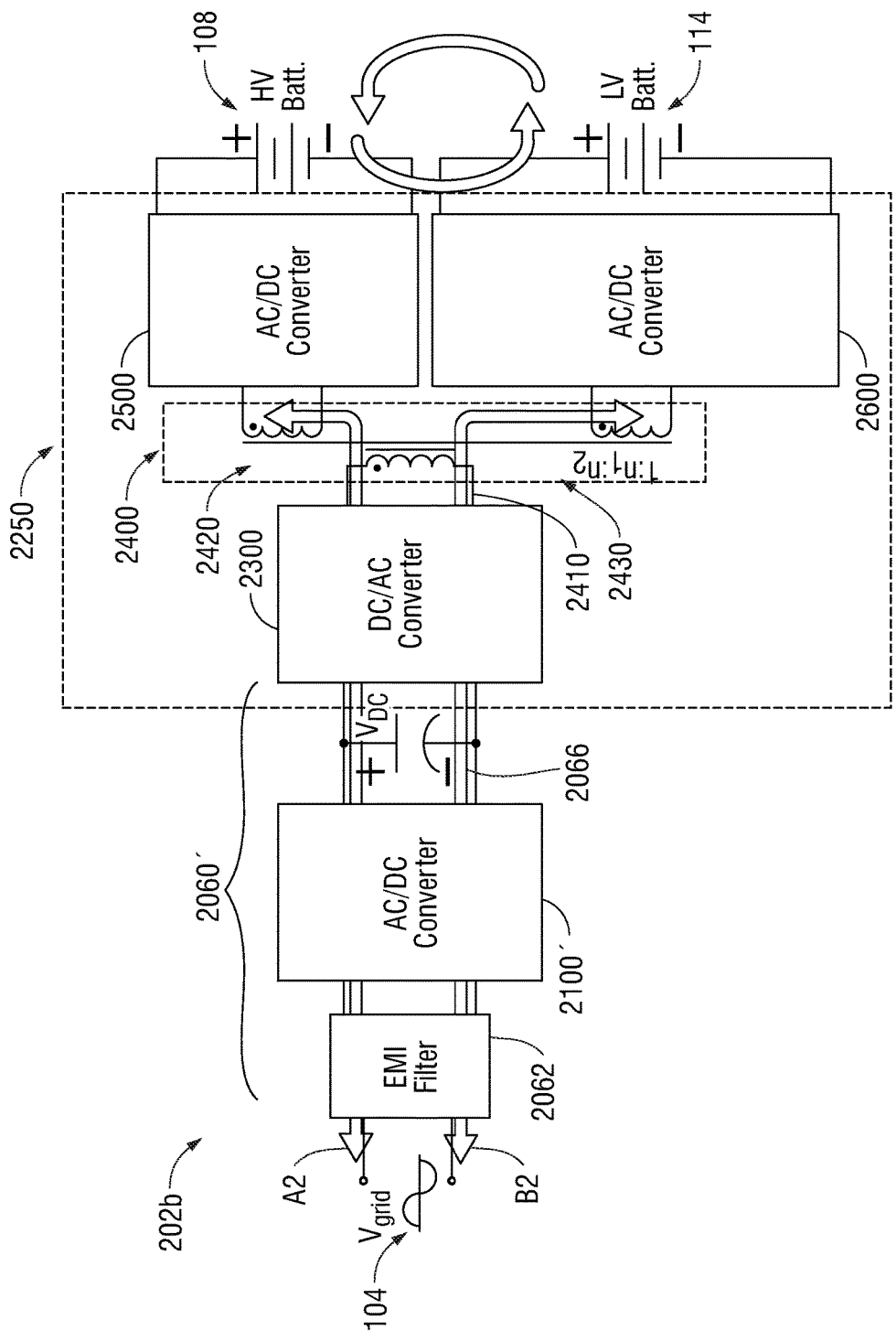
FIG. 5B is another system level diagram of the integrated PEV power electronic interface according to embodiments of the present disclosure.

Referring also to FIGS. 5A and 5B, the integrated PEV interface 202 may be configured as providing either unidirectional electrical power or may be configured as providing bidirectional electrical power.

In the case of bidirectional power as illustrated in FIG. 5A, integrated PEV interface 202a may also include as onboard charger 2060 an electromagnetic interference (EMI) filter 2062 that filters electrical power received from or transmitted to external power supply interface connection 104. In the example of FIG. 5A, EMI filter 2062 is in electrical communication with bidirectional AC/DC converter 2100. Bidirectional AC/DC converter 2100 may also be, in turn, in electrical communication with bidirectional DC/DC converter 2200, as shown by double arrow A1, and with HV battery pack 108, or may be in direct electrical communication with LV battery pack 114, as shown by double arrow B1, thereby bypassing bidirectional DC/DC converter 2200 and HV battery pack 108. In the case of availability of other renewable energy sources such as wind, solar, or fuel cell energy systems, in a similar manner as described with respect to FIG. 4 above, the output of the energy source may sometimes be directly connected to DC-link 2066, which is the stage between bidirectional AC/DC converter 2100 and bidirectional DC/DC converter 2200 and shown by $V_{DC}$, enabling DC charging from the renewable energy source. Therefore, onboard charger 2060 may also include DC-link 2066.

Thus, integrated PEV interface 202a is configured to be capable of the following:

Charging both the main high-voltage (HV) and low-voltage (LV) battery packs 108 and 114, respectively, from the grid (G2V) simultaneously, or charging only the main HV battery pack 108;

Providing power from the vehicle to grid (V2G) through either HV battery pack 108 or LV battery pack 114 or both;

Powering onboard low-voltage loads 128 (see FIG. 4) through high voltage battery pack 108 during propulsion by the electric propulsion system 1160; and Powering the HV battery pack 108 during regenerative braking during propulsion by the ICE propulsion system 126.

In the case of either unidirectional or bidirectional power, as illustrated in FIG. 5B, integrated PEV interface 202b may also include as onboard charger 2060 electromagnetic interference (EMI) filter 2062 that filters electrical power received from or transmitted to external power supply interface connection 104. In a similar manner as with respect to FIG. 5A, in the example of FIG. 5B, EMI filter 2062 is in electrical communication with AC/DC converter 2100'. AC/DC converter 2100' may also be, in turn, in electrical communication with DC/AC converter 2300 that is included within DC/DC converter 2250, as shown by double arrow A2.

DC/AC converter 2300 is, in turn, in electrical communication with HV AC/DC converter 2500 and with HV battery pack 108 via induction windings 2410 and 2420 of electromagnetically integrated transformer (EMIT) 2400, and may be in direct electrical communication with LV AC/DC converter 2600 and LV battery pack 114, as shown by double arrow B2.

Thus, DC/DC converter 2250 includes DC/AC converter 2300, EMIT 2400 and induction windings 2410, 2420, 2430 and HV AC/DC converter 2500 and LV AC/DC converter 2600.

In FIGS. 6-22 which follow, various circuit topologies for the integrated power electronic interface converter structures 202, 202a and 202b are illustrated.

In all these topologies, the first stage, which is the rectification and power factor correction (PFC) stage, may be either a full-bridge or half-bridge diode bridge followed by any dc/dc converter such as a single-leg or an interleaved boost or buck-boost or single-ended primary-inductor converter (SEPIC) converter. Other first stage topologies may include a bidirectional half bridge converter; a bidirectional full bridge converter, a bidirectional totem pole converter; a bidirectional interleaved half-bridge converter; a bidirectional interleaved full-bridge converter; a bridgeless boost PFC converter; an interleaved bridgeless boost PFC converter; a bridgeless interleaved resonant PFC boost converter; a phase shifted semi-bridgeless converter; and any other potential AC/DC bidirectional and unidirectional PFC circuit.

Alternatively, the first stage may be a bridgeless configuration capable of bidirectional AC/DC rectification and power factor correction for G2V operation, as well as DC/AC inversion for V2G operation.

Integration of the charger and the auxiliary load dc/dc converter may be exhibited in the second stage of the charger using a three-winding transformer 2400 via the following:

Configuring a transformer and individual discrete inductors 2401 or

Configuring an electromagnetically integrated transformer (EMIT), e.g., EMIT 2451.

The integration can be configured through these proposed topologies or a combination of them. By combination, the first stage (ac/dc stage) of either topology can be connected to, or in electrical communication with, the second stage (isolated dc/dc stage) of another configuration. That is, the first stage AC/DC converter of the topologies in FIGS. 6-22 may be connected to, or in electrical communication with, the second stage DC/DC converter of the power electronics interfaces disclosed in another of FIGS. 6-22 to result in an integrated power electronic interface according to embodiments of the present disclosure.

It is important to note that the utilized semiconductor components in all of the topologies presented in the present disclosure may be replaced with diodes, MOSFETs, IGBTs and any other unidirectional and bidirectional switching semiconductor devices. Therefore, the embodiments of the present disclosure are directed to both unidirectional and bidirectional topologies.

In all these topologies the DC-link voltage connections 1066 and 2006 may be either fixed or variable enabling the possibilities of (a) maximizing the converter efficiency at light loads; and (b) charging fully depleted batteries (battery trickle mode charging).

In the case of availability of other renewable energy sources such as wind, solar, or fuel cell energy systems, the output of the energy source can potentially be directly connected to DC-link voltage connections 1066 and 2006, enabling DC charging, without a need for additional converter topology.

The PEI interfaces 202 including 202a and 202b may be controlled through either phased shift pulse width modulation (PWM) or pulse frequency modulation (PFM), or other feasible control strategy known or to become known in the art.

Those skilled in the art will recognize that other topologies for the integrated power electronics interface may be configured which fall within the scope of the present disclosure.

Figure 6:
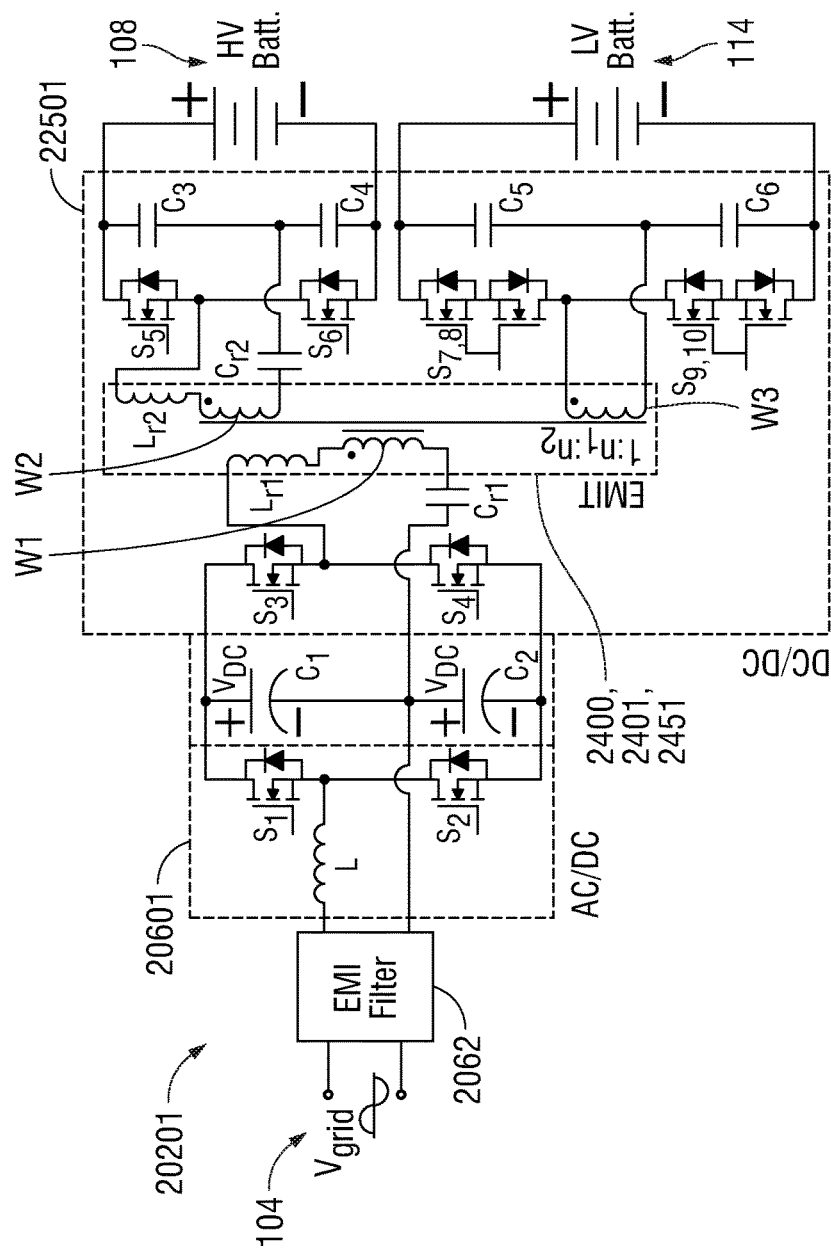
FIG. 6 is a first embodiment of an integrated power electronic interface for a PEV according to one embodiment of the present disclosure.

More particularly, FIG. 6 illustrates one embodiment of an integrated power electronics interface according to the present disclosure, i.e., PEI 20201, wherein the first stage 20601 includes a bidirectional AC/DC half-bridge boost converter (switches S1, S2, inductor L, capacitors C1, C2) that performs rectification and power factor correction (PFC).

The second stage 22501 includes a multi-output resonant DC/DC converter having a three-winding (W1, W2, W3) transformer 2400 for integration of the first stage converter 20601 and the second stage converter 22501. The integrated configuration of PEI 20201 may be achieved via independent three-winding (W1, W2, W3) transformer 2401 and additional resonant inductors (Lr1, Lr2) and resonant conductors Cr1, Cr2 or through an electromagnetically integrated transformer (EMIT) 2451, where the resonant inductors are built into the magnetic structure of the three-winding transformer. The LLC resonant stage is developed using the resonant capacitors (Cr1, Cr2), resonant inductors (Lr1, Lr2) and magnetizing inductance of the transformer 2400. The main HV battery pack 108 interfaces with the transformer

2400 using two switches (S5, S6) and two split capacitors (C3, C4). The LV battery pack or auxiliary load 114 is connected to the third winding W3 of the transformer 2400 either using two individual switches (not shown) or two pairs of back-to-back switches (S7, S8, S9, S10) and two capacitors (C5, C6). (The two individual switches are applied in a similar manner as back to back switches S15 and S16 described below with respect to FIG. 22).

During charging the main HV battery pack 108 from the grid, the two back-to-back switches (S7, S8, S9, S10), which interface the LV battery pack 114, may be either deactivated or both batteries may be cross-regulated and charged simultaneously. During propulsion, the LV battery pack 114 may be charged through HV battery pack 108. During V2G operation, the HV battery pack 108 mainly provides power back to the grid.

Figure 7:
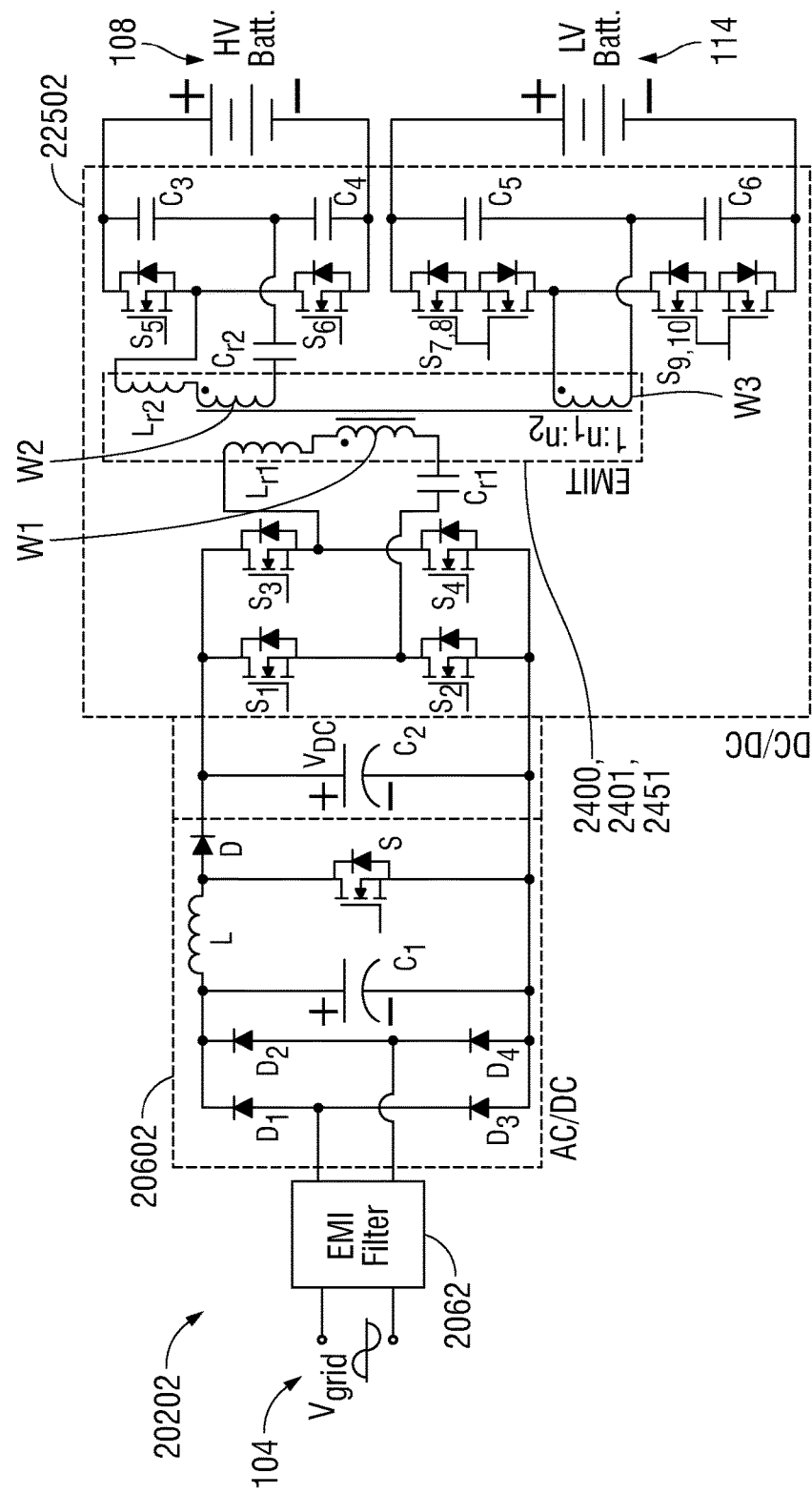
FIG. 7 is a second embodiment of an integrated power electronic interface for a PEV according to one embodiment of the present disclosure.

FIG. 7 illustrates another embodiment of an integrated power electronics interface according to the present disclosure, i.e., PEI 20202, wherein the first stage 20602 includes an AC/DC full-bridge (D1, D2, D3, D4) followed by a single-phase boost converter (S, L, C1, C2, D), which is used for rectification and power factor correction (PFC).

In a similar manner, second stage 22502 includes a multi-output LLC DC/DC converter having three-winding (W1, W2, W3) transformer (2400, 2401, 2402) for integration of two converters. The integrated configuration of PEI 20202 may be achieved via independent three-winding (W1, W2, W3) transformer 2401 and additional resonant inductors (Lr1, Lr2) and resonant conductors Cr1, Cr2 or through electromagnetically integrated transformer (EMIT) 2451, where the resonant inductors are built into the magnetic structure of the three-winding transformer 2400. The LLC resonant stage is developed using the resonant capacitors (Cr1, Cr2), resonant inductors (Lr1, Lr2) and magnetizing inductance of the transformer 2400. The main HV battery pack 108 interfaces with the transformer 2400 via two switches (S5, S6) and two split capacitors (C3, C4). The LV battery or auxiliary load is connected to the third winding of the transformer 2400 either via two individual switches (not shown) or two pairs of back-to-back switches (S7, S8, S9, S10) and two capacitors (C5, C6). (The two individual switches are applied in a similar manner as back to back switches S15 and S16 described below with respect to FIG. 22).

During charging the main HV battery pack 108 from the grid, the two back-to-back switches (S7, S8, S9, S10), which interface the LV battery pack 114, may be either deactivated or both batteries may be cross-regulated and charged simultaneously. During propulsion, the LV battery pack 114 may be charged through HV battery pack 108. During V2G operation the HV battery pack 108 mainly provides power back to the grid.

Figure 8:
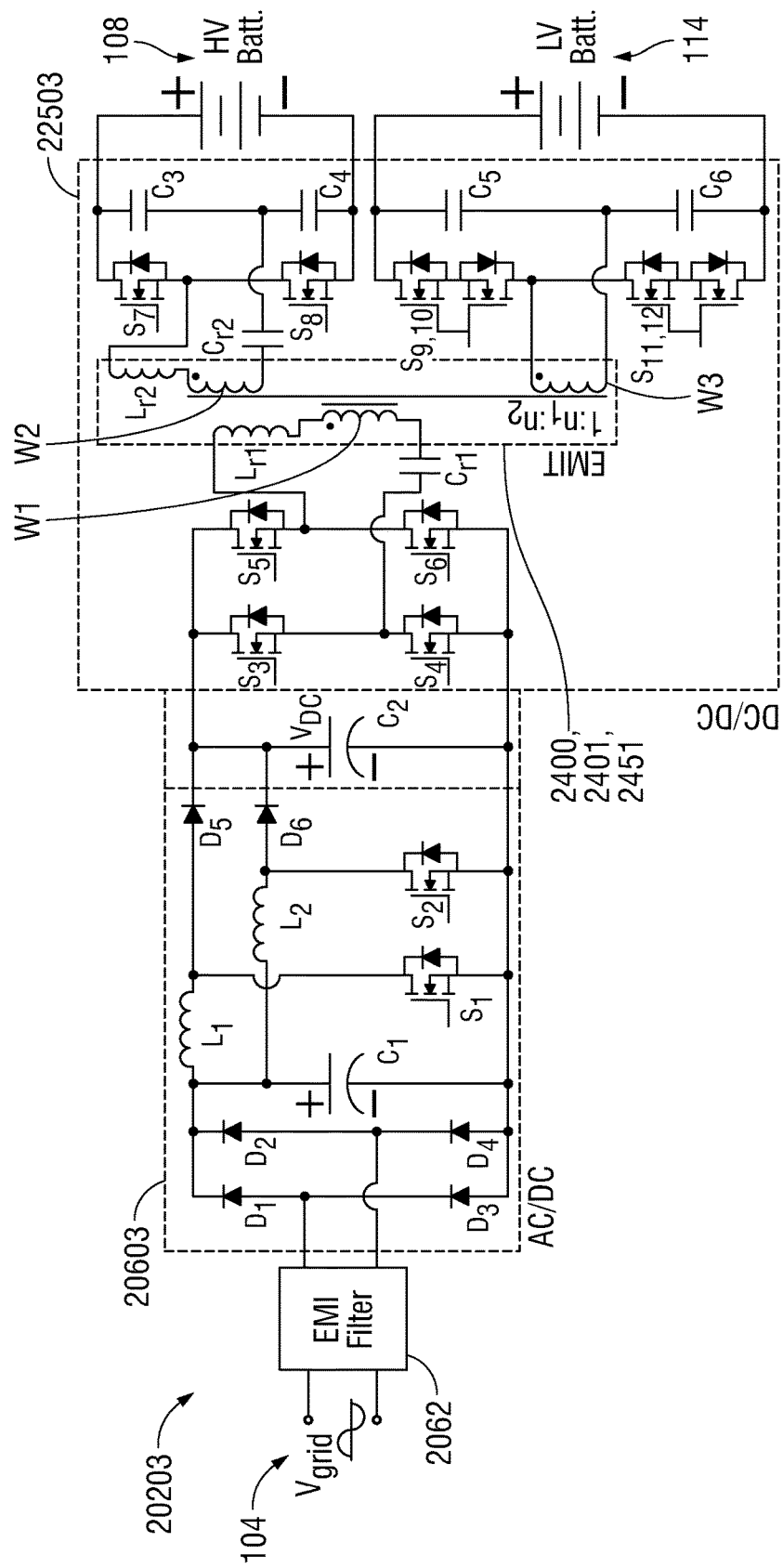
FIG. 8 is a third embodiment of an integrated power electronic interface for a PEV according to one embodiment of the present disclosure.

FIG. 8 illustrates still another embodiment of an integrated power electronics interface according to the present disclosure, i.e., PEI 20203, wherein the first stage 20603 includes a full bridge diode rectifier (D1, D2, D3, D4) followed by an interleaved boost converter (L1, L2, S1, S2, D5, D6) for AC/DC rectification and PFC.

The second stage 22503 includes two DC/DC LLC converters, which share three-winding (W1, W2, W3) transformer 2400. The primary W1 of transformer 2400 includes a full bridge inverter (S3, S4, S5, S6), a resonant capacitor (Cr1) and may further include a resonant inductor (Lr1). Resonant inductor Lr1 may be integrated in the transformer or be an independent inductor. The secondary W2 of transformer 2400, which interfaces the main HV battery pack 108, may include a full bridge rectifier (D7, D8, D9, D10).

The third winding W3, which interfaces the auxiliary loads and/or LV battery pack 114, may also include a full bridge rectifier (D11, D12, D13, D14).

All of the diodes may be replaced with other bidirectional or unidirectional switches, enabling bidirectional or unidirectional power flow, respectively.

Figure 9:
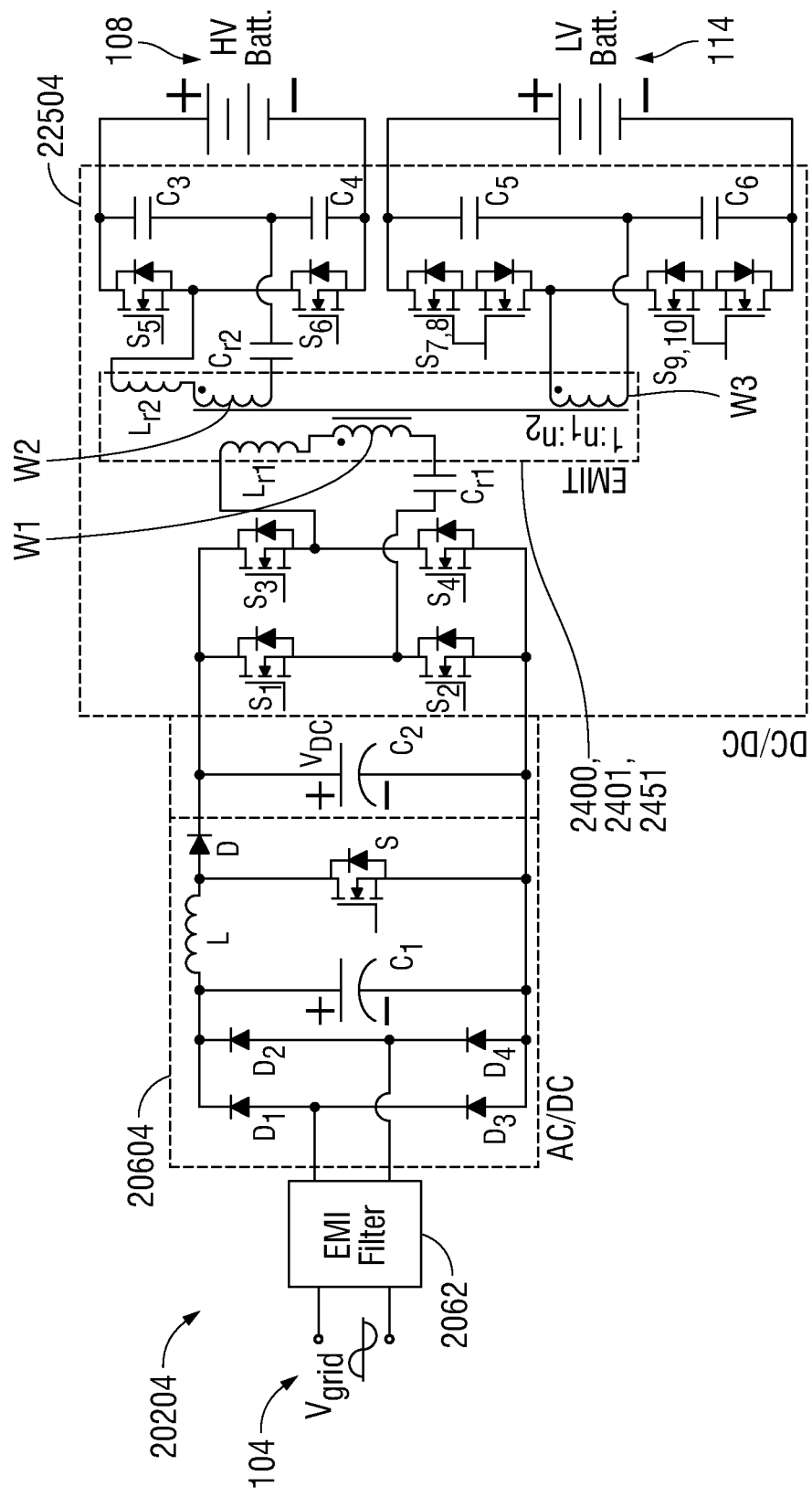
FIG. 9 is a fourth embodiment of an integrated power electronic interface for a PEV according to one embodiment of the present disclosure.

FIG. 9 illustrates yet another embodiment of an integrated power electronics interface according to the present disclosure, i.e., PEI 20204, wherein the first stage 20604 includes a unidirectional AC/DC diode bridge (D1, D2, D3, D4) followed by a single-ended primary-inductor converter (SEPIC), (S, D, L1, L2, C1, C2), which is used for rectification and power factor correction (PFC).

The second stage 22504 includes a multi-output LLC DC/DC converter having three-winding (W1, W2, W3) transformer (2400, 2401, 2402) for integration of two converters. The integrated configuration of PEI 20204 may be achieved via independent three-winding (W1, W2, W3) transformer 2401 and additional resonant inductors (Lr1, Lr2) and resonant conductors Cr1, Cr2 or through an electromagnetically integrated transformer (EMIT) 2451, where the resonant inductors are built into the magnetic structure of the three-winding transformer 2400. The LLC resonant stage is developed via the resonant capacitors (Cr1, Cr2), resonant inductors (Lr1, Lr2) and magnetizing inductance of the transformer 2400. The main HV battery pack 108 interfaces with the transformer 2400 via two switches (S7, S8) and two split capacitors (C3, C4). The LV battery pack or auxiliary load 114 is connected to the third winding W3 of the transformer 2400 either via two individual switches (not shown) or two pairs of back-to-back switches (S7, S8, S9, S10) and two capacitors (C5, C6). (The two individual switches are applied in a similar manner as back to back switches S15 and S16 described below with respect to FIG. 22).

During charging the main HV battery pack 108 from the grid, the two back-to-back switches S11, S12, which interface the LV battery pack 114, may be either deactivated or both batteries may be cross-regulated and charged simultaneously. During propulsion, the LV battery pack 114 may be charged through HV battery pack 108.

In order to enable V2G operation, the diodes D1, D2, D3, D4 in the AC/DC first stage 20604 may be either replaced by bidirectional switches or replaced by two parallel-connected switches.

Figure 10:
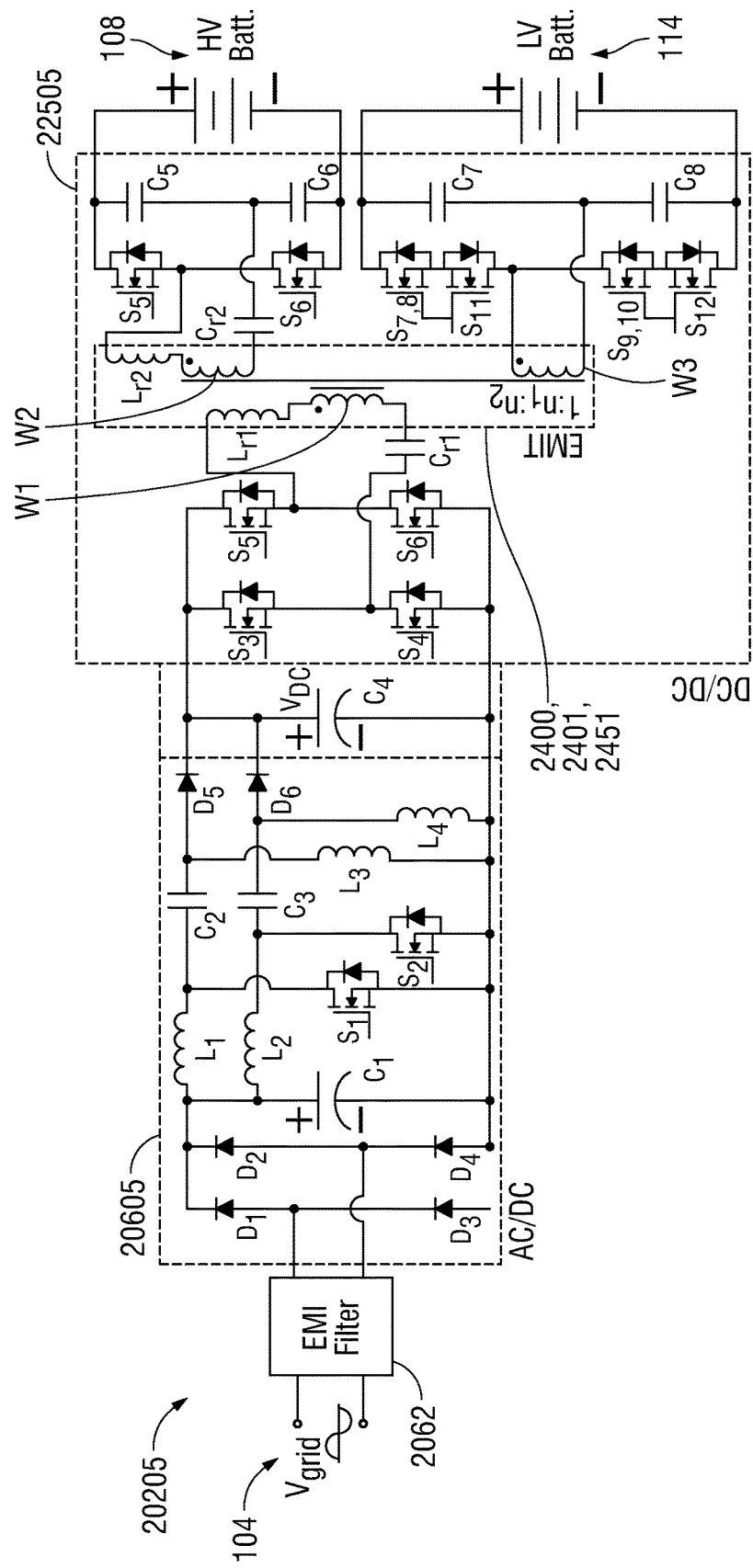
FIG. 10 is a fifth embodiment of an integrated power electronic interface for a PEV according to one embodiment of the present disclosure.

FIG. 10 illustrates still another embodiment of an integrated power electronics interface according to the present disclosure, i.e., PEI 20205, wherein the first stage 20605 includes a unidirectional AC/DC diode bridge (D1, D2, D3, D4) followed by an interleaved single-ended primary-inductor converter (SEPIC), (S1, S2, D5, D6, L1, L2, L3, L4, C1, C2, C3, C4), which is used for rectification and power factor correction (PFC). It should be noted that structure of the SEPIC could be simply extended to account for multiple interleaving legs.

The second stage 22505 includes a multi-output LLC DC/DC converter having three-winding (W1, W2, W3) transformer (2400, 2401, 2451) for integration of two converters. The integrated configuration of PEI 20205 may be achieved via independent three-winding transformer 2401 and additional resonant inductors (Lr1, Lr2) and resonant capacitors Cr1, Cr2 or through an electromagnetically integrated transformer (EMIT) 2451, where the resonant inductors are built into the magnetic structure of the three-winding transformer 2400. The LLC resonant stage is developed via the resonant capacitors (Cr1, Cr2), resonant inductors (Lr1, Lr2) and magnetizing inductance of the transformer 2400.

The main HV battery pack 108 interfaces with the transformer 2400 via two switches (S5, S6) and two split capacitors (C5, C6). The LV battery pack or auxiliary load 114 is connected to the third winding W3 of the transformer either via two individual switches (not shown) or two pairs of back-to-back switches (S7, S8, S9, S10) and two capacitors (C7, C8). (The two individual switches are applied in a similar manner as back to back switches S15 and S16 described below with respect to FIG. 22).

During charging the main HV battery pack 108 from the grid, the two back-to-back switches (not shown), which interface the LV battery, may be either deactivated or both batteries may be cross-regulated and charged simultaneously. During propulsion, the LV battery pack 114 may be charged through HV battery 114.

In order to enable V2G operation, the diodes D1, D2, D3, D4 in the AC/DC first stage 20605 may be either replaced by bidirectional switches or replaced by two parallel-connected switches.

Figure 11:
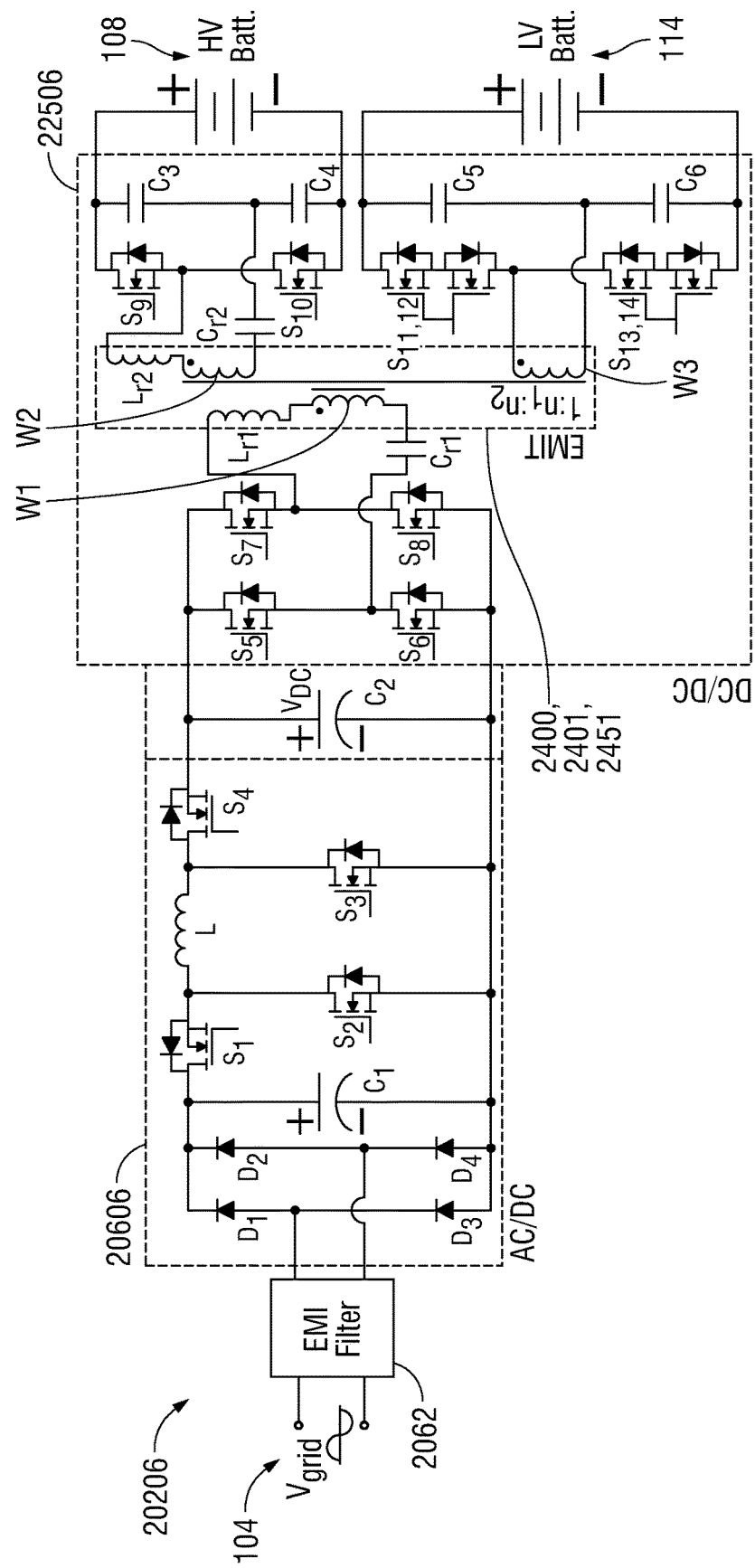
FIG. 11 is a sixth embodiment of an integrated power electronic interface for a PEV according to one embodiment of the present disclosure.

FIG. 11 illustrates another embodiment of an integrated power electronics interface according to the present disclosure, i.e., PEI 20206, wherein the first stage 20606 includes a unidirectional AC/DC diode bridge (D1, D2, D3, D4) followed by a non-inverting buck-boost converter (S1, S2, S3, S4, L, C1, C2), which is used for rectification and power factor correction (PFC).

The second stage 22506 includes a multi-output LLC DC/DC converter having a three-winding (W1, W2, W3) transformer (2400, 2401, 2451) for integration of two converters. The integrated configuration of PEI 20206 may be achieved via independent three-winding (W1, W2, W3) transformer 2401 and additional resonant inductors (Lr1, Lr2) and resonant capacitors Cr1, Cr2 or through an electromagnetically integrated transformer (EMIT) 2451, where the resonant inductors are built into the magnetic structure of the three-winding transformer 2400. The LLC resonant stage is developed via the resonant capacitors (Cr1, Cr2), resonant inductors (Lr1, Lr2) and magnetizing inductance of the transformer 2400. The main HV battery pack 108 interfaces with the transformer 2400 via two switches (S9, S10) and two split capacitors (C3, C4). The LV battery pack or auxiliary load 114 is connected to the third winding W3 of the transformer either via two individual switches (S9, S10) or two pairs of back-to-back switches (S11, S12, S13, S14) and two capacitors (C5, C6).

During charging the main HV battery pack 108 from the grid, the two back-to-back switches (S11, S12, S13, S14), which interface the LV battery pack 114, may be either deactivated or both batteries may be cross-regulated and charged simultaneously. During propulsion, the LV battery pack 114 may be charged through HV battery pack 114.

In order to enable V2G operation, the diodes D1, D2, D3, D4 in the AC/DC FIRST stage 20606 may be either replaced by bidirectional switches or replaced by two parallel-connected switches.

Figure 12:
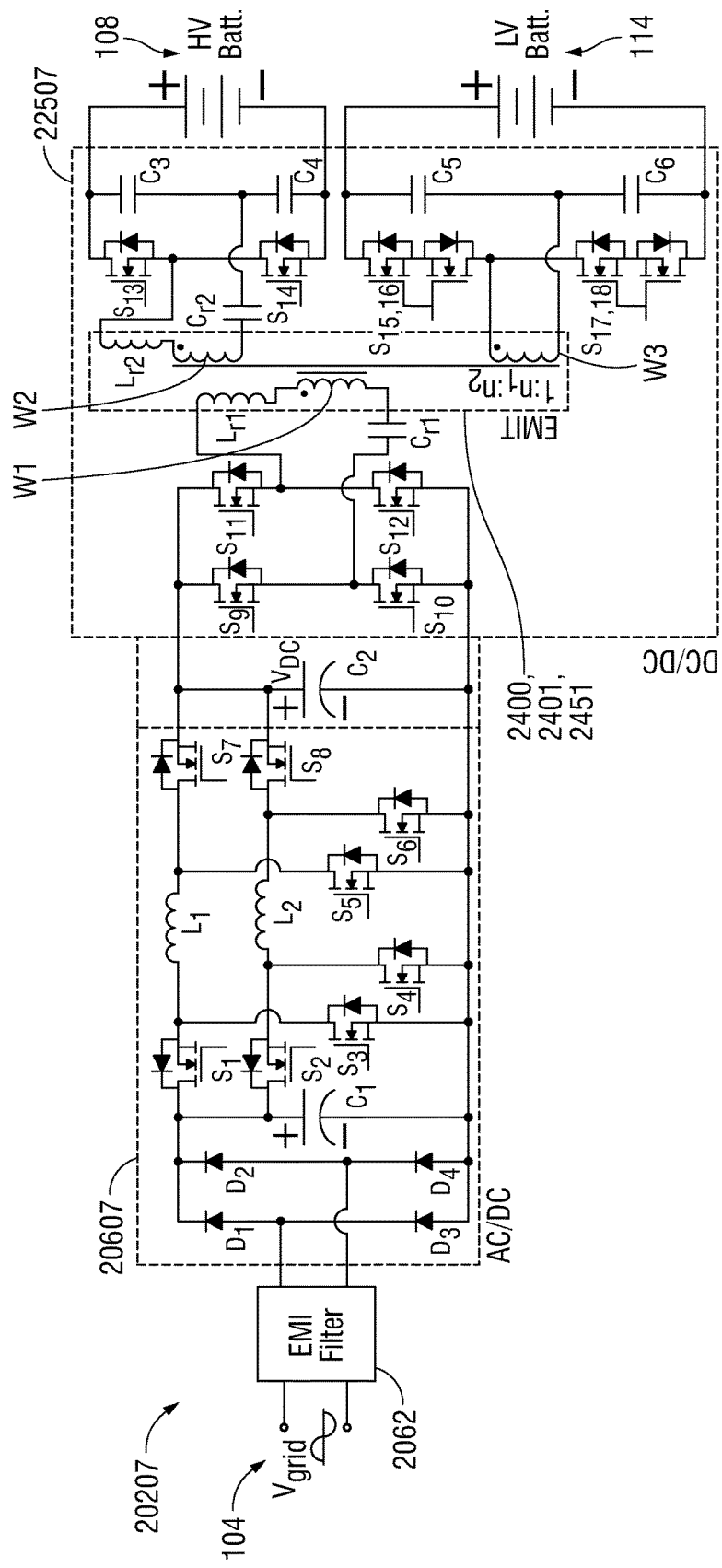
FIG. 12 is a seventh embodiment of an integrated power electronic interface for a PEV according to one embodiment of the present disclosure.

FIG. 12 illustrates another embodiment of an integrated power electronics interface according to the present disclosure, i.e., PEI 20207, wherein the first stage 20607 includes a unidirectional AC/DC diode bridge (D1, D2, D3, D4) followed by a two-leg interleaved non-inverting buck-boost converter (S1, S2, S3, S4, S5, S6, S7, S8, L1, L2, C1, C2), which is used for rectification and power factor correction (PFC). It should be noted that the structure of the two-leg interleaved non-inverting buck-boost converter (S1, S2, S3, S4, S5, S6, S7, S8, L1, L2, C1, C2) could be simply extended to account for multiple interleaving legs.

The second stage 22507 includes a multi-output LLC DC/DC converter having a three-winding W1, W2, W3 transformer 2400, 2401, 2451 for integration of two converters. The integrated configuration of PEI 20207 may be achieved via independent three-winding (W1, W2, W3) transformer 2401 and additional resonant inductors (Lr1, Lr2) and resonant capacitors Cr1, Cr2 or through electromagnetically integrated transformer (EMIT) 2451, where the resonant inductors are built into the magnetic structure of the three-winding transformer 2400. The LLC resonant stage is developed via the resonant capacitors (Cr1, Cr2), resonant inductors (Lr1, Lr2) and magnetizing inductance of the transformer 2400. The main HV battery pack 108 interfaces with the transformer 2400 via two switches (S13, S14) and two split capacitors (C3, C4). The LV battery pack or auxiliary load 114 is connected to the third winding W3 of the transformer either via two individual switches (not shown) or two pairs of back-to-back switches (S15, S16, S17, S18) and two capacitors (C5, C6). (The two individual switches are applied in a similar manner as back to back switches S15 and S16 described below with respect to FIG. 22).

During charging the main HV battery 108 from the grid, the two back-to-back switches which interface the LV battery back 114, may be either deactivated or both batteries may be cross-regulated and charged simultaneously. During propulsion, the LV battery pack 114 may be charged through HV battery pack 108.

In order to enable V2G operation, the diodes D1, D2, D3, D4 in the AC/DC first stage 20607 may be either replaced by bidirectional switches or replaced by two parallel-connected switches.

Figure 13:
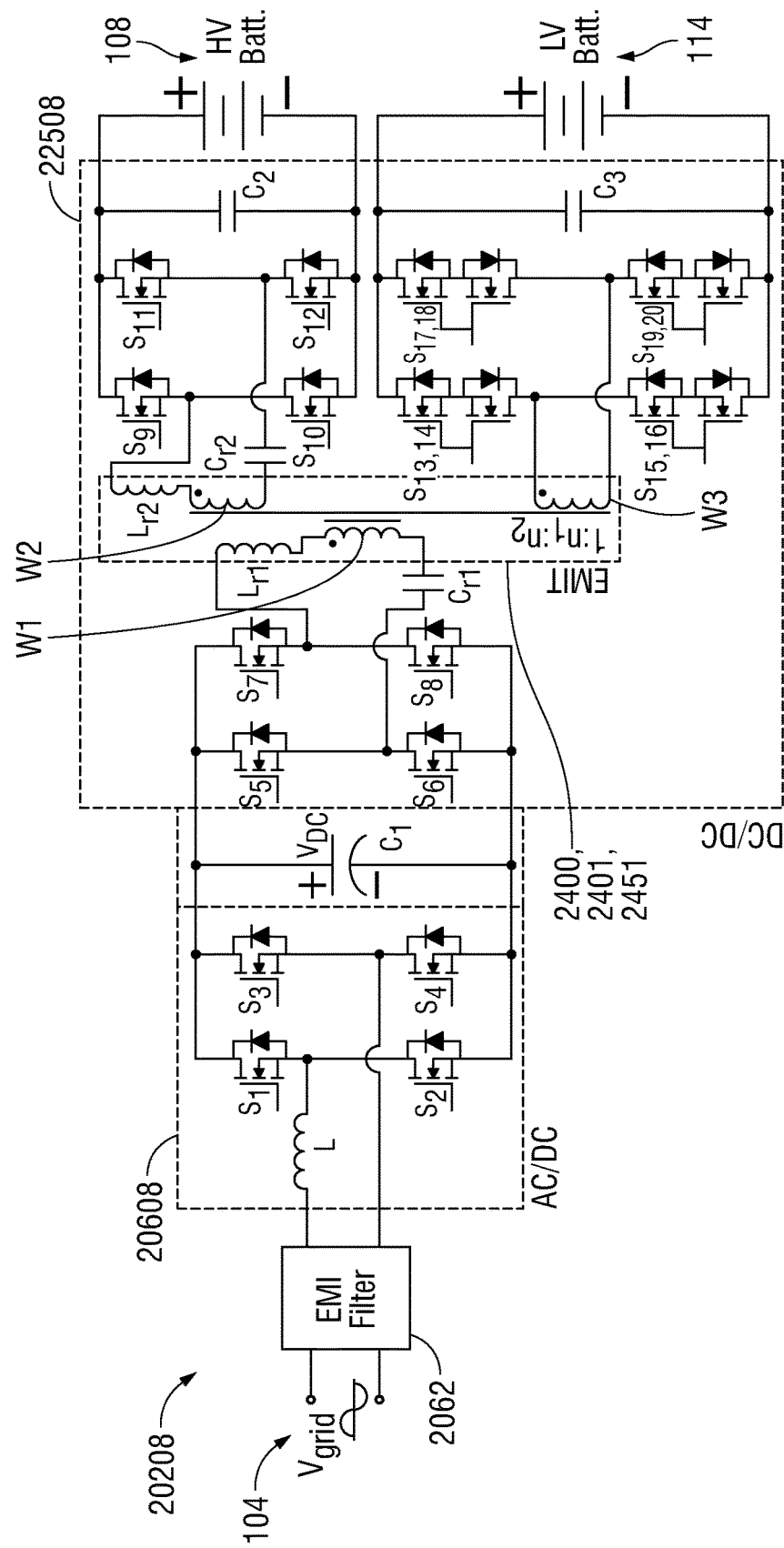
FIG. 13 is an eighth embodiment of an integrated power electronic interface for a PEV according to one embodiment of the present disclosure.

FIG. 13 illustrates another embodiment of an integrated power electronics interface according to the present disclosure, i.e., PEI 20208, wherein the first stage 20608 includes a bidirectional AC/DC full-bridge boost converter (S1, S2, S3, S4, L, C1), which is used for rectification and power factor correction (PFC).

The second stage 22508 includes a multi-output LLC DC/DC converter having three-winding transformer for integration of two converters. The integrated configuration of PEI 20208 may be achieved via independent three-winding (W1, W2, W3) transformer 2401 and additional resonant inductors (Lr1, Lr2) and resonant capacitors Cr1, Cr2 or through electromagnetically integrated transformer (EMIT) 2451, where the resonant inductors are built into the magnetic structure of the three-winding transformer 2400. The LLC resonant stage is developed via the resonant capacitors (Cr1, Cr2), resonant inductors (Lr1, Lr2) and magnetizing inductance of the transformer 2440. The main HV battery pack 108 interfaces with the transformer 2400 via four switches (S9, S10, S11, S12) and a capacitor (C2). The LV battery pack or auxiliary load 114 is connected to the third winding W3 of the transformer either via two individual switches (not shown) or two pairs of pairs of back-to-back switches in a full bridge structure (S13, S14, S15, S16, S17, S18, S19, S20) and a capacitor (C3). (The two individual switches are applied in a similar manner as back to back switches S15 and S16 described below with respect to FIG. 22).

During charging the main HV battery pack 108 from the grid, the two back-to-back switches (not shown), which interface the LV battery pack 114, may be either deactivated or both batteries may be cross-regulated and charged simultaneously. During propulsion, the LV battery pack 114 may be charged through HV battery pack 108. During V2G operation, the HV battery pack 108 mainly provides power back to the grid.

Figure 14:
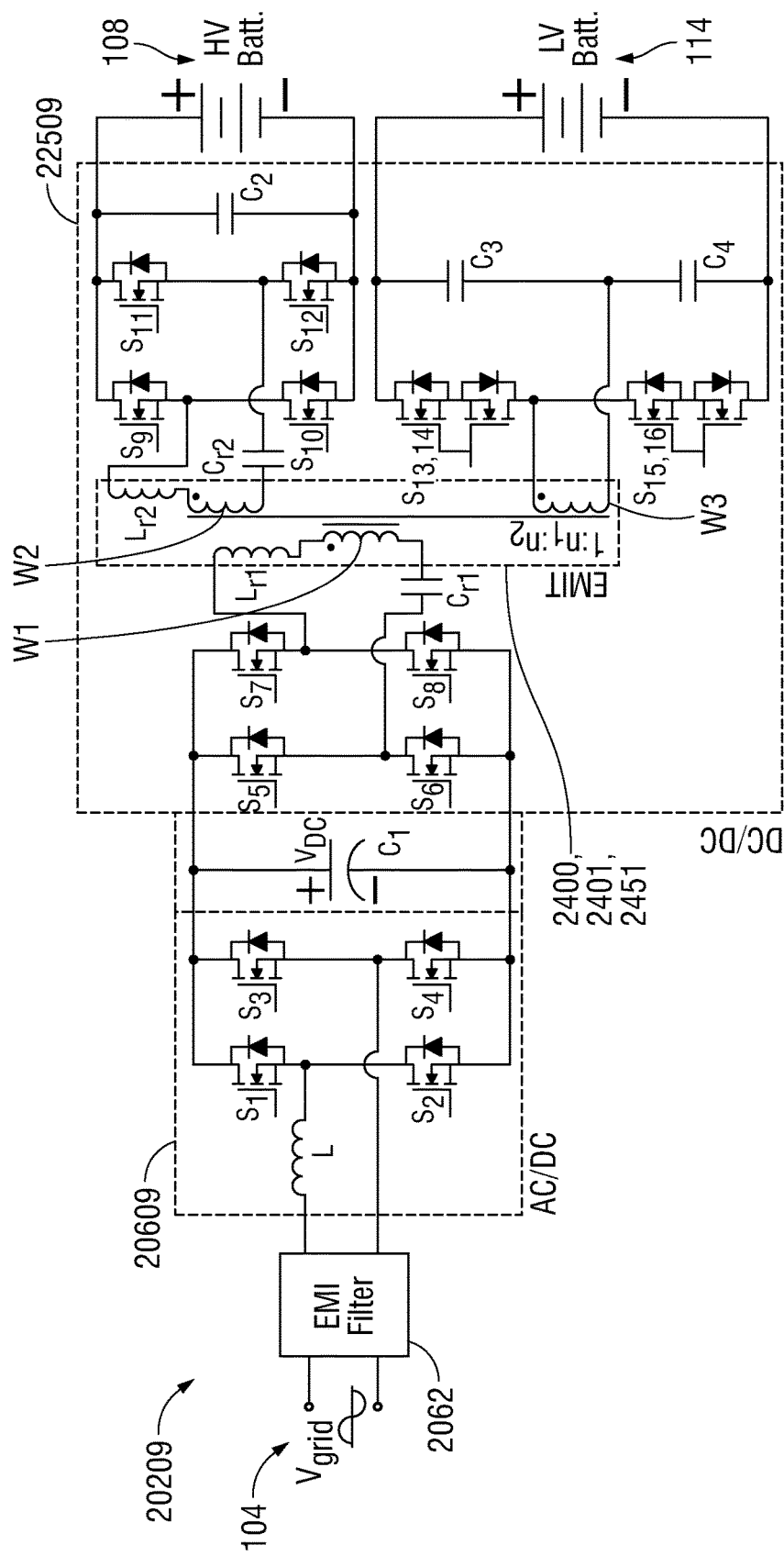
FIG. 14 is a ninth embodiment of an integrated power electronic interface for a PEV according to one embodiment of the present disclosure.

FIG. 14 illustrates still another embodiment of an integrated power electronics interface according to the present disclosure, i.e., PEI 20209, wherein the first stage 20609 includes a bidirectional AC/DC full-bridge boost converter (S1, S2, S3, S4, L, C1), which is used for rectification and power factor correction (PFC).

The second stage 22509 includes a multi-output LLC DC/DC converter having three-winding (W1, W2, W3) transformer 2400, 2401, 2451 for integration of two converters. The integrated configuration of PEI 20209 may be achieved via independent three-winding transformer 2401 and additional resonant inductors (Lr1, Lr2) and resonant capacitor Cr or through electromagnetically integrated transformer (EMIT) 2451, where the resonant inductors are built into the magnetic structure of the three-winding transformer 2400. The LLC resonant stage is developed via the resonant capacitors (Cr1, Cr2), resonant inductors (Lr1, Lr2) and magnetizing inductance of the transformer 2400. The main HV battery pack 108 interfaces with the transformer 2400 via four switches (S9, S10, S11, S12) and a capacitor (C2). The LV battery pack or auxiliary load 114 is connected to the third winding W3 of the transformer either via two individual switches (not shown) or two pairs of back-to-back switches (S13, S14, S15, S16) and two capacitors (C3, C4).

During charging the main HV battery pack 108 from the grid, the two back-to-back switches (not shown), which interface the LV battery pack 114, may be either deactivated or both batteries may be cross-regulated and charged simultaneously. During propulsion, the LV battery pack 114 may be charged through HV battery pack 108. During V2G operation the HV battery pack 108 mainly provides power back to the grid.

Figure 15:
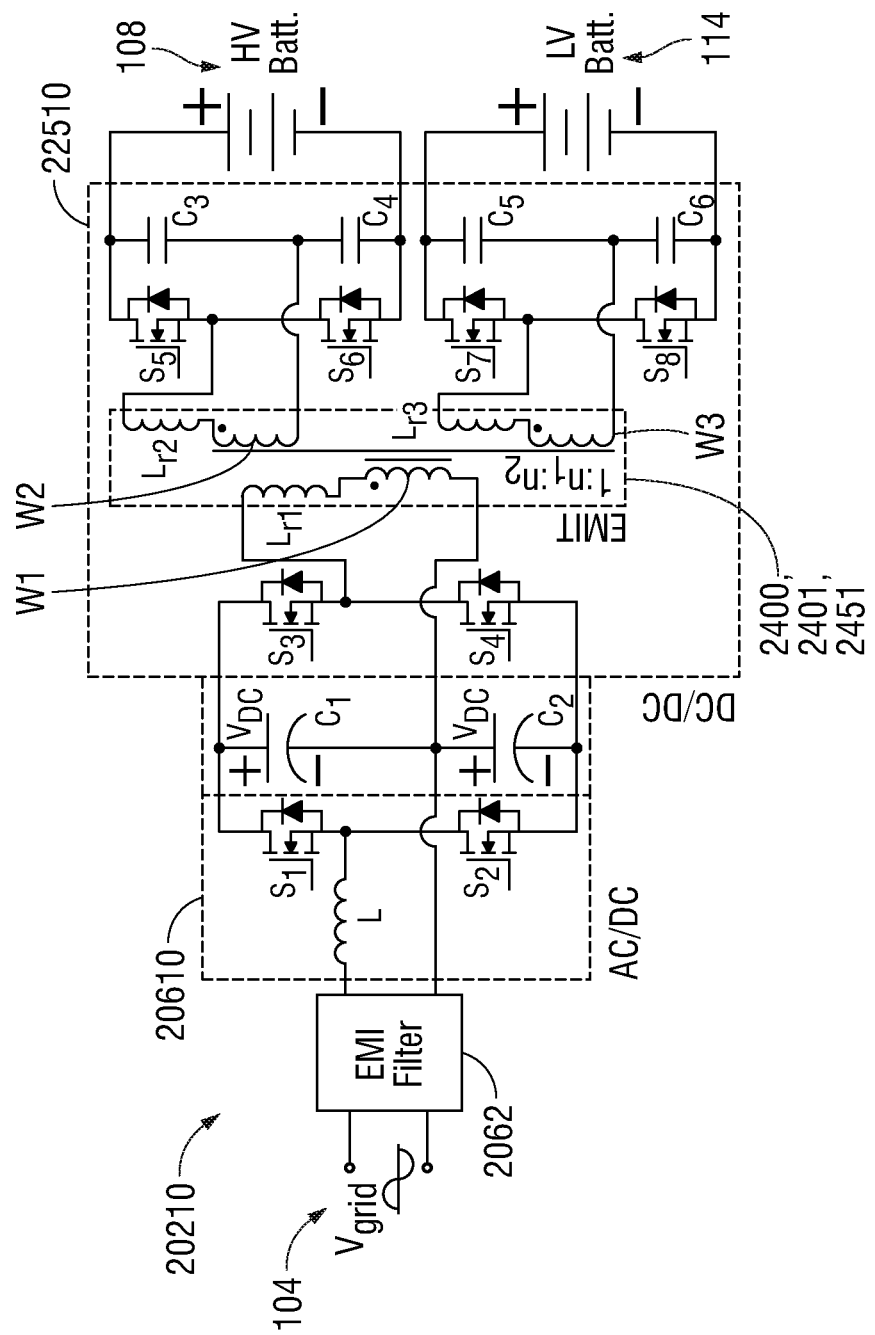
FIG. 15 is a tenth embodiment of an integrated power electronic interface for a PEV according to one embodiment of the present disclosure.

FIG. 15 illustrates yet another embodiment of an integrated power electronics interface according to the present disclosure, i.e., PEI 20210, wherein the first stage 20610 includes a bidirectional AC/DC half-bridge boost converter (S1, S2, L, C1, C2), which is used for rectification and power factor correction (PFC).

The second stage 22510 includes a multi-output DC/DC converter having three-winding (W1, W2, W3) transformer 2400, 2401, 2451 for integration of two converters. The integrated configuration of PEI 20210 may be achieved via independent three-winding (W1, W2, W3) transformer 2401 and additional resonant inductors (Lr1, Lr2, Lr3) or through electromagnetically integrated transformer (EMIT) 2451, where the resonant inductors are built into the magnetic structure of the three-winding transformer. The main HV battery pack 108 interfaces with the transformer via two switches (S5, S6) and two capacitors (C3, C4). The LV battery pack or auxiliary load is connected to the third winding of the transformer either via two individual switches (S7, S8) or two pairs of back-to-back switches and two capacitors (C5, C6).

During charging the main HV battery pack 108 from the grid, the two back-to-back switches (not shown), which interface the LV battery pack 114, may be either deactivated or both batteries may be cross-regulated and charged simultaneously. During propulsion, the LV battery pack 114 may be charged through HV battery pack 108. During V2G operation the HV battery pack 108 mainly provides power back to the grid. (The two back-to-back switches are applied in a similar manner as back to back switches S15 and S16 described below with respect to FIG. 22).

Figure 16:
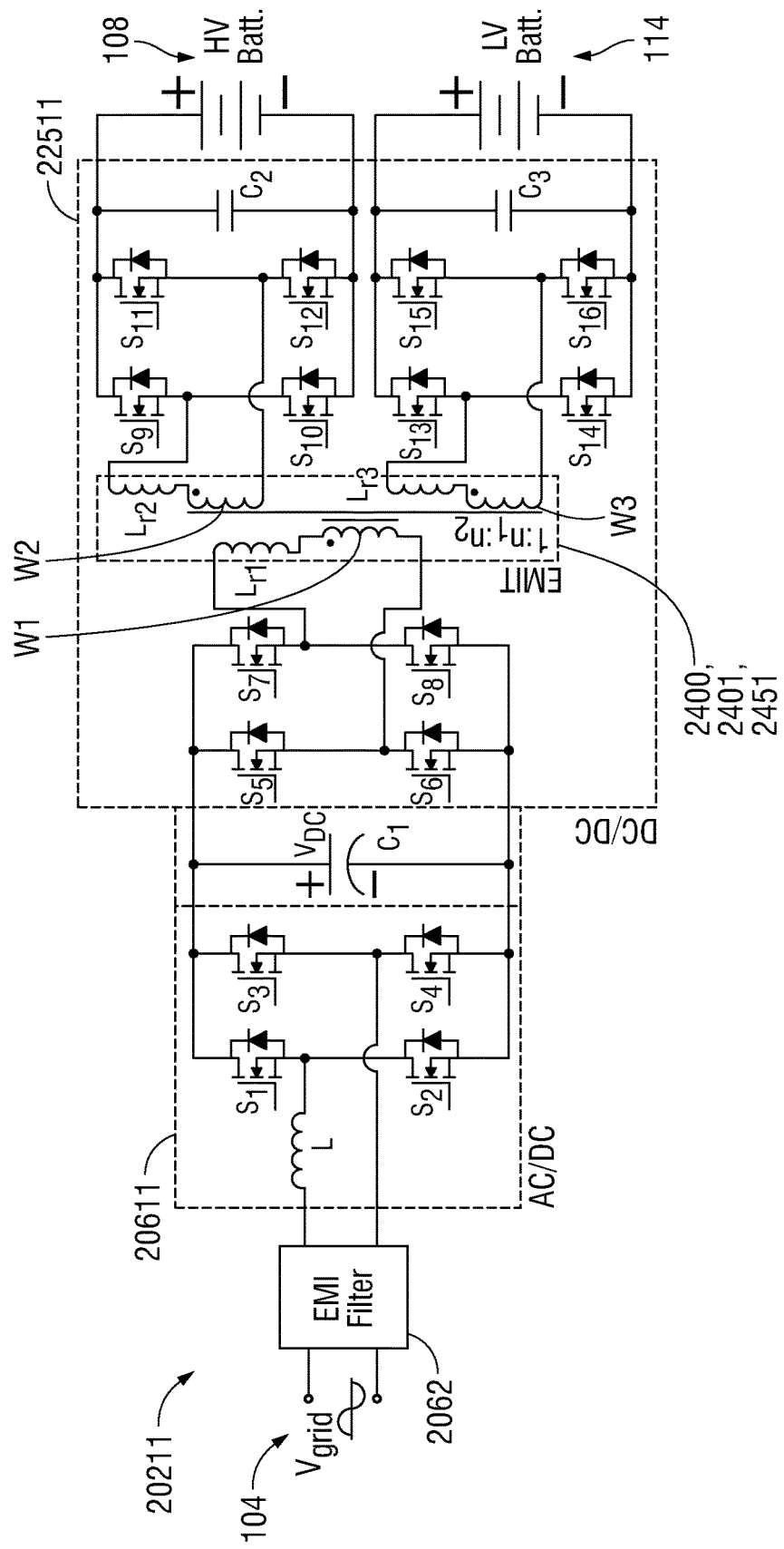
FIG. 16 is an eleventh embodiment of an integrated power electronic interface for a PEV according to one embodiment of the present disclosure.

FIG. 16 illustrates an embodiment of an integrated power electronics interface according to the present disclosure, i.e., PEI 20211, wherein the first stage 20611 includes a bidirectional AC/DC full-bridge boost converter (S1, S2, S3, S4, L, C1), which is used for rectification and power factor correction (PFC).

The second stage 22511 includes a multi-output DC/DC converter having three-winding (W1, W2, W3) transformer 2400, 2401, 2451 for integration of two converters. The integrated configuration of PEI 20211 may be achieved via independent three-winding (W1, W2, W3) transformer 2401 and additional resonant inductors (Lr1, Lr2, Lr3???) or through electromagnetically integrated transformer (EMIT) 2451, where the resonant inductors are built into the magnetic structure of the three-winding transformer 2400. The main HV battery pack 108 may interface with the transformer via full switches (S9, S10, S11, S12) and a capacitor (C2). The LV battery pack or auxiliary load 114 may be connected to the third winding W1 of the transformer either via four switches (S13, S14, S15, S16) or two pairs of back-to-back switches (not shown) and a capacitor (C3). (The two pairs of back-to-back switches are applied in a similar manner as back to back switches S15 and S16 described below with respect to FIG. 22).

During charging the main HV battery pack 108 from the grid, the two back-to-back switches (not shown), which interface the LV battery pack 114, may be either deactivated or both batteries may be cross-regulated and charged simultaneously. During propulsion, the LV battery pack 114 may be charged through HV battery pack 108. During V2G operation the HV battery pack 108 mainly provides power back to the grid.

Figure 17:
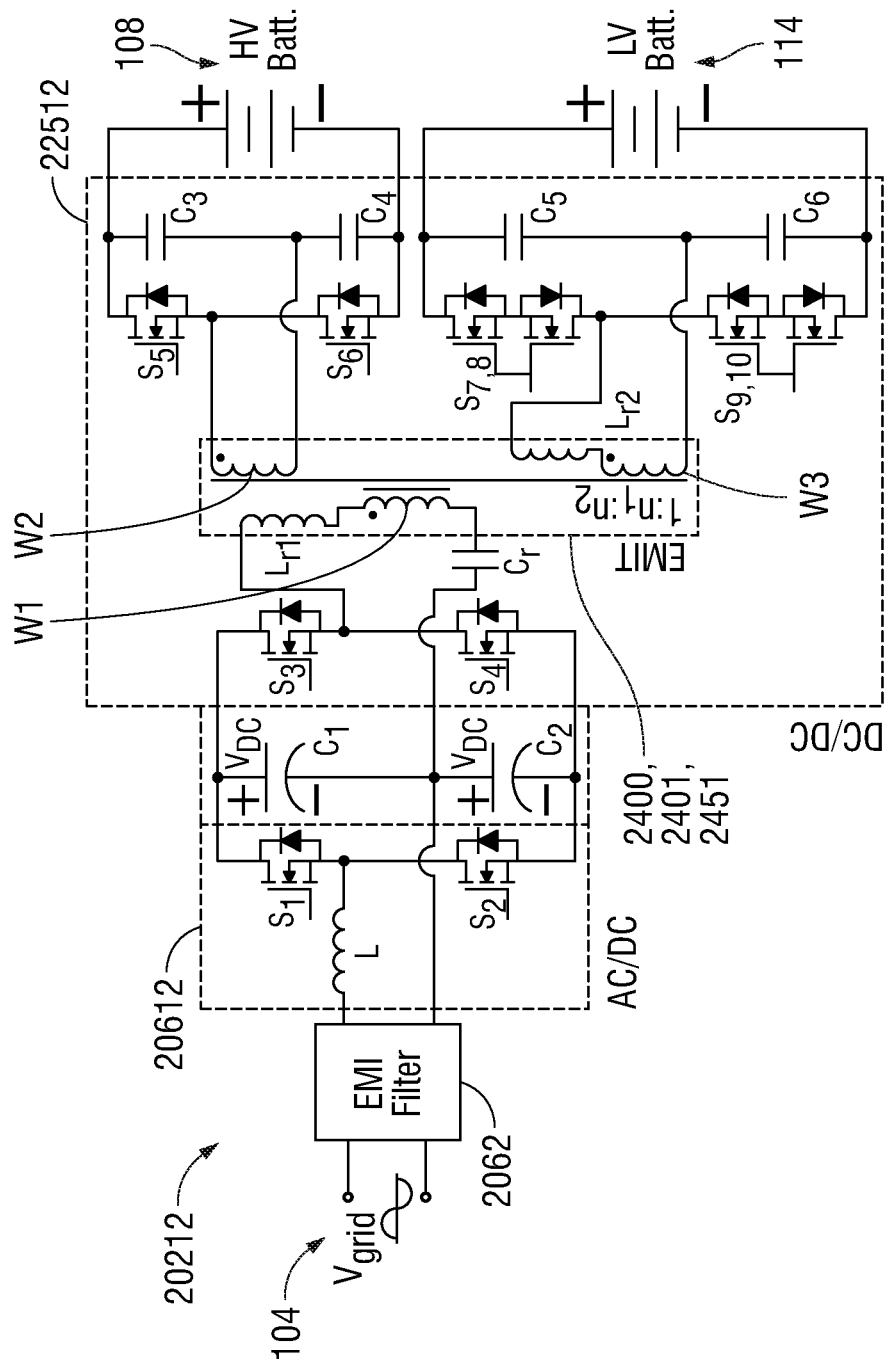
FIG. 17 is a twelfth embodiment of an integrated power electronic interface for a PEV according to one embodiment of the present disclosure.

FIG. 17 illustrates an embodiment of an integrated power electronics interface according to the present disclosure, i.e., PEI 20212, wherein the first stage 20612a bidirectional AC/DC half-bridge boost converter (S1, S2, L, C1, C2), which is used for rectification and power factor correction (PFC).

The second stage 22512 includes a resonant multi-output DC/DC converter having three-winding (W1, W2, W3) transformer 2400, 2401, 2451 for integration of two converters. The integrated configuration of PEI 20212 may be achieved via independent three-winding transformer 2401 and additional resonant inductors (Lr1, Lr2) or through electromagnetically integrated transformer (EMIT) 2451, where the resonant inductors are built into the magnetic structure of the three-winding transformer 2400. Capacitor Cr and inductors Lr1, Lr2, and the magnetizing inductance of the transformer form a resonant tank circuit which stores the energy oscillating at the resonant frequency. The main HV battery pack 108 may interface with the transformer via full switches (S5, S6) and two capacitors (C3, C4). The LV battery pack or auxiliary load 114 may be connected to the third winding W1 of the transformer either via two switches (not shown) or two pairs of back-to-back switches (S7, S8, S9, S10) and two capacitors (C5, C6).

During charging the main HV battery through grid, the two back-to-back switches, which interface the LV battery, may be either deactivated or both batteries may be cross-regulated and charged simultaneously. During propulsion, the LV battery may be charged through HV battery. During V2G operation the HV battery will mainly provide power back to the grid.

Figure 18:
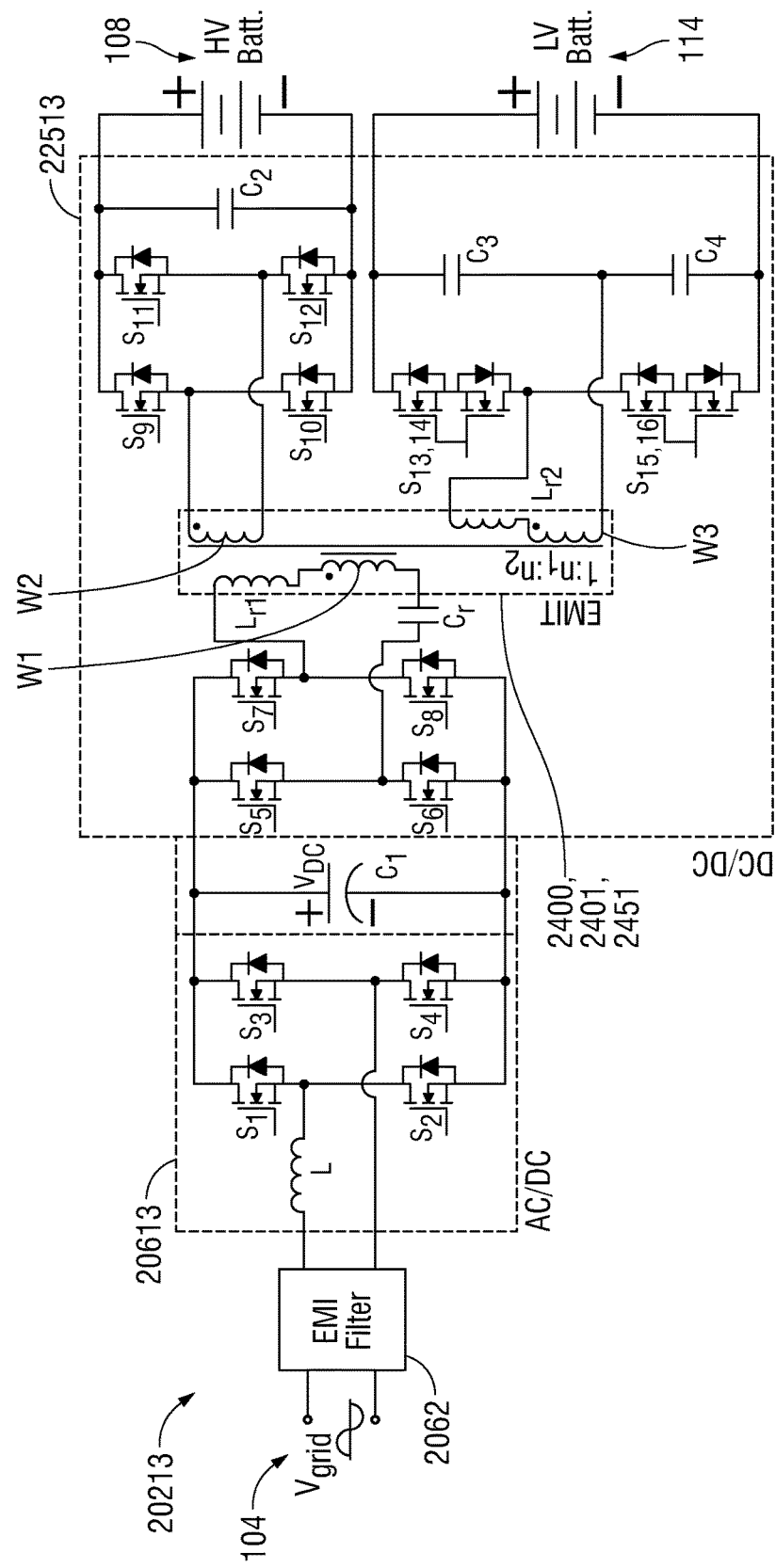
FIG. 18 is a thirteenth embodiment of an integrated power electronic interface for a PEV according to one embodiment of the present disclosure.

FIG. 18 illustrates another embodiment of an integrated power electronics interface according to the present disclosure, i.e., PEI 20213, wherein the first stage 20613 includes a bidirectional AC/DC full-bridge boost converter (S1, S2, S3, S4, L, C1), which is used for rectification and power factor correction (PFC).

The second stage 22513 includes a resonant multi-output DC/DC converter having three-winding (W1, W2, W3) transformer 2400, 2401, 2451 for integration of two converters. The integrated configuration of PEI 20213 may be achieved via independent three-winding transformer 2401 and additional resonant inductors (Lr1, Lr2) and resonant capacitor Cr or through electromagnetically integrated transformer (EMIT) 2451, where the resonant inductors are built into the magnetic structure of the three-winding transformer 2400. Capacitor Cr and inductors Lr1, Lr2, and the magnetizing inductance of the transformer form a resonant tank circuit which stores the energy oscillating at the resonant frequency. The main HV battery pack 108 may interface with the transformer 2400 via full switches (S9, S10, S11, S12) and a capacitor (C2). The LV battery pack or auxiliary load 114 may be connected to the third winding W1 of the transformer 2400 either via two switches (not shown) or two pairs of back-to-back switches (S13, S14, S15, S16) and two capacitors (C3, C4). (The two switches are applied in a similar manner as back to back switches S15 and S16 described below with respect to FIG. 22).

During charging the main HV battery pack 108 from the grid, the two back-to-back switches (not shown), which interface the LV battery pack 114, may be either deactivated or both batteries may be cross-regulated and charged simultaneously. During propulsion, the LV battery pack 114 may be charged through HV battery pack 108. During V2G operation, the HV battery pack 108 mainly provides power back to the grid.

Figure 19:
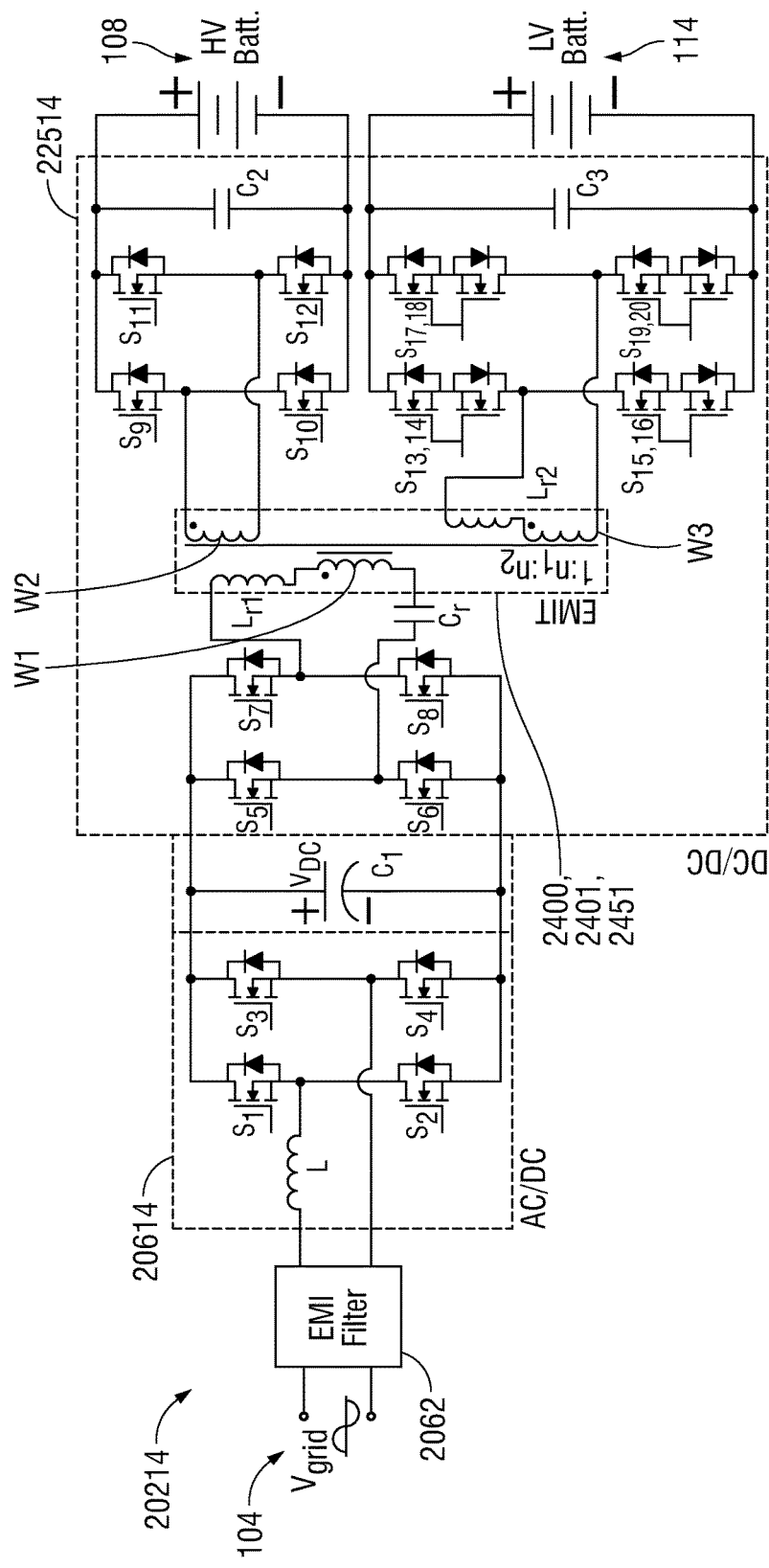
FIG. 19 is a fourteenth embodiment of an integrated power electronic interface for a PEV according to one embodiment of the present disclosure.

FIG. 19 illustrates yet another embodiment of an integrated power electronics interface according to the present disclosure, i.e., PEI 20214, wherein the first stage 20614 includes a bidirectional AC/DC full-bridge boost converter (S1, S2, S3, S4, L, C1), which is used for rectification and power factor correction (PFC).

The second stage 20614 includes a resonant multi-output DC/DC converter having three-winding (W1, W2, W3) transformer 2400, 2401, 2451 for integration of two converters. The integrated configuration of PEI 20214 may be achieved via independent three-winding transformer 2401 and additional resonant inductors (Lr1, Lr2) and resonant capacitor Cr or through electromagnetically integrated transformer (EMIT) 2451, where the resonant inductors are built into the magnetic structure of the three-winding transformer 2400. Capacitor Cr and inductors Lr1, Lr2, and the magnetizing inductance of the transformer form a resonant tank circuit which stores the energy oscillating at the resonant frequency. The main HV battery pack 108 may interface with the transformer 2401 via full switches (S9, S10, S11, S12) and a capacitor (C2). The LV battery pack or auxiliary load 114 may be connected to the third winding W3 of the transformer via four pairs of back-to-back switches (S13, S14, S15, S16, S17, S18, S19, S20) and a capacitor (C3). (The two back-to-back switches are applied in a similar manner as back to back switches S15 and S16 described below with respect to FIG. 22).

During charging the main HV battery pack 108 from the grid, the two back-to-back switches (not shown), which interface the LV battery pack 114, may be either deactivated or both batteries may be cross-regulated and charged simultaneously. During propulsion, the LV battery pack 114 may be charged through HV battery back 108. During V2G operation, the HV battery pack 108 mainly provides power back to the grid.

Figure 20:
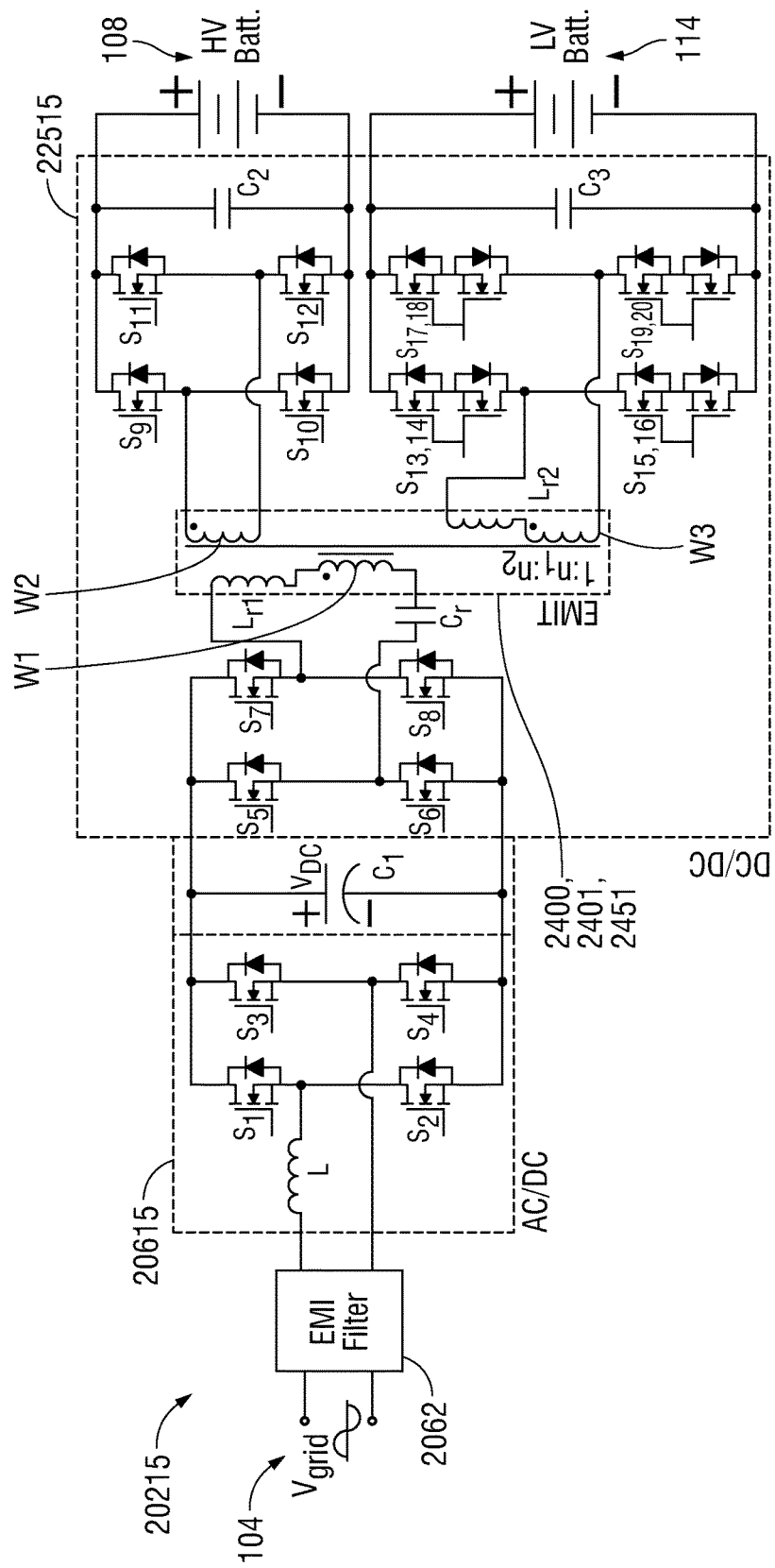
FIG. 20 is a fifteenth embodiment of an integrated power electronic interface for a PEV according to one embodiment of the present disclosure.

FIG. 20 illustrates yet another embodiment of an integrated power electronics interface according to the present disclosure, i.e., PEI 20215, wherein the first stage 20615 includes a bidirectional AC/DC half-bridge boost converter (S1, S2, L, C1, C2), which is used for rectification and power factor correction (PFC).

The second stage 22515 includes a resonant multi-output DC/DC converter having three-winding (W1, W2, W3) transformer 2400, 2401, 2451 for integration of two converters. The integrated configuration of PEI 20215 may be achieved via independent three-winding transformer 2401 and additional resonant inductors (Lr1, Lr2) and resonant capacitor Cr or through electromagnetically integrated transformer (EMIT) 2451, where the resonant inductors are built into the magnetic structure of the three-winding transformer 2400. Capacitor Cr and inductors Lr1, Lr2, and the magnetizing inductance of the transformer form a resonant tank circuit which stores the energy oscillating at the resonant frequency. The main HV battery pack 108 may interface with the transformer 2401 via full switches (S5, S6) and two capacitors (C3, C4). The LV battery pack or auxiliary load 114 may be connected to the third winding W3 of the transformer via two switches (S7, S8) and two capacitors (C5, C6) followed by a bidirectional buck converter (S9, S10, L2).

During charging the main HV battery pack 108 from the grid, the two back-to-back switches, which interface the LV battery, may be either deactivated or both batteries may be cross-regulated and charged simultaneously. During propulsion, the LV battery pack 114 may be charged through HV battery 108. During V2G operation, the HV battery pack mainly provides power back to the grid.

Figure 21:
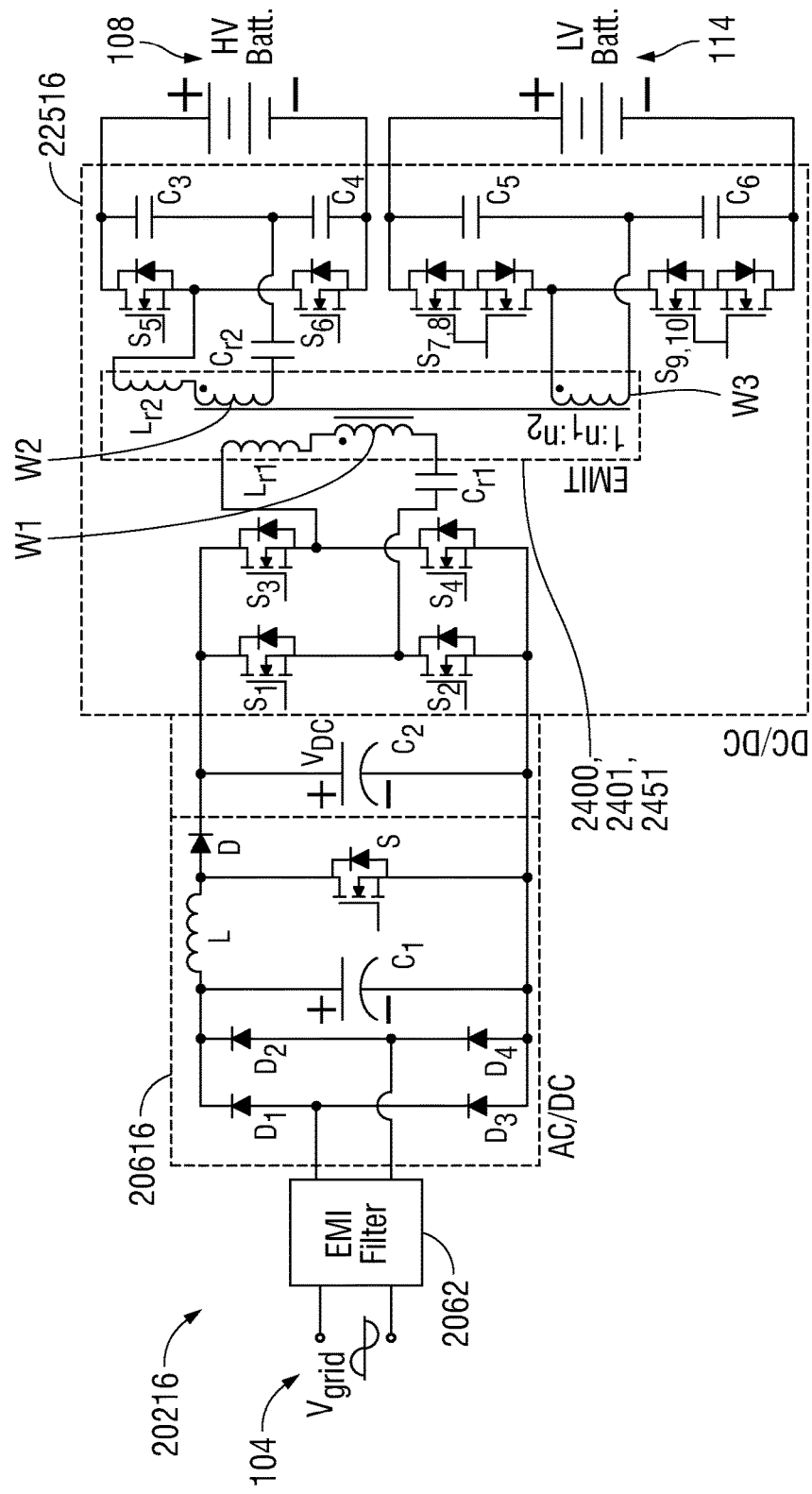
FIG. 21 is a sixteenth embodiment of an integrated power electronic interface for a PEV according to one embodiment of the present disclosure.

FIG. 21 illustrates still another embodiment of an integrated power electronics interface according to the present disclosure, i.e., PEI 20216, wherein the first stage 20216 includes a bidirectional AC/DC full-bridge boost converter (S1, S2, S3, S4, L, C1), which is used for rectification and power factor correction (PFC).

The second stage 22516 includes a resonant multi-output DC/DC converter having three-winding (W1, W2, W3) transformer 2400, 2401, 2451 for integration of two converters. The integrated configuration of PEI 20216 may be achieved via independent three-winding transformer 2401 and additional resonant inductors (Lr1, Lr2) and resonant capacitors Cr1 and Cr2 or through electromagnetically integrated transformer (EMIT) 2451, where the resonant inductors are built into the magnetic structure of the three-winding transformer 2400. Capacitor Cr and inductors Lr1, Lr2, and the magnetizing inductance of the transformer form a resonant tank circuit which stores the energy oscillating at the resonant frequency. The main HV battery pack 108 may interface with the transformer via full switches (S9, S10, S11, S12) and a capacitor (C2). The LV battery pack or auxiliary load 114 may be connected to the third winding of the transformer via a full bridge (S13 S14, S15, S16) and a capacitor (C3) followed by a bidirectional buck converter (S17, S18, L2).

During charging the main HV battery pack 108 from the grid, the two back-to-back switches (S7, S8, S9, S10), which interface the LV battery pack 114, may be either deactivated or both batteries may be cross-regulated and charged simultaneously. During propulsion, the LV battery pack 114 may be charged through HV battery pack 108. During V2G operation, the HV battery pack 108 mainly provides power back to the grid.

Figure 22:
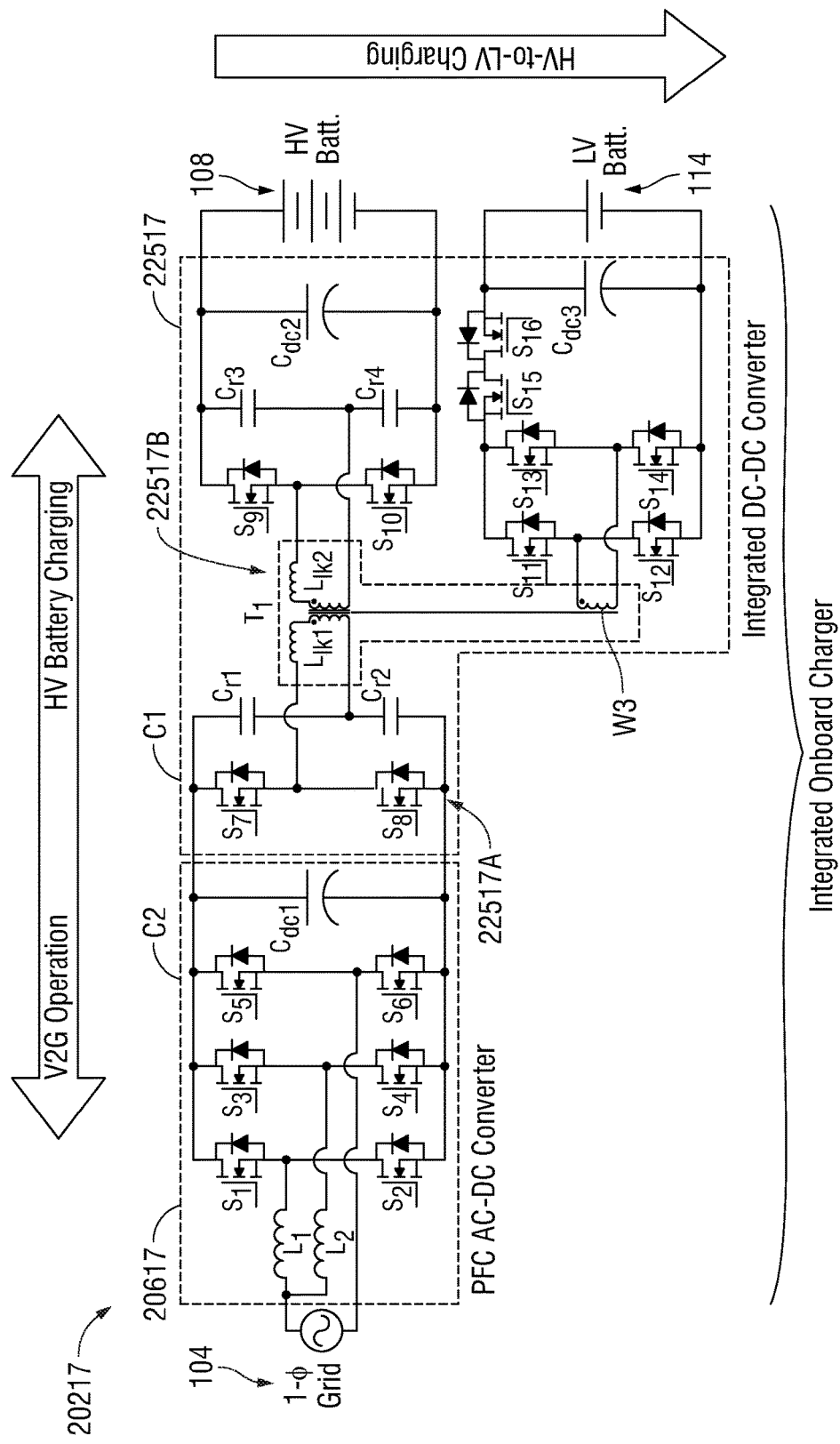
FIG. 22 is a seventeenth embodiment of an integrated power electronic interface for a PEV according to one embodiment of the present disclosure.

FIG. 22 illustrates another embodiment of an integrated power electronics interface according to the present disclosure, i.e., PEI 20217, that not only requires fewer components as compared to power electronics interfaces of the prior art but also enables multiple operation modes. The first stage 20617 includes a bridgeless interleaved boost PFC converter is used for both G2V and V2G operation. The second stage 22517 includes a bidirectional dual-output CLLLC resonant converter that is integrated with an LLC resonant converter. The CLLLC converter utilizes the leakage inductances ($L_{lk1}$ and $L_{lk2}$) of three-winding EMIT ($T_1$) as the resonant inductors. In order to achieve V2G and H2L charging, resonant capacitors are placed at both primary side ($C_{r1}$ and $C_{r2}$) and secondary side ($C_{r3}$ and $C_{r4}$) of EMIT T1. Therefore, $C_{r1}$, $C_{r2}$ and $L_{lk1}$ form a resonant network during G2V operation (analogous to first winding W1 in FIGS. 6-21) while $C_{r3}$, $C_{r4}$ and $L_{lk2}$ form a resonant network during V2G and H2L operations (analogous to second winding W2 in FIGS. 6-21). Thus, the integrated topology utilizes the active bridge leg ($S_9$ and $S_{10}$) at secondary side during both V2G and H2L operations with no need for an additional dc-ac bridge.

At primary side 22517A and secondary side 22517B of the transformer EMIT T1 that form the charger portion of the PEI 20217, two half-bridge topologies are used to reduce the number of components. At the low-voltage side, i.e. tertiary winding W3, a full-bridge rectifier is used to reduce the circulating current. In addition, synchronous rectification ($S_{11}$~$S_{12}$) is adopted to minimize the turn-on resistance and conduction losses. A back-to-back switch module ($S_{13}$ and $S_{14}$) is used for (a) disconnecting LV loads when necessary; and (b) providing protection against reverse polarity.

Electromagnetic Integration

In conventional chargers the required large resonant inductance of the LLC stage is typically realized using an additional external inductor in series with the primary side of the transformer. Classically, U cores are utilized to design individual inductors and transformers. However, using an EMIT with high leakage inductance can (i) remove the external inductor; (ii) reduce the converter size; and (iii) reduce magnetic component losses. Modifications of magnetic-core shapes and winding structures have been studied to develop EMITs; however, the integration of two large leakage inductances in a three-winding transformer has not been investigated. Since the modification of magnetic-core shapes is expensive, difficult and non-universal, the resonant inductive components of the converter are electromagnetically integrated inside a single three-winding transformer through simple modification of winding arrangements.

The resonant inductances are integrated into a gapped transformer with a singular arrangement of primary and secondary windings.

To integrate leakage inductances inside the transformer, the E cores can be employed due to their flexibility to shape leakage flux path (LFP), commercial availability and cost-effectiveness [7, 10]. As illustrated in FIGS. 23A, 23B, 24A, 24B and 24C, according to embodiments of the present disclosure, the equivalent resonant and magnetizing inductances of two intertwined LLC converters can be acquired through a primary winding, a secondary winding, a tertiary winding, and gaps between windings and transformer's cores. E cores are employed due to their flexibility to shape leakage flux path (LFP), commercial availability and cost-effectiveness.

FIGS. 23A AND 23B illustrate one embodiment of EMIT 2451 according to the present disclosure wherein EMIT 2451 includes first EE core 2452 shown on the upper portion and second EE core 2454 on the lower portion. In one embodiment, the EE cores 2452 and 2454 are made from ferrite. Other materials may include, but are not limited to, silicon steel, specialized alloys such as mu-metal, permalloy, supermalloy, amorphous metal, carbonyl iron powdered cores, hydrogen reduced iron powdered cores, ferrite ceramics, and air cores, for laminated and non-laminated cores. The designations of "upper", "upper portion", "lower", and "lower portion" or the like are for convenience of description herein and are not intended to limit the actual orientation of the components in the EMIT 2451 (or EMIT 2451' described with respect to FIGS. 24A, 24B, 24C below) as designed, as manufactured or as installed in a PEV.

The first EE core 2452 includes a base portion 2453 and a first peripheral or side leg 2452a and a second peripheral or side leg 2452b, both legs projecting orthogonally from the base portion 2453 and peripheral to a central leg 2452c that also projects orthogonally from the base portion 2453, thereby forming the E core configuration.

Similarly, the second EE core 2454 includes a base portion 2455 and a first peripheral or side leg 2454a and a second peripheral or side leg 2454b, both legs projecting orthogonally from the base portion 2455 and peripheral to a central leg 2454c that also projects orthogonally from the base portion 2455, thereby forming the E core configuration.

Primary winding 2456 (representing W1 in FIGS. 6-21) is wound around the central leg 2452c in the gaps formed between the central leg 2452c and the peripheral legs 2452a and 2452b located on upper EE core 2452 while the secondary winding 2462 (representing W2 in FIGS. 6-21) is wound around the central leg 2454c in the gaps formed between the central leg 2454c and the peripheral legs 2454a and 2454b located on lower EE core 2454.

A peripheral winding gap 2457 is formed between the lower edge of primary winding 2456 on the upper EE core 2452 and the upper edge of secondary winding 2462 on lower EE core 2454, as indicated by double arrows.

A peripheral winding gap 2458 is formed between the lower edge of primary winding 2456 on the upper EE core 2452 and the upper edge of tertiary winding 2464 on lower EE core 2454, as also indicated by double arrows.

A central gap 2460 is formed between the central leg 2452c and the central leg 2454c.

The lower edge of peripheral leg 2452a and the upper edge of peripheral leg 2454a are in direct contact with each other as are the lower edge of peripheral leg 2452b and the upper edge of peripheral leg 2454b also in direct contact with each other.

The edges of the legs 2452a, 2452c and 2452b of the first EE core 2452 align with edges of the legs 2454a, 2454c and 2454b of the second EE core 2454.

Since the depth of the primary winding 2456 is greater than the depth of the secondary winding 2462, a greater portion of the peripheral winding gap 2457 exists within the lower EE core 2454.

Therefore, tertiary winding 2464 (representing W3 in FIGS. 6-21) is wound around the central leg 2454c of the lower EE core 2454 such that peripheral winding gap 2457 is greater than peripheral winding gap 2458 so that both the secondary winding 2462 and the tertiary winding 2464 are wound around the central leg 2454c of the lower EE core 2454 and are adjacent to each other along the central axis defined by the central legs 2452c and 2454c such that tertiary winding 2464 is elevated with respect to secondary winding 2462.

As a result, secondary winding 2462 is wound around the central leg 2454c of the second EE core 2454 between the first peripheral leg 2454a and the central leg 2454c and between the second peripheral leg 2454b and the central leg 2454c of the second EE core 2454.

Tertiary winding 2464 is wound around the central leg 2454c of the second EE core 2454 between the first peripheral leg 2454a and the central leg 2454c and between the second peripheral leg 2454b and the central leg 2454c of the second EE core 2454.

Thus the tertiary winding 2464 is wound on the central leg 2454c of the second EE core 2454 below the primary winding 2456 wound on the central leg 2452c of the first EE core 2452 and above the secondary winding 2462 wound on the central leg 2454c of the second EE core 2454.

Consequently, the adjustable winding gap 2457 that is formed between a lower edge of the primary winding 2456 on the first EE core 2452 and an upper edge of the secondary winding 2462 on the second EE core 2454 establishes spatial separation between the secondary winding 2464 and the primary winding 2456.

Additionally, the adjustable winding gap 2458 that is formed between a lower edge of the primary winding 2456 on the first EE core 2452 and an upper edge of the tertiary winding 2464 on the second EE core 2454 establishes spatial separation between the tertiary winding 2464 and the primary winding 2456.

A third adjustable winding gap 2459 is formed between the lower edge of the tertiary winding 2464 and the upper edge of the secondary winding 2462, establishing spatial separation between the tertiary winding 2464 and the secondary winding 2462.

Leakage flux path (LFP) 2470a is formed in the first peripheral legs 2454a and 2452a, in the upper base portion 2453, in central legs 2452c and 2454c and in the lower base portion 2455 while LFP 2470b is formed in the second peripheral legs 2454b and 2452b, in the upper base portion 2453, in central legs 2452c and 2454c and in the lower base portion 2455.

In the base portions 2453 and 2455, the LFP 2470a and 2470b are each perpendicular to the axis of the windings 2456, 2462 and 2464, becoming parallel to the axis of the windings (the central legs 2452c and 2454c effectively defining the central axis of the windings 2456, 2462 and 2464) and passing through the central legs 2452c and 2454c and the central gap 2460 between the central legs 2452c and 2454c of the two E cores 2452 and 2454. This trajectory of LFP substantially contributes to the leakage inductance.

In fact, the air gap 2460 between the central legs 2452c and 2454c of the two E cores 2452 and 2454 and the gaps 2457, 2458 and 2459 amongst the three windings 2456, 2462 and 2464 can be adjusted to precisely set the leakage and magnetizing inductances. Therefore, large leakage and magnetizing inductances can be achieved, although the variation of gap 2460 between the two E cores 2452 and 2454 has less influence on the leakage inductance in comparison to the gaps 2457, 2458 and 2459 amongst the three windings 2456, 2462 and 2464. The air gap 2460 between the E cores 2452 and 2454 significantly reduces the saturation effect. Furthermore, the gaps 2457, 2458, and 2459 amongst the three windings 2456, 2462 and 2464 help to increase the voltage isolation.

Figure 24A:
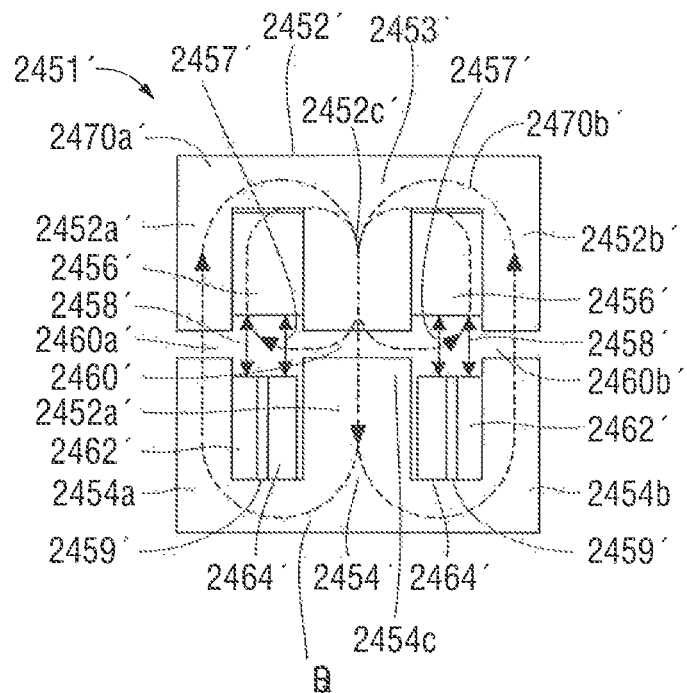
FIG. 24A illustrates winding arrangements inside gapped E cores of an electromagnetically integrated transformer (EMIT) according to another embodiment of the present disclosure.
Figure 24B:
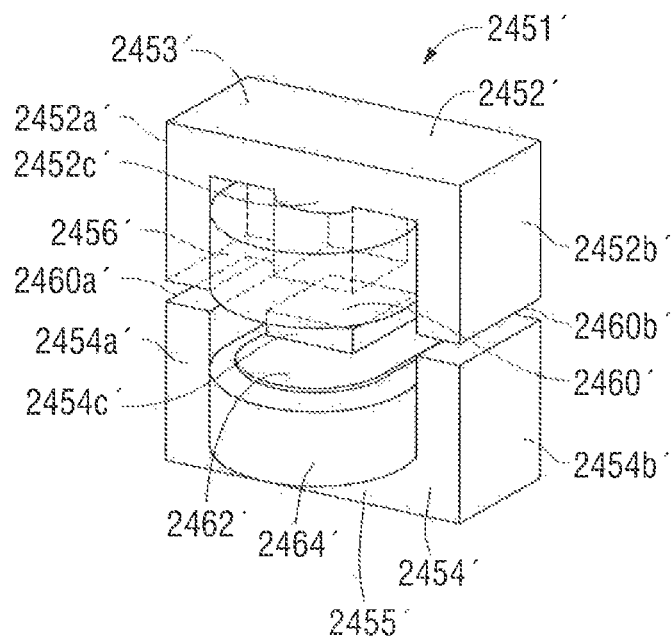
FIG. 24B is a perspective view of the EMIT of FIG. 24A.

FIGS. 24A and 24B illustrate an alternate embodiment of EMIT 2451 of FIGS. 23A and 23B. More particularly, EMIT 2451' illustrated in FIGS. 24A and 24B is identical to EMIT 2451 except that the length of peripheral legs 2452a' and 2452b' of upper E core 2452' is equal to the length of central leg 2452c' and the length of peripheral legs 2454a ' and 2454b' of lower E core 2454' is equal to the length of central leg 2454c'.

Accordingly, a peripheral gap 2460a' is formed between the lower edge of peripheral leg 2452a' and the upper edge of peripheral leg 2454a' while a peripheral gap 2460b' is formed between the lower edge of peripheral leg 2452b' and the upper edge of peripheral leg 2454b'.

Thus, the upper E core 2452' and the lower E core 2454' are spaced apart from each other by the width of central gap 2460' and the width of peripheral gaps 2460a' and 2460b'.

FIG. 24A illustrates the emit 2451' showing (1) center legs 2452c' and 2454c' of the cores 2452' and 2454', (2) side leg 2452a' and 2454a' and 2452b' and 2454b' of the cores 2452' and 2454', (3) primary winding 2456', (4) secondary winding 2462', (5) tertiary winding 2464', (6) core gaps 2460a', 2460' and 2460b' where generally 2460a'=2460'=2460b'. (Note that 2460a', 2460' and 2460b' do not have to be equal. For example, 2460a' and 2460b' are zero in FIG. 23A-B. Here in FIG. 24A-B, there are two advantages to make them equal: 1) The fabrication of the EE core is simpler because then the length of the central leg equals to that of the side legs; 2) It would be easy to adjust the gap by simply changing the same gap size.) (7) adjustable winding gap 2457' between primary winding 2456' and secondary winding 2462' and adjustable winding gap 2458' between primary winding 2456' and tertiary winding 2464', and (8) adjustable concentric winding gap 2459' between tertiary winding 2464' and secondary winding 2462'.

In a similar manner as with respect to EMIT 2451 in FIGS. 23A-23B, edges of the legs 2452a', 2452c' and 2452b' of the first EE core 2452' align with edges of the legs 2454a', 2454c' and 2454b' of the second EE core 2454', However, the tertiary winding 2464' is now formed concentrically around the secondary winding 2462 and both secondary winding 2462' and tertiary winding 2464' are formed concentrically to one another around the central leg 2454c' of the lower E core or second EE core 2454', Therefore, an adjustable winding gap 2457' is formed between the lower edge of the primary winding 2456' and an upper edge of the secondary winding 2462' on the second EE core 2454', establishing spatial separation between the secondary winding 2462' and the primary winding 2456'.

Similarly, an adjustable winding gap 2458' is formed between a lower edge of the primary winding 2456' and an upper edge of the tertiary winding 2454' on the second EE core 2454', establishing spatial separation between the tertiary winding 2464' and the primary winding 2456'.

in addition, since tertiary winding 2464' is now formed concentrically around secondary winding 2462' and both secondary winding 2462' and tertiary winding 2464' are formed concentrically to one another around central leg 2454c' of the lower e core 2454'. the tertiary winding 2464' defines an adjustable concentric winding gap 2459' with respect to the secondary winding, 2462' establishing spatial separation between the tertiary winding 2464' and the secondary winding 2462'.

In a similar manner as with respect to EMIT 2451 in FIGS. 23A-23B, referring to FIG. 24A, leakage flux path (LFP) 2470a' is formed in the first peripheral legs 2454a' and 2452a', in the upper base portion 2453', in central legs 2452c' and 2454c'and in the lower base portion 2455' of the upper E core 2452' and lower E core 2454', as applicable, while LFP 2470*b*' is formed in the second peripheral legs 2454*b*' and 2452*b*', in the upper base portion 2453' in central legs 2452*c*' and 2454*c*' and in the lower base portion 2455' of the upper E core 2452' and lower E core 2454', as applicable. In the base portions 2453' and 2455', the LFP 2470*a*' and 2470*b*' are each perpendicular to the axis of the windings 2456', 2462' and 2464', becoming parallel to the axis of the windings (the central legs 2452*c*' and 2454*c*' effectively defining the central axis of the windings 2456', 2462' and 2464') and passing through the central legs 2452*c*' and 2454*c*' and the central gap 2460 between the the upper E core 2452' and the lower E core 2454'.

Again, this trajectory of LFP substantially contributes to the leakage inductance. In fact, in this configuration, the core gaps 2460*a*', 2460' and 2460*b*' between the two E cores 2452' and 2454' and the winding gaps 2457' and 2458' can easily be adjusted to set the leakage and magnetization inductances precisely. Therefore, large leakage and magnetization inductances can be achieved, although the variation of the core gaps 2460*a*', 2460' and 2460*b*' has minimal influence on the leakage inductance in comparison to the winding gaps 2457', 2458' and 2459'. The adjustable winding gap 2459' has same influence on the leakage inductance as adjustable winding gaps 2457' and 2458'. The only difference here is that there is relatively limited space (in the horizontal direction) for gap 2459' to be adjusted in comparison to that (in the vertical direction) of gaps 2457' and 2458'. In FIG. 23A-B, however, for EMIT 2451, gap 2459 has more space (in the vertical direction) to be adjusted.

Table I demonstrates sample design parameters of the three-winding EMIT for the integrated onboard charger and power electronic interface 20217 of FIG. 22 and EMIT 2451 illustrated in FIGS. 23A and 23B.

It should be noted that the design parameters disclosed herein are applied as an example of only one specific embodiment and are in no way intended to limit this embodiment or other embodiments of the present disclosure to these design parameters.

The transformer is simulated by the finite element analysis (FEA) software MagNet. The transformer core size is calculated based on switching frequency, voltage and power level of the converter. The 3F3 from Ferroxcube Corporation (New Taipei City, Taiwan) with low loss (up to 700 kHz) is selected as the ferrite E core. An air gap is generated between the central legs of two E cores. The Litz wire size is determined considering the current rating and skin effect. Since core loss constitutes to the majority of loss in the transformer, winding turns are increased to reduce core loss through increasing the magnetic flux density. Nonetheless, the winding area around transformer's bobbin causes limitation on the winding turns.

TABLE I

Example of Design Parameters
of the Three-Winding EMIT.
Parameters

Power rating (kW)
Nominal input voltage (V)
Nominal HV voltage (V)
Nominal LV voltage (V)
Primary winding turns
Secondary winding turns
Tertiary winding turns
Core shape
Core material
Primary wire size (AWG)
First secondary wire size (AWG)

TABLE I-continued

Example of Design Parameters
of the Three-Winding EMIT.
Parameters

Second secondary wire size (AWG)
Gap between cores (mm)
Equivalent primary leakage inductance (μH)
Magnetizing inductance (μH)

TABLE I is not necessarily intended to represent an exclusive list of design parameters and others may be included by those skilled in the art if necessary.

Operation Mode Analysis

Figure 25:
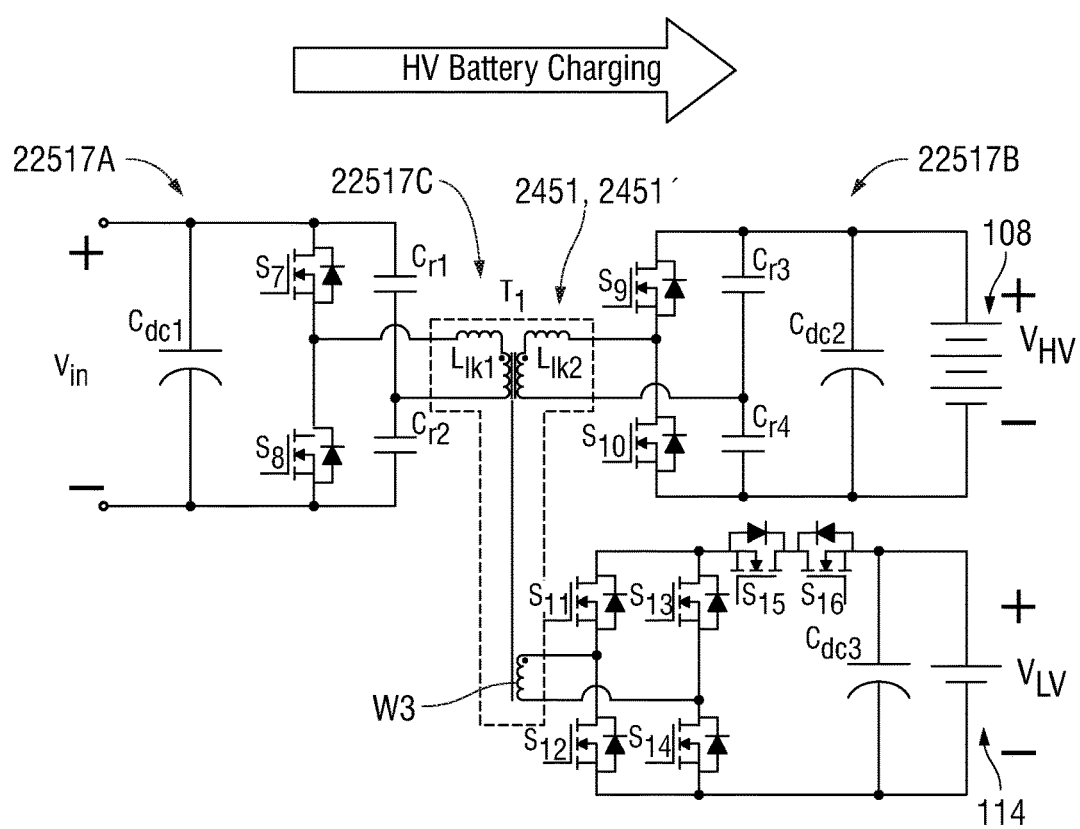
FIG. 25 illustrates topology of a half-bridge CLLLC resonant converter of FIG. 22 configured for G2V charging.

In conjunction with FIG. 22, FIG. 25 illustrates dual-output CLLLC resonant converter 22517C formed within the primary side 22517A and secondary side 22517B of secondary stage 22517 of PEI 20217. The dual-output CLLLC resonant converter 22517C is the integration of a half-bridge CLLLC resonant converter intertwined with a half-bridge LLC converter, and for this reason, the half-bridge CLLLC resonant converter and the half-bridge LLC converter is not separately identified by component numbers. Rather, the half-bridge CLLLC resonant converter includes the primary leakage inductance ($L_{lk1}$), secondary leakage inductance ($L_{lk2}$) and magnetizing inductance ($L_m$) of transformer ($T_1$), two bridge legs ($S_7$~$S_{10}$), and four split resonant capacitors ($C_{r1}$~$C_{r4}$). On the other hand, the half-bridge LLC resonant converter includes the secondary leakage inductance ($L_{lk2}$) and magnetizing inductance ($L_m$) of transformer ($T_1$), one bridge leg ($S_9$ and $S_{10}$), one full-bridge synchronized rectifier ($S_{11}$~$S_{14}$), and two split resonant capacitors ($C_{r3}$ and $C_{r4}$).

3. Alternatively, the dual-output CLLLC resonant converter 22517C may be the integration of a half-bridge CLLLC resonant converter intertwined with a full-bridge LLC converter.

HV Traction Battery Charging (G2V)

FIG. 25 illustrates the circuit topology of the half-bridge CLLLC resonant converter during charging HV traction battery 108. The synchronized rectification at tertiary side W3 is disabled and the series-connected back-to-back switches ($S_{15}$ and $S_{16}$) are turned off to disconnect the LV DC loads 114.

At the primary side 22517A, $V_{in}$ can be considered as a constant voltage due to the large dc capacitance $C_{dc1}$. Two square-wave voltage sources with 180° phase shift ($v_{in}$ and $-v_{in}$) are generated by the bridge leg ($S_7$ and $S_8$). All the component values at secondary side are referred to the primary side with prime symbol. At the secondary side 22517B, $V_{HV}$ can be considered as a constant voltage due to the large $C_{dc2}$. $V'_{HV}=nV_{HV}$, and $n=N_1:N_2$ is the transformer turns ratio. Two square-wave voltage sources with 180° phase shift ($v'_{HV}$ and $-v'HV$) are generated by the diode rectifier (body diodes of $S_9$ and $S_{10}$).

Figure 26A:
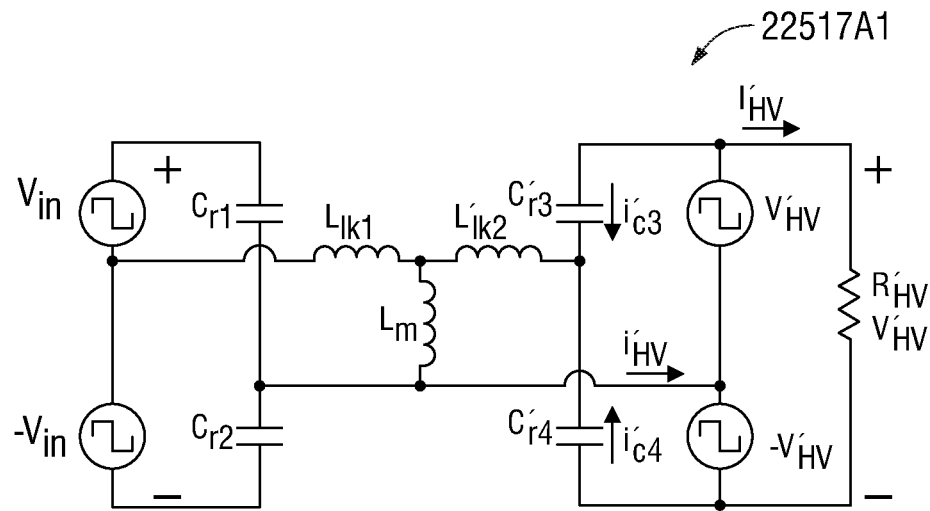
FIG. 26A is a nonlinear non-sinusoidal circuit model of the half-bridge CLLLC resonant converter of FIG. 25.

Hence, the nonlinear non-sinusoidal equivalent circuit model 22517A1 referred to the primary side 22517A can be presented as shown in FIG. 26A.

Using the first harmonic approximation (FHA), only the first-order harmonic components of voltage and current contribute to the power transfer.

Figure 26B:
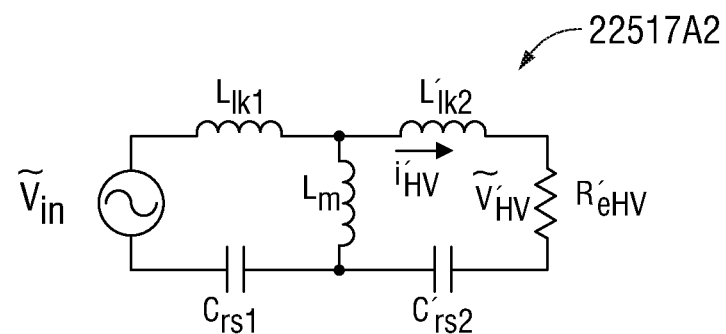
FIG. 26B is a linear sinusoidal circuit model of the nonlinear non-sinusoidal circuit model of FIG. 26A for G2V operation.

As shown in FIG. 26B, the equivalent linear sinusoidal circuit model 22517A2 is derived. The split resonant capacitors are connected in parallel in ac domain, yielding $C_{rs1}=C_{r1}+C_{r2}$ and $C'_{rs2}=C'_{r3}+C'_{r4}=(C_{r3}+C_{r4})/n^2$. The first-order harmonic of $v_{in}$, which is a sinusoidal voltage at the input of resonant network, can be represented as $$\tilde{v}_{in} = \frac{4}{\pi} \frac{V_{in}}{2} \sin(\omega_r t) \quad (1)$$

On the other hand, the first-order harmonic of $v'_{HV}$, which is a sinusoidal voltage at the output of resonant network, can be expressed as $$\tilde{v}'_{HV} = \frac{4}{\pi} \frac{V'_{HV}}{2} \sin(\omega_r t + \theta) = \frac{4n}{\pi} \frac{V_{HV}}{2} \sin(\omega_r t + \theta) \quad (2)$$

where $\theta$ is the phase shift with respect to the first-order component of input voltage.

As a consequence of FHA assumption, the resonant network current ($\tilde{i}'_{HV}$) will be sinusoidal, with a phase shift with respect to the first-order component of the input voltage. $\tilde{i}'_{HV}$ equals to the sum of sinusoidal currents ($\tilde{i}'_{c3}+\tilde{i}'_{c4}$) passing through $C'_{r3}$ and $C'_{r4}$. Since the average of or $|\tilde{i}'_{c3}|$ or $|\tilde{i}'_{c4}|$ is the output current $I'_{HV}$, $\tilde{i}'_{HV}$ can be presented as $$\tilde{i}'_{HV} = \pi I'_{HV} \sin(\omega_r t + \theta) = \frac{\pi}{n} I_{HV} \sin(\omega_r t + \theta) \quad (3)$$

Thus, the ac equivalent load in linear sinusoidal circuit model can be determined as, $$R'_{e,HV} = \frac{\tilde{v}'_{HV}}{\tilde{i}'_{HV}} = \frac{2n^2}{\pi^2} R_{HV} \quad (4)$$

The transfer function of the resonant converter can be derived from the impedance network, $$H_{G2V}(s) = \frac{\tilde{v}'_{HV}}{\tilde{v}_{in}} = \frac{n\tilde{v}_{HV}}{\tilde{v}_{in}} = \frac{Z_{3,G2V}(s)}{Z_{1,G2V}(s) + Z_{3,G2V}(s)} \cdot \frac{R'_{e,HV}}{Z_{2,G2V}(s)} \quad (5)$$

Where, $$Z_{1,G2V}(s) = sL_{lk1} + \frac{1}{sC_{rs1}} \quad (6)$$

$$Z_{2,G2V}(s) = sL'_{lk2} + \frac{1}{sC'_{rs2}} + R'_{e,HV} \quad (7)$$

$$Z_{3,G2V}(s) = Z_{2,G2V}(s) \| sL_m \quad (8)$$

Therefore, using the ac equivalent circuit in FIG. 6(b), the voltage gain, M(s), can be represented as $$M_{G2V}(s) = \quad (9)$$

$$|H_{G2V}(s)| = \left| \frac{j\left(\frac{\omega}{\omega_0}\right)\left(\frac{\omega}{\omega'_0}\right)^2 (m-1)}{\left\{\left[\left(\frac{\omega}{\omega_0}\right)^2 + \left(\frac{\omega}{\omega'_0}\right)^2\right]m - \left(\frac{\omega}{\omega_0}\right)^2\left(\frac{\omega}{\omega'_0}\right)^2(2m-1) - 1\right\}Q +} {j\left(\frac{\omega}{\omega_0}\right)\left(\frac{\omega}{\omega'_0}\right)^2 m - \left(\frac{\omega}{\omega'_0}\right)\left(\frac{\omega_0}{\omega'_0}\right)} \right|$$

Where, the primary total inductance is $L_p = L_m + L_{lk1}$, the ratio of primary total inductance to primary leakage inductance is $$m = \frac{L_p}{L_{lk1}},$$

the equivalent ac output resistor referred to primary side is $$R'_{e,HV} = \frac{2n^2}{\pi^2} R_{HV},$$

the quality factor is $$Q = \sqrt{\frac{L_{lk1}}{C_{rs1}}} \frac{1}{R'_{e,HV}},$$

the angular resonance frequency of resonant network at primary side is $$\omega_0 = \frac{1}{\sqrt{L_{lk1} C_{rs1}}},$$

and the angular resonance frequency of resonant network at secondary side is $$\omega'_0 = \frac{1}{\sqrt{L'_{lk2} C'_{rs2}}}.$$

There are two resonant frequencies, $f_0 = \omega_0/2\pi$, the resonance frequency of resonant network at primary side, and $f'_0 = \omega'_0/2\pi$, the resonance frequency of resonant network at secondary side, respectively. In addition to the two aforementioned resonant frequencies, two series resonance frequencies, $f_{r1,G2V}$ and $f_{r2,G2V}$, can be determined, in which the voltage gain in Eq. (6) becomes independent of load condition, $$f_{r1,G2V} = \quad (14)$$

$$\frac{1}{2\pi\sqrt{L_{lk1} C_{rs1}}} \sqrt{\frac{(p^2+1)m + \sqrt{(p^2+1)^2 m^2 - 4p^2(2m-1)}}{2p^2(2m-1)}}$$

$$f_{r2,G2V} = \quad (15)$$

$$\frac{1}{2\pi\sqrt{L_{lk1} C_{rs1}}} \sqrt{\frac{(p^2+1)m - \sqrt{(p^2+1)^2 m^2 - 4p^2(2m-1)}}{2p^2(2m-1)}}$$

$$p = \frac{f_0}{f'_0} = \sqrt{\frac{C'_{rs2}}{C_{rs1}}} \quad (16)$$

Where, p is the resonant frequency ratio, which is the ratio of the resonance frequency of primary network to the resonance frequency of secondary network. At series resonant frequencies, regardless of the load condition, the voltage gain would become $$M_{G2V}(s) = \left| \frac{\left(\frac{f}{f_0}\right)^2 (m-1)}{\left(\frac{f}{f_0}\right)^2 m - 1} \right|_{f=f_{r1,G2V}, f_{r2,G2V}} \quad (13)$$

Figure 27A:
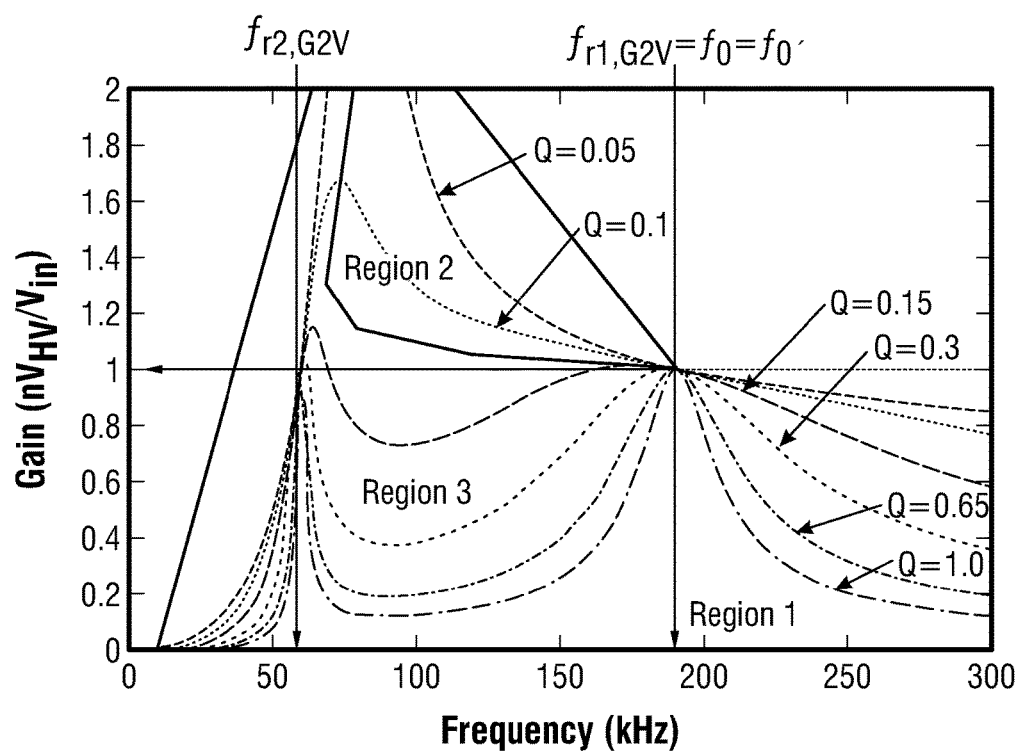
FIG. 27A illustrates gain curves versus frequency at different quality factors (Q) and frequency ratio (p) wherein p=1.
Figure 27B:
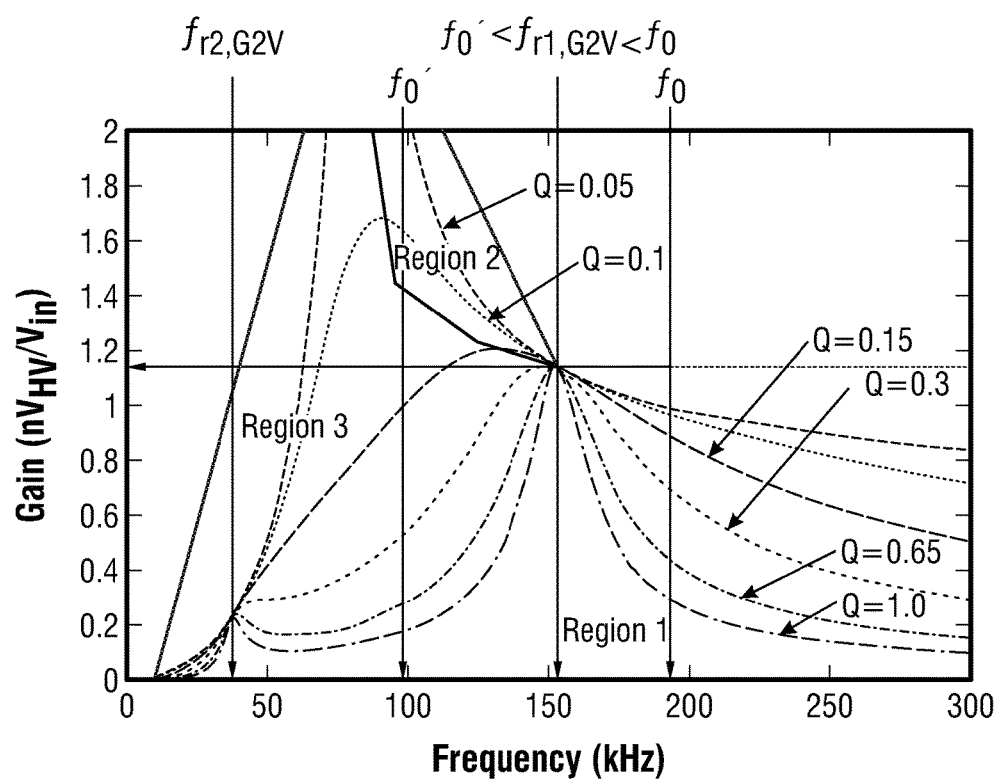
FIG. 27B illustrates gain curves versus frequency at different quality factors (Q) and frequency ratio (p) wherein p>1.
Figure 27C:
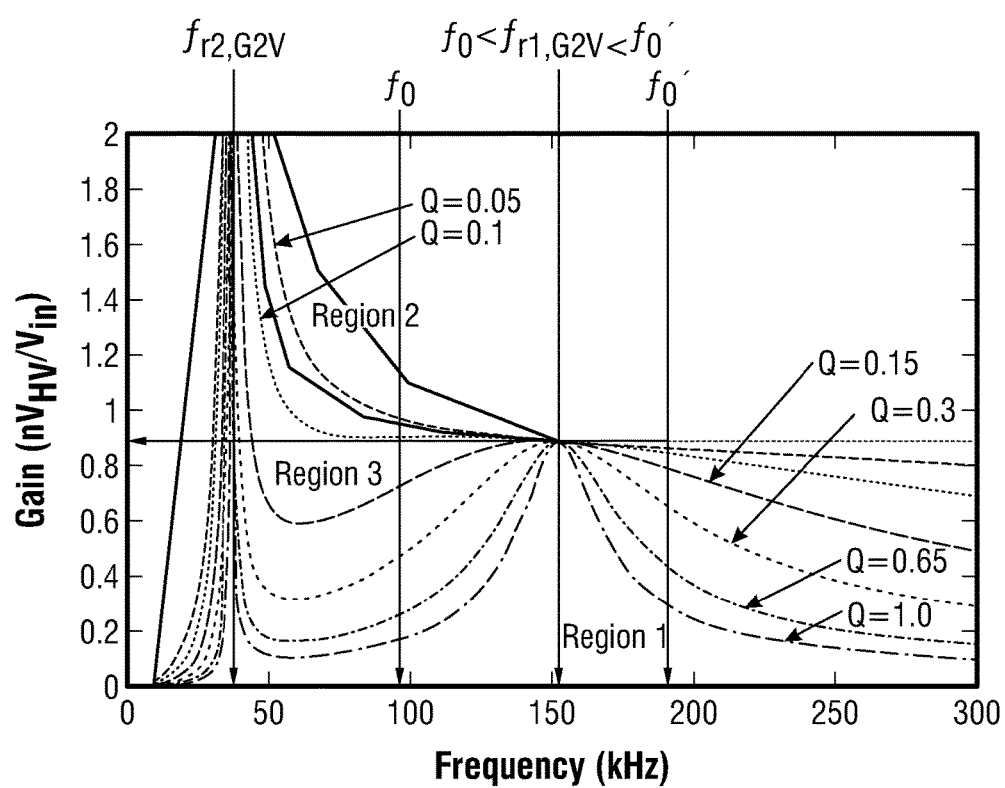
FIG. 27C illustrates gain curves versus frequency at different quality factors (Q) and frequency ratio (p) wherein p<1.

FIGS. 27A, 27B, 27C illustrate the voltage gain curves ($nV_{HV}$/Vin) versus frequency (kHz) at different quality factors Q and resonant frequency ratios $f_{r1,G2V}$, $f_{r2,G2V}$. To ensure converter operation in the inductive region to acquire zero-voltage switching, the switching frequency should be selected in the vicinity of $f_{r1,G2V}$.

As observed from FIGS. 27A-27C, similar to the LLC resonant converter, the gain characteristics of CLLLC converter 22517C is almost independent of the load when the switching frequency is around the resonant frequency ($f_{r1,G2V}$). However, in a CLLLC converter, $f_{r1,G2V}$ is not only dependent on the LC network at primary side ($L_{lk1}C_{rs1}$), but also the LC network at secondary side ($L'_{lk2}C'_{rs2}$).

Assuming $L_{lk1}=L'_{lk2}$, for $C_{rs1}=C'_{rs2}$, as shown in FIG. 7(a), the frequencies of LC networks at primary and secondary sides are equal ($f_0=f'_0$). $f_{r1,G2V}$ equals to the resonant frequencies of the LC network at both sides ($f_{r1,G2V}=f_0=f'_0$). Hence, a unity gain can be obtained at $f_{r1,G2V}$, regardless of the ratio of primary total inductance to primary leakage inductance (m).

For $C_{rs1} \neq C'_{rs2}$, $f_{r1,G2V}$ resides between $f_0$ and $f'_0$. Decreasing either $f_0$ or $f'_0$ will reduce $f_{r1,G2V}$. In addition, the gain at $f_{r1,G2V}$ is no longer a unity gain due to the fact that $f_{r1,G2V} \neq f_0 \neq f'_0$. The gain at $f_{r1,G2V}$ is higher than unity for $f_0 > f'_0$; and, it is lower than unity for $f_0 < f'_0$.

For a half-bridge CLLLC converter, a relatively large m is necessary for efficient operation. A small m will significantly increase the magnetizing current that has no use for power transfer but increases the resonant losses. Since the resonant current of a half-bridge converter is two times of the resonant current of a full-bridge converter, a large m is necessary to reduce the resonant losses. At heavy load condition, reducing m has limited effect on the maximum gain. At light load condition, reducing m may increase the maximum gain at frequencies lower than $f_{r1,G2V}$, and in turn increases the converter's capability of regulating wide output voltage ranges. However, the converter needs to operate in region 1 ($f_s > f_{r1,G2V}$) and consequently the switching frequency should be slightly higher than $f_{r1,G2V}$ for efficient operation. Thus, reducing m is not an effective and efficient way to increase capability of regulating wide output voltage ranges. In fact, with a wide input voltage range, the converter can handle a wide output voltage range at a fixed switching frequency close to $f_{r1,G2V}$.

V2G Operation

Figure 28:
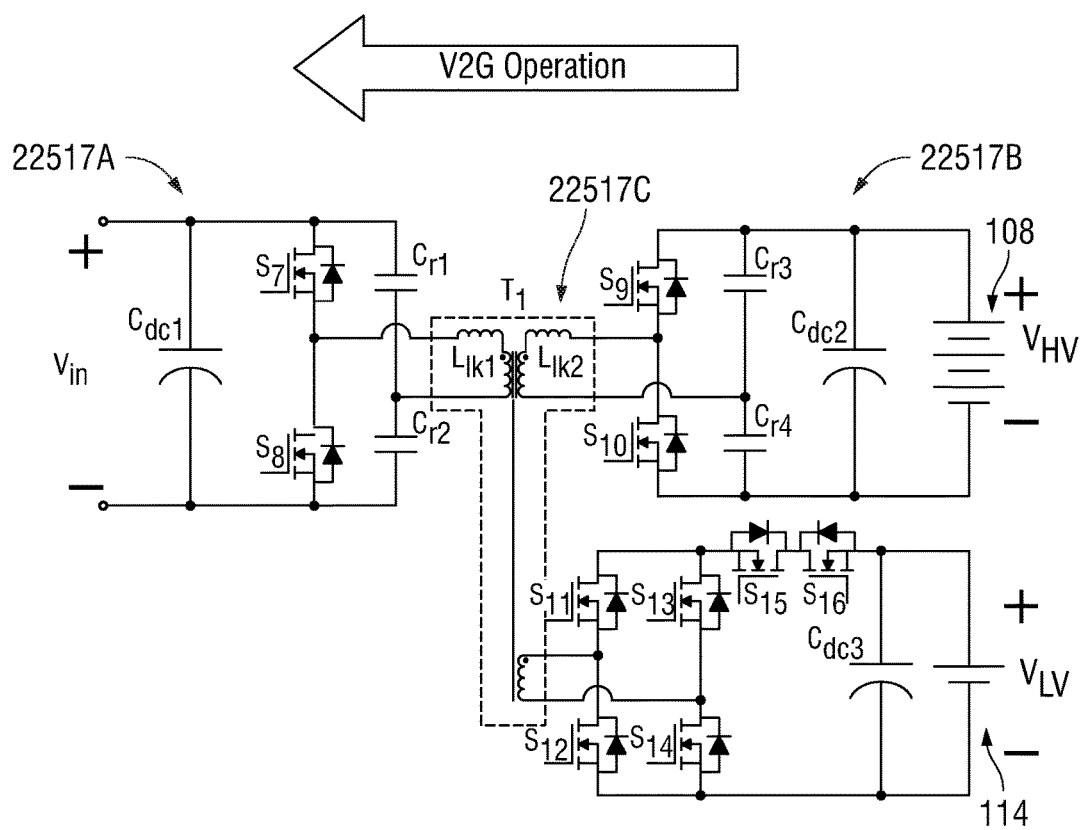
FIG. 28 illustrates circuit topology of the half-bridge CLLLC resonant converter OF FIG. 22 for V2G operation.

FIG. 28 illustrates the dual-output CLLLC resonant converter 22517C during V2G operation, wherein the full-bridge rectifier at tertiary side W3 is still disabled by turning off $S_{15}$ and $S_{16}$. The half-bridge CLLLC resonant converter operates in a reversed direction. $V_{HV}$ at secondary side 22517B is considered as the input while $V_{in}$ at primary side is the output. $S_9$ and $S_{10}$ operate as a bridge leg while the body diodes of $S_7$ and $S_8$ serve as a rectifier. The half-bridge topology uses the same CLLLC resonant network; however, the network impedance, voltage gain and resonant frequency are different from those during G2V operation.

Figure 29A:
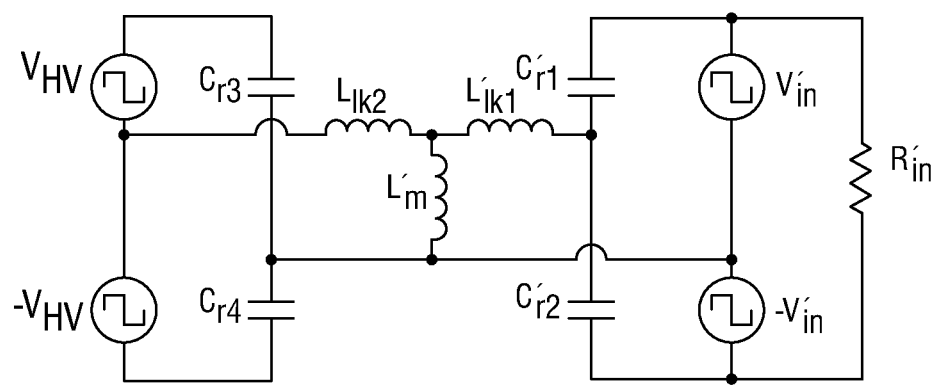
FIG. 29A is a nonlinear non-sinusoidal circuit model of the half-bridge CLLLC resonant converter of FIG. 28.

FIG. 29A illustrates the nonlinear non-sinusoidal equivalent circuit model 22517B1 referred to the secondary side 22517B.

Figure 29B:
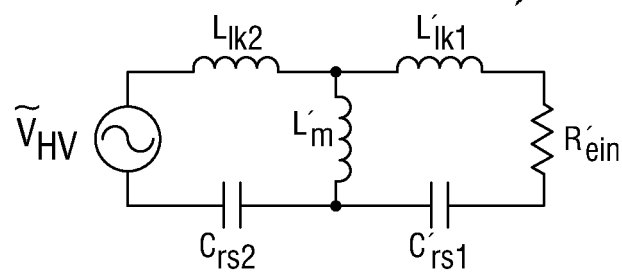
FIG. 29B is a linear sinusoidal circuit model of the nonlinear non-sinusoidal circuit model of FIG. 29A for V2G operation.

FIG. 29B illustrates that the equivalent linear sinusoidal circuit model 22517B2 can be derived using the FHA, where $C'_{rs1}=C'_{r1}+C'_{r2}=n^2(C_{r1}+C_{r2})$ and $C_{rs2}=C_{r3}+C_{r4}$. Using the similar approach for G2V operation, the equivalent load in linear sinusoidal circuit model for V2G operation can be expressed as $$R'_{e,in} = \frac{\tilde{v}'_{in}}{\tilde{i}'_{in}} = \frac{2}{n^2 \pi^2} R_{in} \quad (17)$$

Therefore, the voltage gain, M(s), for V2G operation can be represented as $$M_{V2G}(s) = |H_{V2G}(s)| \quad (18)$$

$$= \left| \frac{j\left(\frac{\omega}{\omega_0}\right)\left(\frac{\omega}{\omega'_0}\right)^2 (m'-1)}{\left\{\left[\left(\frac{\omega}{\omega_0}\right)^2 + \left(\frac{\omega}{\omega'_0}\right)^2\right]m' - \left(\frac{\omega}{\omega_0}\right)^2\left(\frac{\omega}{\omega'_0}\right)^2(2m'-1) - 1\right\}Q' + j\left(\frac{\omega}{\omega_0}\right)\left(\frac{\omega}{\omega'_0}\right)^2 m' - \left(\frac{\omega}{\omega'_0}\right)\left(\frac{\omega_0}{\omega'_0}\right)} \right|$$

Where, the secondary total inductance is $L_s=L'_m+L_{lk2}$, the ratio of secondary total inductance to secondary leakage inductance is $$m' = \frac{L_s}{L_{lk2}},$$

the equivalent ac output resistor referred to secondary side is $$R'_{e,in} = \frac{2}{n^2 \pi^2} R_{in},$$

the quality factor is $$Q' = \sqrt{\frac{L_{lk2}}{C_{rs2}}} \frac{1}{R'_{e,in}},$$

the angular resonance frequency of resonant network at secondary side is $$\omega_0 = \frac{1}{\sqrt{L_{lk2} C_{rs2}}},$$

and the angular resonance frequency of resonant network at primary side is $$\omega'_0 = \frac{1}{\sqrt{L_{lk2} C_{rs1}}}.$$

The two resonant frequencies can be obtained as $$f_{r1,V2G} = \frac{1}{2\pi\sqrt{L_{lk2}C_{rs2}}}\sqrt{\frac{(p^2+1)m' + \sqrt{(p^2+1)^2m'^2 - 4p^2(2m'-1)}}{2(2m'-1)}} \quad (19)$$

$$f_{r2,V2G} = \frac{1}{2\pi\sqrt{L_{lk2}C_{rs2}}}\sqrt{\frac{(p^2+1)m' - \sqrt{(p^2+1)^2m'^2 - 4p^2(2m'-1)}}{2(2m'-1)}} \quad (20)$$

To ensure the converter operating in the inductive region for zero-voltage switching, the switching frequency needs to be close to $f_{r1,V2G}$.

HV-to-LV Charging (H2L)

Figure 30:
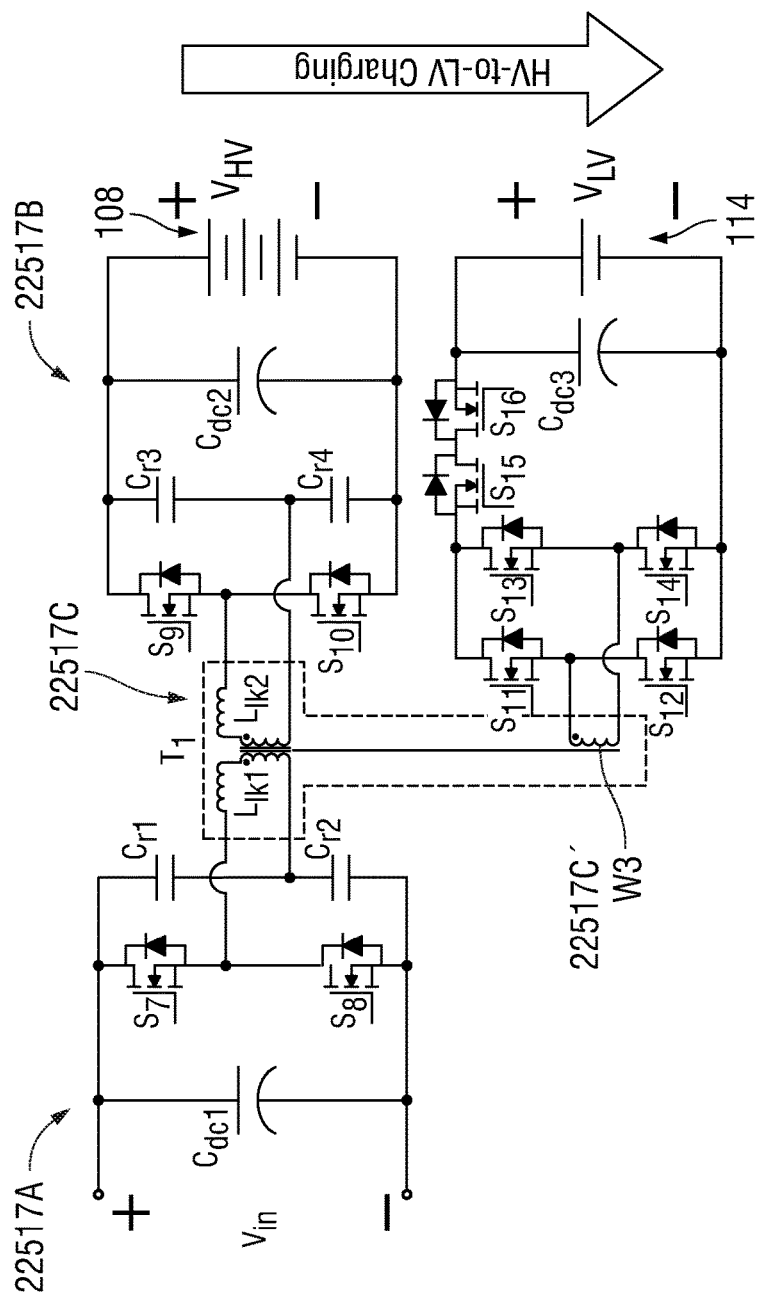
FIG. 30 illustrates circuit topology of the half-bridge LLC resonant converter of FIG. 22 for H2L operation.

FIG. 30 illustrates that, during H2L operation, the grid is disconnected (Vin=0) with the PFC stage. MOSFETs of the half-bridge converter at primary side ($S_7$ and $S_8$) 22517A are turned off. The body diodes of $S_7$ and $S_8$ will also be turned off when the dc link voltage ($V_{in}$) reaches its maximum value (in this case, 600V). The series-connected back-to-back switches ($S_{15}$ and $S_{16}$) are turned on to enable the full-bridge rectifier at tertiary side 22517C' (W3). The full-bridge synchronized rectification ($S_{11}$~$S_{14}$) is used to reduce the conduction losses. Hence, a half-bridge LLC ($L_{lk2}$, $L_m$, $C_{r3}$, $C_{r4}$) resonant converter delivers the power from HV battery pack 108 to LV loads 114.

Figure 31A:
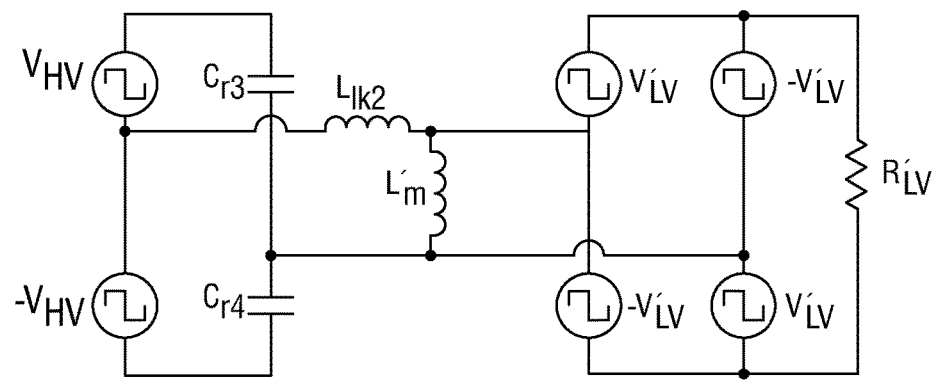
FIG. 31A is a nonlinear non-sinusoidal circuit model of the half-bridge LLC resonant converter of FIG. 30.

The nonlinear non-sinusoidal equivalent circuit model 22517B1 referred to the secondary side 22517B is presented in FIG. 31A, wherein four square-wave voltage sources ($\tilde{v}'_{LV}$) with 180° phase shift are generated by the synchronized rectification ($S_{11}$~$S_{14}$).

Figure 31B:
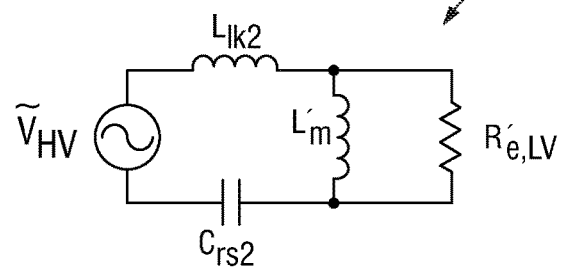
FIG. 31B is a linear sinusoidal circuit model of the nonlinear non-sinusoidal circuit model of FIG. 31A for H2L operation.

Referring to FIG. 31B, using the first harmonic approximation (FHA), the equivalent linear sinusoidal circuit model 22517B2 can be obtained. Therefore, the first-order harmonic of $\tilde{v}'_{LV}$ can be expressed as $$\tilde{v}'_{LV} = \frac{4}{\pi}V'_{LV}\sin(\omega_r t + \varphi) = \frac{4n}{\pi}V_{LV}\sin(\omega_r t + \varphi) \quad (21)$$

Since the average of $|\tilde{i}'_{LV}|$ is the output current $I'_{LV}$, $\tilde{i}'_{LV}$ is presented as $$\tilde{i}'_{LV} = \frac{\pi}{2}I'_{LV}\sin(\omega_r t + \varphi) = \frac{\pi}{2n}I_{LV}\sin(\omega_r t + \varphi) \quad (22)$$

Hence, the ac equivalent load in linear sinusoidal circuit model can be expressed as, $$R'_{e,LV} = \frac{\tilde{v}'_{LV}}{\tilde{i}'_{LV}} = \frac{8n^2}{\pi^2}R_{LV} \quad (23)$$

Since the topology operates as a half-bridge LLC converter during H2L operation, the transfer function during H2L operation, the gain characteristics and resonant frequency are similar to those of an LLC converter.

Experimental Results

Figure 32:
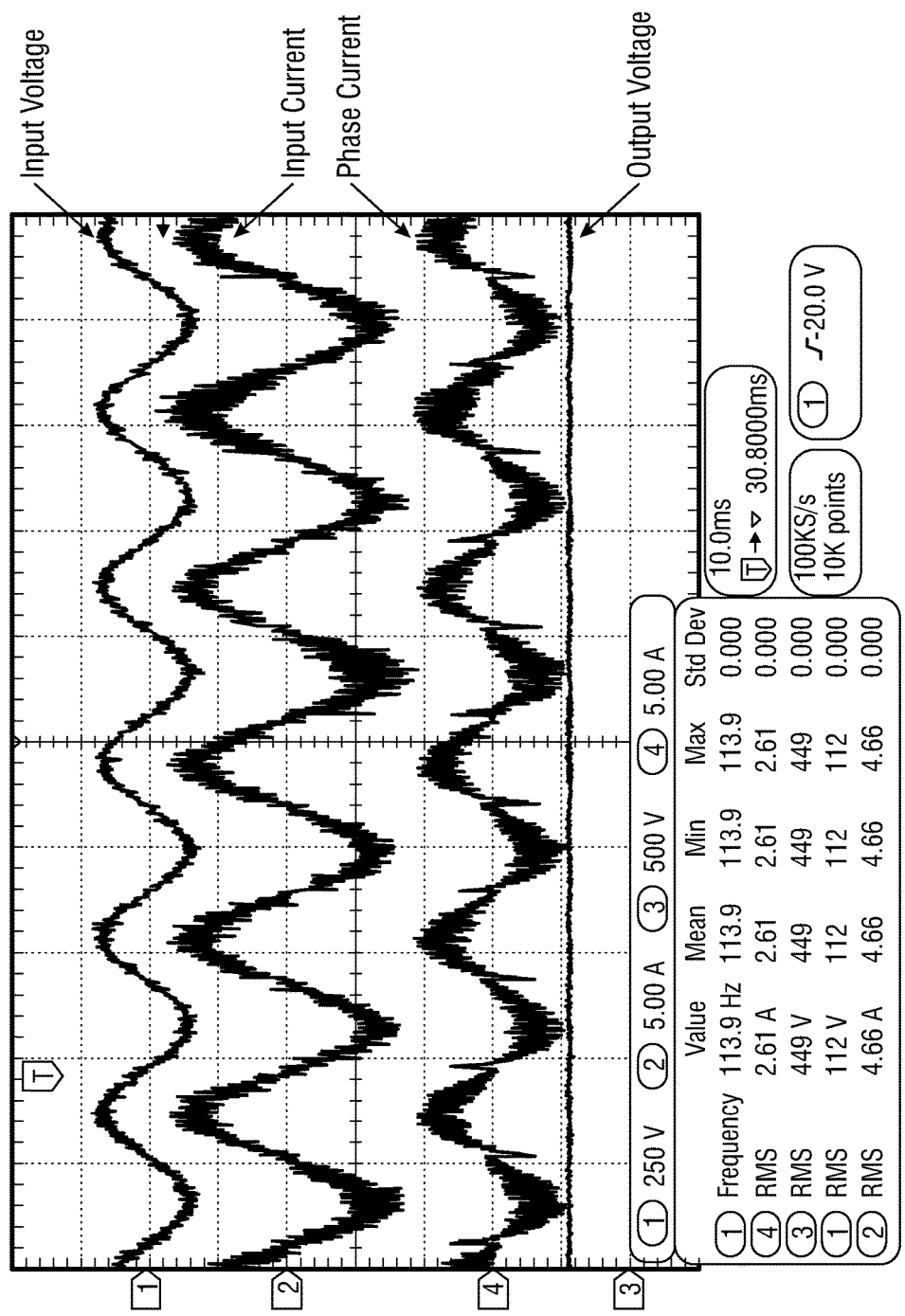
FIG. 32 shows the measured current and voltage waveforms of AC-DC interleaved PFC converter during G2V operation at 500 W.

FIG. 32 illustrates the measured current and voltage waveforms of the ac-dc interleaved PFC converter during G2V operation at 500 W.

The dc-link voltage $V_{DC}$, which is the input voltage of the dc-dc resonant stage could be variable from 400V to 600V, depending on the grid voltage. The HV battery 108 voltage output can be variable from 200V to 420V, and the LV load output 114 is variable from 8V to 14V. The resonant frequencies of LC networks at primary and secondary sides ($f_0$ and $f'_0$) are set to 190 kHz. The dual-output dc-dc resonant converter has three operation modes: (1) G2V; (2) V2G; (3) H2L.

Converter Performance in G2V Charging Operation

As explained above, during G2V, the LV side (tertiary side) is disabled. The turn ratio of primary to secondary winding is set at 1.5:1. In order to reduce the resonant current, a relatively high ratio of total primary inductance to primary leakage inductance (m) is required. A 5.6 ratio (m=5.6) is acquired by adjusting the transformer air-gaps. The air-gap between the central legs of EE cores is set to 0.6 mm, and the air-gap between the primary winding and the secondary winding is set to 3 mm. At primary side, either $C_{r1}$ or $C_{r2}$ consists of four parallel film capacitors, each 1 nF. At secondary side, $C_{r3}$ or $C_{r4}$ consists of three parallel film capacitors, each 3.3 nF.

To ensure low conduction losses, 1200V CREE SiC MOSFETs with low turn-on resistance are selected at both primary and secondary sides. Experiments show that the secondary side rectification using body diodes of MOSFETs significantly reduces the efficiency due to the long reverse recovery time of SiC MOSFETs body diodes. Therefore, either additional diodes with better reverse recovery performances should be paralleled with MOSFETs, or alternatively in our design synchronous rectification is used to turn on MOSFETs at secondary side for efficient rectification.

During HV battery charging, the switches $S_1$ and $S_2$ serve as a high-frequency inverter while $S_3$ and $S_4$ serve as a rectifier bridge.

Figure 33:
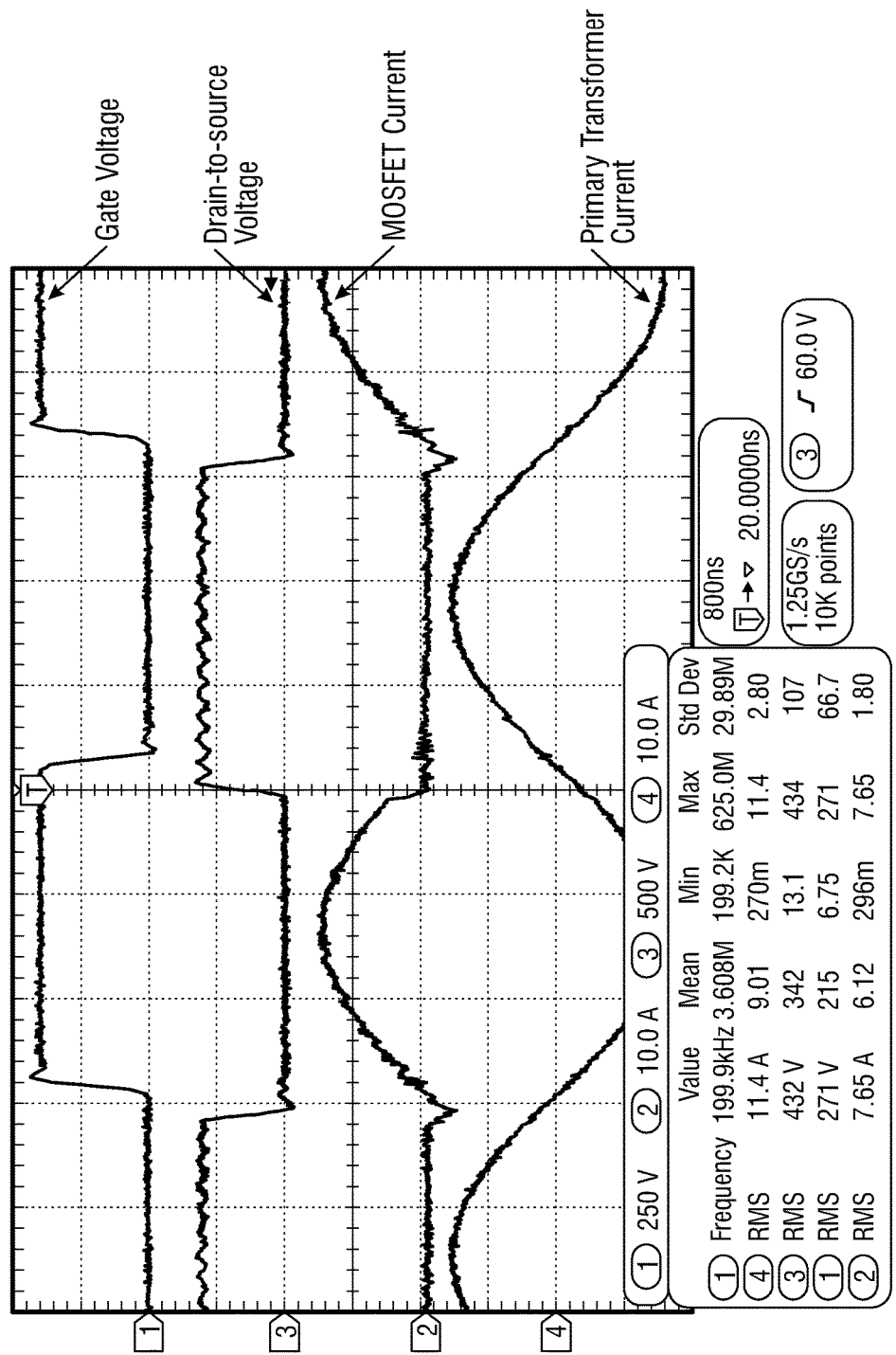
FIG. 33 illustrates graphical plots of gate-to-source voltage of $S_7$, drain-to-source voltage of $S_7$, switch current of $S_7$, and primary side resonant current.

FIG. 33 illustrates the measured current and voltage waveforms of the converter during G2V operation at full load condition (3.3 kW).

To ensure the converter operation in region 1 and acquire a high gain, the switching frequency is set slightly higher than $f_{r1,G2V}$.

Converter Performance in V2G Mode

Since $C_{rs1}=C'_{rs2}$, the resonant frequency of primary side LC network would be equal to the resonant frequency of secondary side LC network ($f_0=f'_0$). Therefore, the resonant frequency and gain characteristics are similar to those in G2V mode. The switches $S_3$ and $S_4$ serve as a high-frequency inverter while $S_1$ and $S_2$ serve as a rectifier bridge.

Figure 34:
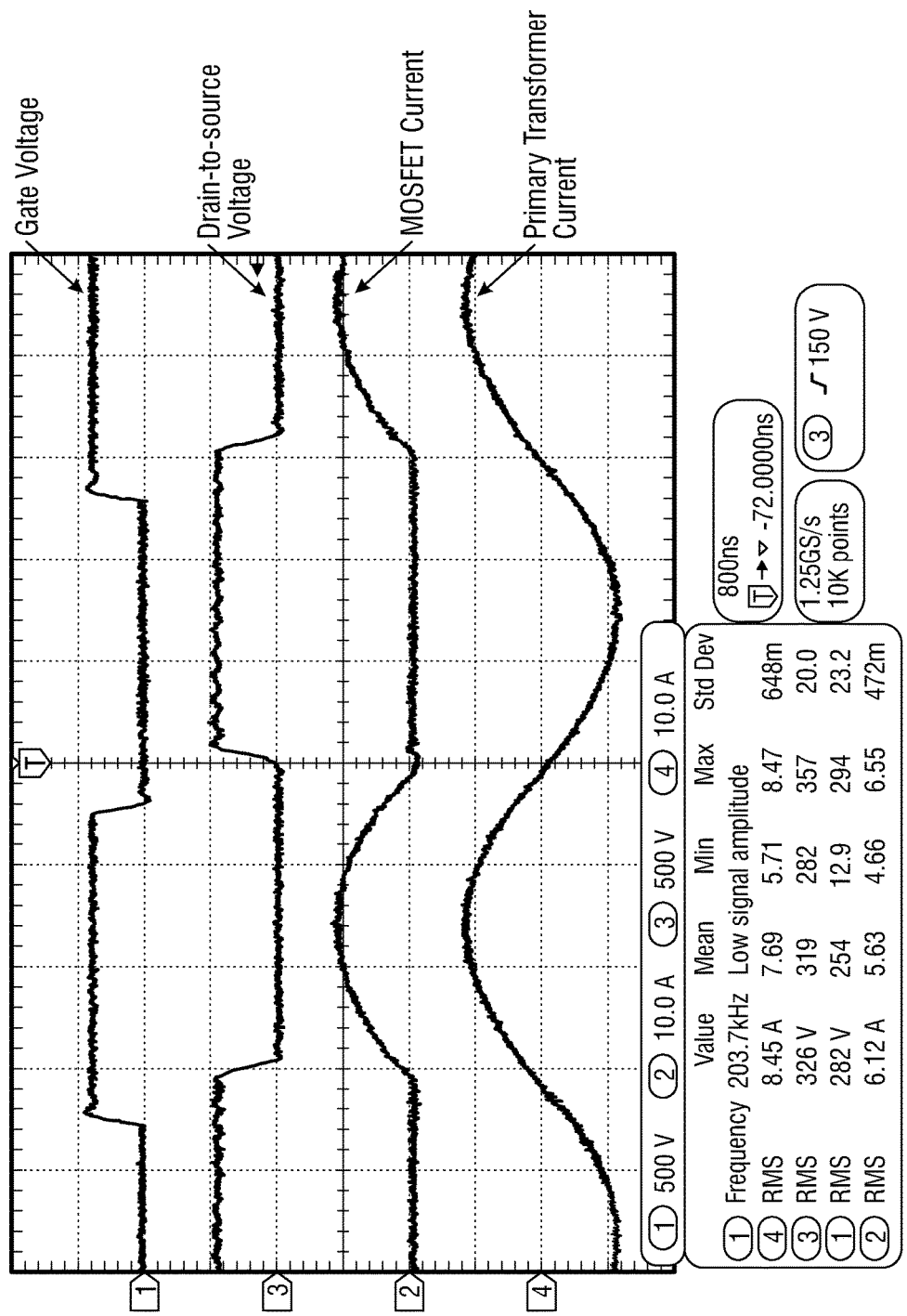
FIG. 34 illustrates graphical plots of gate-to-source voltage of $S_9$, drain-to-source voltage of $S_9$, switch current of $S_9$, and primary side resonant current.

FIG. 34 demonstrates the measured current and voltage waveforms of the converter during V2G operation at 60% of full load condition (3.3 kW).

Converter Performance in G2V Mode

During H2L, the primary side of the dual-output dc-dc converter is disabled. The switches $S_3$ and $S_4$ serve as a high-frequency inverter while $S_{11}$~$S_{14}$ serve as a synchronous rectifier bridge. The converter uses the LLC resonant network at secondary side consisting of $C_{r3}$, $C_{r4}$, $L_{lk2}$ and $L'_m$. The turns-ratio of secondary to tertiary winding is set to 20:1.

Figure 35:
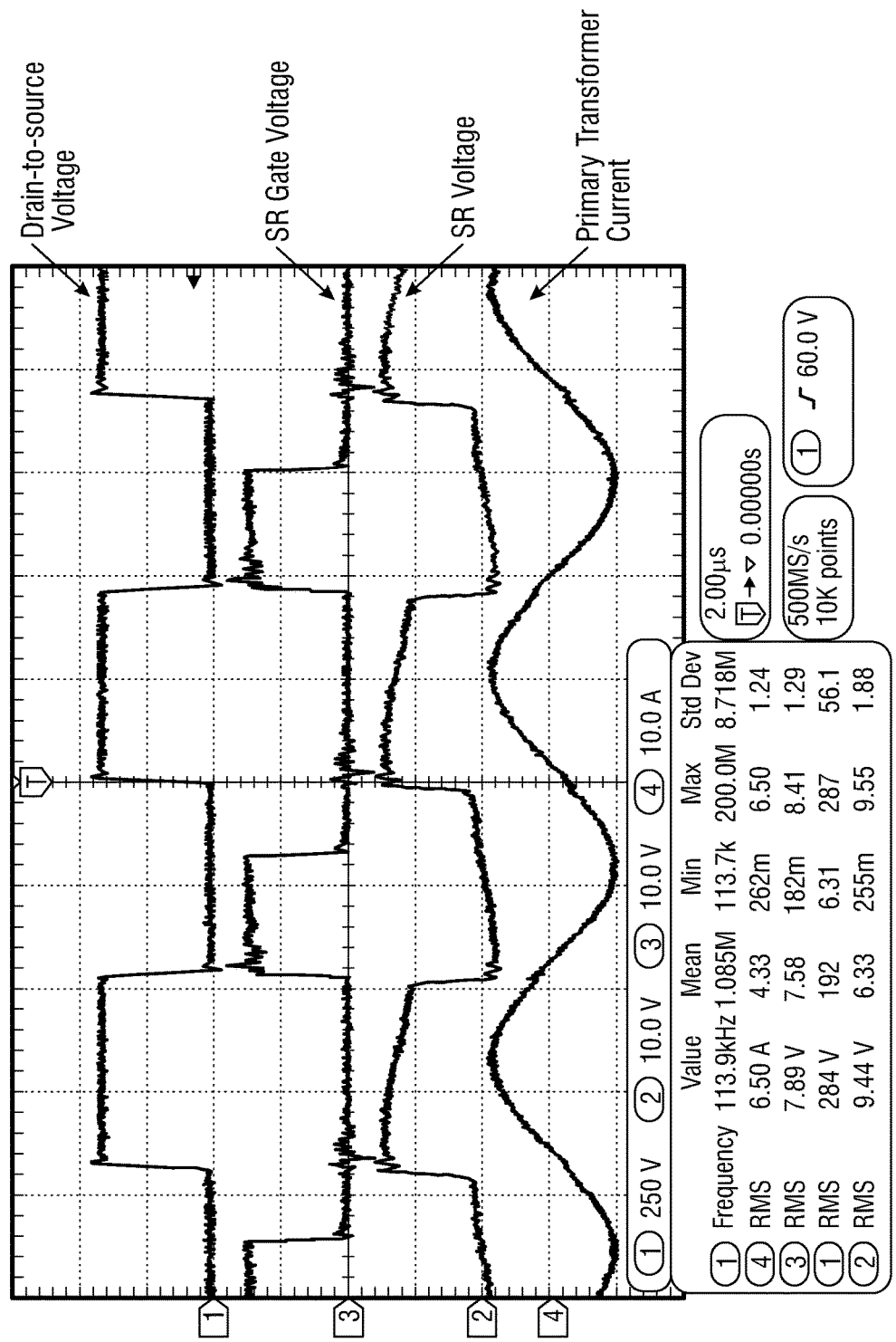
FIG. 35 illustrates graphical plots of drain-to-source voltage of $S_9$, gain-to-source voltage of $S_{11}$, drain-to-source voltage of $S_{11}$, and primary side resonant current.

To increase the efficiency of synchronous rectification at tertiary side, five 60V/300A Infineon Si MOSFETs with very low turn-on resistance are connected in parallel and share one gating signal. 1 μs deadbands are set in gating signals to ensure that a MOSFET is turned on after its body diode conducts and MOSFET is turned off before its body diode turns off. Large copper bars are used for external connection to reduce the conduction losses. The measured current and voltage waveforms of the converter during H2L operation at full load condition (1 kW) are depicted in FIG. 35.

The embodiments of the present disclosure as described above present a unique dual-output integrated and isolated onboard charger topology for charging PEV's HV traction battery, LV dc loads and V2G application. The second stage of the power electronics interface presents the integration of a half-bridge CLLLC converter intertwined with a half-bridge LLC converter with minimum number of passive and active components. The inductive components are integrated into a single three-winding electromagnetically integrated transformer, which leads to less size/weight, less saturation effect, less magnetizing losses, and higher voltage isolation. The half-bridge CLLLC converter operates during G2V and V2G operation while the half-bridge LLC converter operates during H2L operation. In comparison to conventional stand-alone converters, the integrated topology with small number of components reduces the size, weight and cost of the onboard PEI. Modeling, analyses and design guidelines are presented. Experimental results are presented for validation of the charging modes.

While several embodiments and methodologies of the present disclosure have been described and shown in the drawings, it is not intended that the present disclosure be limited thereto, as it is intended that the present disclosure be as broad in scope as the art will allow and that the specification be read likewise. Therefore, the above description should not be construed as limiting, but merely as exemplifications of particular embodiments and methodologies. Those skilled in the art will envision other modifications within the scope of the claims appended hereto.

REFERENCES

Part A

[1] X. Zhang, C. Li, C. Yao, L. Fu, F. Guo, and J. Wang, "An Isolated DC/DC Converter with Reduced Number of Switches and Voltage Stresses for Electric and Hybrid Electric Vehicles," in *IEEE Applied Power Electronics Conference and Exposition*, Long Beach, Calif., March 2013.

[2] A. Khaligh and S. Dusmez, "Comprehensive Topological Analysis of Conductive and Inductive Charging Solutions for Plug-In Electric Vehicles," IEEE Transactions on Vehicular Technology, vol. 61, no. 8, pp. 3475-3489, October 2012.

[3] M. Yilmaz and P. T. Krein, "Review of Battery Charger Topologies, Charging Power Levels, and Infrastructure for Plug-In Electric and Hybrid Vehicles," *IEEE Transactions on Power Electronics*, vol. 28, no. 5, pp. 2151-2169, May 2013.

[4] H. Wang and A. Khaligh, "Comprehensive Topological Analyses of Isolated Resonant Converters in PEV Battery Charging Applications," in *Proc. IEEE Transportation Electrification Conference and Expo*, June 2013, Dearborn, Mich.

[5] H. Wang, S. Dusmez, and A. Khaligh, "Design Considerations for an Level-2 On-Board EV Charger Based on Interleaved Boost PFC and LLC Resonant Converters," in *Proc. IEEE Transportation Electrification Conference and Expo*, June 2013, Dearborn, Mich.

[6] J.-H. Jung, H.-S. Kim, M.-H. Ryu, and J.-W. Baek, "Design Methodology of Bidirectional LLC Resonant Converter for High-Frequency Isolation of DC Distribution Systems," *IEEE Transactions on Power Electronics*, vol. 28, no. 4, pp. 1741-1755, April 2013.

[7] J. Biela and J. W. Kolar, "Electromagnetic integration of high power resonant circuits comprising high leakage inductance transformers," in *Proc. on IEEE Power Electronics Specialists Conference (PESC)*, June 2004, pp. 4537-4545, vol. 6. (Same as Part B [31])

[8] B. Yang, R. Chen, and F. C. Lee, "Integrated magnetic for LLC resonant converter," in *Proc. on IEEE Applied Power Electronics Conference and Exposition (APEC)*, March 2002, pp. 346-351, vol. 1. (Same as Part B [32])

[9] L. P. Wong, Y. S. Lee, and D. K. Cheng, "A new approach to the analysis and design of integrated magnetics," in *Proc. on IEEE Applied Power Electronics Conference and Exposition (APEC)*, 2001, vol. 2, pp. 1196-1202.

[10] D. Bowen, A. Lee, C. Krafft, and I. D. Mayergoyz, "Analysis of nested winding dielectric-core transformers for ethernet applications," *IEEE Transactions on Magnets*, vol. 48, no. 11, pp. 4127-4130, November 2012. (Same as Part B [34]

Part B

[1] J. G. Kassakian, "Future automotive electrical systems—The power electronics market of the future," in Proc. *IEEE Appl. Power Electron. Conf*, New Orleans, La., pp. 3-9, 2000.

[2] S. M. Lukic, J. Cao, R. C. Bansal, F. Rodriguez, and A. Emadi, "Energy Storage Systems for Automotive Applications," *IEEE Transactions on Industrial Electronics*, vol. 55, no. 6, pp. 2258-2267, 2008.

[3] H. Wang, S. Dusmez, and A. Khaligh, "Design and Analysis of a Full Bridge LLC Based PEV Charger Optimized for Wide Battery Voltage Range," *IEEE Transactions on Vehicular Technology*, in press.

[4] F. Musavi, M. Craciun, D. S. Gautam, W. Eberle, and W. G. Dunford, "An LLC resonant DC-DC converter for wide output voltage range battery charging applications," *IEEE Trans. on Power Electron.*, vol. 28, no. 12, pp. 5437-5445, 2013.

[5] G.-J. Su, and L. Tang, "A Multiphase, Modular, Bidirectional, Triple-Voltage DC-DC Converter for Hybrid and Fuel Cell Vehicle Power Systems," *IEEE Transactions on Power Electronics*, vol. 23, no. 6, pp. 3035-3046, 2008.

[6] Toyota Prius 3rd generation emergency response guide, Toyota Motor Corporation, 2009, p. 15. https://techinfo.toyota.com/techInfoPortal/staticcontent/en/techinfo/html/prelogin/docs/3rdprius.pdf

[7] Toyota Industries Corporation, "DC-DC Converters that will Contribute to the Fuel Efficiency of Hybrid Vehicles," Toyota Industries Corporation, http://www.toyota-industries.com/csr/environment/product/erectoronic_01.html

[8] Toyota Camry Gasoline-Electric Hybrid Synergy Drive: Hybrid Vehicle Dismantling Manual, Toyota Motor Corporation, 2006, p. 6. https://techinfo.toyota.com/techInfoPortal/staticcontent/en/techinfo/html/prelogin/docs/camryhvdisman.pdf.

[9] 2012 Fusion MKZ Hybrid Emergency Response Guide, Ford Motor Corporation, August 2011, p. 7. http://www-.evsafetytraining.org/~/media/Electric%20Vehicle/Files/PDFs/Ford/2012FusionMKZERG2.pdf

[10] Carlson. Richard, Advanced Vehicle Testing Activity Benchmark Testing of the Chevrolet Volt Onboard Charger, Idaho National Laboratory, April 2012, p. 1. http://www1.eere.energy.gov/vehiclesandfuels/avta/pdfs/phev/efficiency_results_chevy_volt_onboard_charger.pdf

[11] Nissan, "2013 Nissan LEAF Press Kit: Overview", NissanNews.com, http://nissannews.com/en-US/nissan/usa/presskits/us-2013-nissan-leaf-press-kit.

[12] 2013 Nissan Leaf—First Responder's Guide, Nissan Motor Corporation, August 2011, p. 1, p. 9. http://www.evsafetytraining.org/~/media/Electric %20Vehicle/Files/2013NissanLEAFFRG %201st %20Rel. pdf
[13] Chris Mi et al., Hybrid Electric Vehicles—Principles and Applications with Practical Perspectives, United Kingdom: John Wiley & Sons, Ltd, 2011, pp. 197-198.
[14] T. Gilchrist, "Fuel cells to the fore," IEEE Spectr., vol. 35, no. 11, pp. 35-40, November 1998.
[15] H. Wu, K. Sun, S. Ding and Y. Xing, "Topology Derivation of Nonisolated Three-Port DC-DC Converters From DIC and DOC," IEEE Transactions on Power Electronics, vol. 28, no. 7, pp. 3297-3307, 2013.
[16] Y.-K. Lo, S.-C. Yen, and T.-H. Song, "Analysis and Design of a Double-Output Series-Resonant DC-DC Converter," IEEE Transactions on Power Electronics, vol. 22, no. 3, pp. 952-959, 2007.
[17] Young-Joo Lee, Alireza Khaligh, Ali Emadi, "Advanced Integrated Bidirectional AC/DC and DC/DC Converter for Plug-In Hybrid Electric Vehicles," IEEE Trans. Veh. Technol., vol. 58, no. 8, pp. 3970-3970, October 2009.
[18] H. Tao, J. L. Duate, and M. A. M. Hendrix, "Three-port triple-half-bridge bidirectional converter with zero-voltage switching," IEEE Trans. Power. Electron., vol. 23, no. 2, pp. 782-792, March 2008.
[19] H. Tao, A. Kotsopoulos, J. L. Duarte, and M. A. M. Hendrix, "Transformercoupled multiport ZVS bidirectional DC-DC converter with wide input range," IEEE Trans. Power. Electron., vol. 23, no. 2, pp. 771-781, March 2008.
[20] C. Zhao, S. D. Round, and J. K. Kolar, "An isolated three-port bidirectional DC-DC converter with decoupled power flow management," IEEE Trans. Power. Electron., vol. 23, no. 5, pp. 2443-2453, September 2008.
[21] L. Wang, Z. Wang, and H. Li, "Asymmetrical Duty Cycle Control and Decoupled Power Flow Design of a Three-port Bidirectional DC-DC Converter for Fuel Cell Vehicle Application," IEEE Transactions on Power Electronics, vol. 27, no. 2, pp. 891-904, 2012.
[22] S. Y. Kim, H.-S. Song, and K. Nam, "Idling Port Isolation Control of Three-Port Bidirectional Converter for EVs," IEEE Transactions on Power Electronics, vol. 27, no. 5, pp. 2495-2506, 2012.
[23] J. G. Pinto, V. Monteiro, H. Goncalves, and J. L. Afonso, "On-Board Reconfigurable Battery Charger for Electric Vehicles with Traction-to-Auxiliary Mode," IEEE Transactions on Vehicular Technology, vol. pp, no. 99, 2013.
[24] A. Rodriguez, A. Vazquez, D. G. Lamar, and M. M. Hernando, "Three-port power electronic system for energy storage and recovery using a parallel connection of a power factor corrector boost and a dual active bridge," 15th International IEEE Power Electronics and Motion Control Conference (EPE/PEMC), pp. LS7d.4-1-LS7d.4-8, 2012.
[25] W. Cai, B. Liu, S. Duan, and L. Jiang, "Power flow control and optimization of a three-port converter for photovoltaic-storage hybrid system," IEEE Energy Conversion Congress and Exposition (ECCE), Pp. 4121-4128, 2012.
[26] Y.-M. Chen, X. Yu, and A, Q. Huang, "A new nonisolated three-port DC-DC converter with high step-up/down ratio," IEEE Energy Conversion Congress and Exposition (ECCE), pp. 1520-1526, 2012.
[27] Y. Hu, Y. Deng, X. Lu, Y. Tao, and X. He, "A three-port high step-up DC-DC converter for PV system," IEEE ECCE Asia Downunder (ECCE Asia), pp. 285-290, 2013.
[28] Y. Wen, L. Shao, R. Fernandes, and O. Trescases, "Current-mode bi-directional single-inductor three-port DC-DC converter for portable systems with PV power harvesting," 15th IEEE European Conference on Power Electronics and Applications (EPE), pp. 1-10, 2013.
[29] Z. Qian, O. Abdel-Rahman, H. Al-Atrash, and I. Batarseh, "Modeling and Control of Three-Port DC/DC Converter Interface for Satellite Applications," IEEE Transactions on Power Electronics, vol. 25, no. 3, pp. 637-649, 2010.
[30] W. Li, J. Xiao, Y. Zhao, and X. He "PWM Plus Phase Angle Shift (PPAS) Control Scheme for Combined Multiport DC/DC Converters," IEEE Transactions on Power Electronics, vol. 27, no. 3, pp. 1479-1489, 2012.
[31] J. Biela and J. W. Kolar, "Electromagnetic integration of high power resonant circuits comprising high leakage inductance transformers," in Proc. on IEEE Power Electronics Specialists Conference (PESC), June 2004, pp. 4537-4545, vol. 6. (Same as Part A [7])
[32] B. Yang, R. Chen, and F. C. Lee, "Integrated magnetic for LLC resonant converter," in Proc. on IEEE Applied Power Electronics Conference and Exposition (APEC), March 2002, pp. 346-351, vol. 1. (Same as Part A [8])
[33] L. P. Wong, Y. S. Lee, and D. K. Cheng, "A new approach to the analysis and design of integrated magnetics," in Proc. on IEEE Applied Power Electronics Conference and Exposition (APEC), 2001, vol. 2, pp. 1196-1202.
[34] D. Bowen, A. Lee, C. Krafft, and I. D. Mayergoyz, "Analysis of nested winding dielectric-core transformers for ethernet applications," IEEE Transactions on Magnets, vol. 48, no. 11, pp. 4127-4130, November 2012. (Same as Part A [9])

What is claimed is:

1. An integrated power electronics interface comprising:
a first stage, the first stage including:
a power factor correction AC-DC converter; and
a second stage integrated DC-DC converter, including:
an LC resonant network including a plurality of resonance capacitors in electrical communication with a three-winding electromagnetic integrated transformer inherently yielding thereby leakage inductance and magnetizing inductance; and
one of a full-bridge rectifier or a half-bridge rectifier in electrical communication with the plurality of resonance capacitors and the three-winding electromagnetic integrated transformer,
wherein the integrated power electronics interface is configured to enable a charging source to charger operational mode and a charger to charging source operational mode,
wherein the charging source to charger operational mode is enabled via the resonance capacitors, the leakage inductance and magnetizing inductance provided by the LC resonant network that includes the three-winding electromagnetic integrated transformer, and
wherein the charger to charging source operational mode is enabled via the resonance capacitors, the leakage inductance and the magnetizing inductance provided by the LC resonant network that includes the three-winding electromagnetic integrated transformer,
wherein a high voltage to low voltage charging operational mode is enabled via the resonance capacitors, the leakage inductance and the magnetizing inductance provided by the LC resonant network that includes the three-winding electromagnetic integrated transformer, wherein the three-winding transformer is a transformer configured with leakage inductances and magnetizing inductances electromagnetically integrated forming thereby an electromagnetically-integrated transformer, wherein the electromagnetically integrated transformer includes:

a first EE core defining a base portion, a central leg and first and second peripheral legs;

a second EE core defining a base portion, a central leg and first and second peripheral legs;

a primary winding wound around the central leg of the first EE core between the first peripheral leg and the central leg and between the second peripheral leg and the central leg of the first EE core;

a secondary winding wound around the central leg of the second EE core between the first peripheral leg and the central leg and between the second peripheral leg and the central leg of the second EE core; and a tertiary winding wound around the central leg of the second EE core between the first peripheral leg and the central leg and between the second peripheral leg and the central leg of the second EE core, wherein edges of the legs of the first EE core align with edges of the legs of the second EE core, wherein the tertiary winding is wound on the central leg of the second EE core below the primary winding wound on the central leg of the first EE core and above the secondary winding wound on the central leg of the second EE core, wherein an adjustable winding gap is formed between a lower edge of the primary winding on the first EE core and an upper edge of the secondary winding on the second EE core, establishing spatial separation between the secondary winding and the primary winding, and wherein an adjustable winding gap is formed between a lower edge of the primary winding on the first EE core and an upper edge of the tertiary winding on the second EE core, establishing spatial separation between the tertiary winding and the primary winding, or, wherein edges of the legs of the first EE core align with edges of the legs of the second EE core, wherein edges of the legs of the first EE core align with edges of the legs of the second EE core, wherein the tertiary winding is formed concentrically around the secondary winding and both the secondary winding and the tertiary winding are formed concentrically to one another around the central leg of the second EE core, wherein an adjustable winding gap is formed between a lower edge of the primary winding and an upper edge of the secondary winding on the second EE core, establishing spatial separation between the secondary winding and the primary winding, and wherein an adjustable winding gap is formed between a lower edge of the primary winding and an upper edge of the tertiary winding on the second EE core, establishing spatial separation between the tertiary winding and the primary winding.

2. The integrated power electronics interface according to claim 1, wherein the power factor correction AC-DC converter of the first stage is one of (a) a two-stage converter including a diode bridge followed by a power factor DC-DC converter or (b) a single-stage power factor correction AC-DC converter.

3. The integrated power electronics interface according to claim 2, wherein the diode bridge of the two-stage converter is one of a full-bridge diode bridge or a half-bridge diode bridge.

4. The integrated power electronics interface according to claim 1, wherein edges of the legs of the first EE core align with edges of the legs of the second EE core and the tertiary winding is formed concentrically around the secondary winding and both the secondary winding and the tertiary winding are formed concentrically around the central leg of the second EE core and wherein the tertiary winding defines an adjustable concentric winding gap with respect to the secondary winding, establishing spatial separation between the tertiary winding and the secondary winding.

5. The integrated power electronics interface according to claim 1, wherein the first EE core defines lower edges of the first and second side legs and central leg defining the first EE core and the second EE core defines upper edges of the first and second side legs and central leg defining the second EE core, wherein a central core gap is formed between the lower edge of the central leg of the first EE core and the upper edge of the central leg of the second EE core and a first peripheral core gap is formed between the lower edge of the first side leg of the first EE core and the upper edge of the first side leg of the second EE core and a second peripheral core gap is formed between the lower edge of the second side leg of the first EE core and the upper edge of the second side leg of the second EE core, thereby causing leakage inductance yielded by the electromagnetically integrated transformer.

6. The integrated power electronics interface according to claim 5, wherein the first peripheral core gap, central core gap and second peripheral core gap are equal to one another.

7. The integrated power electronics interface according to claim 1, wherein the first stage AC-DC converter is selected from the group consisting of:
(a) a bidirectional half bridge converter;
(b) a bidirectional full bridge converter;
(c) a bidirectional totem pole converter; and
(d) a bidirectional interleaved totem pole converter.

8. The integrated power electronics interface according to claim 1, wherein the first stage AC-DC converter is selected from the group consisting of:
(a) a single-leg boost converter;
(b) a single-leg buck-boost converter;
(c) an interleaved boost converter;
(d) an interleaved buck-boost converter; and
(e) a single-ended primary-inductor converter (SEPIC) converter.

9. The integrated power electronics interface according to claim 1, wherein a secondary winding is wound around the central leg of the second EE core between the first peripheral leg and the central leg and between the second peripheral leg and the central leg of the second EE core, wherein a tertiary winding is wound on the central leg of the second EE core below the primary winding wound on the central leg of the first EE core and above the secondary winding wound on the central leg of the second EE core, and wherein an adjustable winding gap is formed between the lower edge of the tertiary winding and the upper edge of the secondary winding, establishing spatial separation between the tertiary winding and the secondary winding.

10. The integrated power electronics interface according to claim 1,
wherein the lower edge of the first peripheral leg of the first EE core is in contact with the upper edge of the first peripheral leg of the second EE core,
wherein the lower edge of the second peripheral leg of the first EE core is in contact with the upper edge of the second peripheral leg of the second EE core, and
wherein a central gap is formed between a lower edge of the central leg of the first EE core and an upper edge of the central leg of the second EE core, thereby causing leakage inductance yielded by the electromagnetically integrated transformer.

11. A three-winding electromagnetically integrated transformer of a second stage integrated DC-DC converter for an integrated power electronics interface, the three-winding electromagnetically integrated transformer comprising:
a first EE core defining a base portion, a central leg and first and second peripheral legs;
a second EE core defining a base portion, a central leg and first and second peripheral legs;
a primary winding wound around the central leg of the first EE core between the first peripheral leg and the central leg and between the second peripheral leg and the central leg of the first EE core;
a secondary winding wound around the central leg of the second EE core between the first peripheral leg and the central leg and between the second peripheral leg and the central leg of the second EE core; and
a tertiary winding wound around the central leg of the second EE core between the first peripheral leg and the central leg and between the second peripheral leg and the central leg of the second EE core,
wherein edges of the legs of the first EE core align with edges of the legs of the second EE core
wherein the tertiary winding is wound on the central leg of the second EE core below the primary winding wound on the central leg of the first EE core and above the secondary winding wound on the central leg of the second EE core,
wherein an adjustable winding gap is formed between a lower edge of the primary winding on the first EE core and an upper edge of the secondary winding on the second EE core, establishing spatial separation between the secondary winding and the primary winding, and
wherein an adjustable winding gap is formed between a lower edge of the primary winding on the first EE core and an upper edge of the tertiary winding on the second EE core, establishing spatial separation between the tertiary winding and the primary winding, or,
wherein edges of the legs of the first EE core align with edges of the legs of the second EE core,
wherein THE tertiary winding and THE secondary winding are adjacent to one another,
wherein the tertiary winding is formed concentrically around the secondary winding and both the secondary winding and the tertiary winding are formed concentrically to one another around the central leg of the second EE core,
wherein an adjustable winding gap is formed on a lower edge of the primary winding and an upper edge of the secondary winding on the second EE core, establishing spatial separation between the secondary winding and the primary winding, and
wherein an adjustable winding gap is formed on a lower edge of the primary winding and an upper edge of the tertiary winding on the second EE core, establishing spatial separation between the tertiary winding and the primary winding.

12. The three-winding electromagnetically integrated transformer according to claim 11, wherein edges of the legs of the first EE core align with edges of the legs of the second EE core and the secondary winding and tertiary winding are adjacent to one another along an axis defined by the central leg of the first EE core and the central leg of the second EE core.

13. The three-winding electromagnetically integrated transformer according to claim 11, wherein edges of the legs of the first EE core align with edges of the legs of the second EE core and the tertiary winding is formed concentrically around the secondary winding and both the secondary winding and the tertiary winding are formed concentrically around the central leg of the second EE core, and
wherein the tertiary winding defines an adjustable concentric winding gap with respect to the secondary winding, establishing spatial separation between the tertiary winding and the secondary winding.

14. The three-winding electromagnetically integrated transformer according to claim 11, wherein the first EE core defines lower edges of the first and second side legs and central leg defining the first EE core and the second EE core defines upper edges of the first and second side legs and central leg defining the second EE core, wherein a central core gap is formed between the lower edge of the central leg of the first EE core and the upper edge of the central leg of the second EE core and a first peripheral core gap is formed between the lower edge of the first side leg of the first EE core and the upper edge of the first side leg of the second EE core and a second peripheral core gap is formed between the lower edge of the second side leg of the first EE core and the upper edge of the second side leg of the second EE core, thereby causing leakage inductance yielded by the electromagnetically integrated transformer.

15. The three-winding electromagnetically integrated transformer according to claim 14, wherein the first peripheral core gap, central core gap and second peripheral core gap are equal to one another.

16. The three-winding electromagnetically integrated transformer according to claim 11,
wherein a secondary winding is wound around the central leg of the second EE core between the first peripheral leg and the central leg and between the second peripheral leg and the central leg of the second EE core,
wherein a tertiary winding is wound on the central leg of the second EE core below the primary winding wound on the central leg of the first EE core and above the secondary winding wound on the central leg of the second EE core, and
wherein an adjustable winding gap is formed between the lower edge of the tertiary winding and the upper edge of the secondary winding, establishing spatial separation between the tertiary winding and the secondary winding.

17. The three-winding electromagnetically integrated transformer according to claim 11,
wherein the lower edge of the first peripheral leg of the first EE core is in contact with the upper edge of the first peripheral leg of the second EE core,
wherein the lower edge of the second peripheral leg of the first EE core is in contact with the upper edge of the second peripheral leg of the second EE core, and wherein a central gap is formed between a lower edge of the central leg of the first EE core and an upper edge of the central leg of the second EE core, thereby causing leakage inductance yielded by the electromagnetically integrated transformer.

* * * * *